(12) United States Patent
Morishima et al.

(10) Patent No.: US 7,031,594 B2
(45) Date of Patent: Apr. 18, 2006

(54) RECORDING AND/OR REPRODUCING APPARATUS FOR DETECTING AND DISPLAYING AUDIO SIGNAL LEVELS OF INPUT AND OUTPUT AND PORTS

(75) Inventors: Shinichi Morishima, Kanagawa (JP); Makoto Tabuchi, Kanagawa (JP); Masakazu Murata, Kanagawa (JP); Kazuo Kamiyama, Kanagawa (JP); Toru Eto, Kanagawa (JP); Junichi Onodera, Kanagawa (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 10/681,082

(22) Filed: Oct. 8, 2003

(65) Prior Publication Data
US 2005/0018502 A1 Jan. 27, 2005

Related U.S. Application Data

(62) Division of application No. 09/435,961, filed on Nov. 9, 1999, now Pat. No. 6,771,876.

(30) Foreign Application Priority Data

| Nov. 10, 1998 | (JP) | ................................. 10-319634 |
| Nov. 10, 1998 | (JP) | ................................. 10-336581 |
| Nov. 10, 1998 | (JP) | ................................. 10-336582 |
| Nov. 10, 1998 | (JP) | ................................. 10-336583 |

(51) Int. Cl.
*H04N 5/76* (2006.01)
*G06F 3/00* (2006.01)
*G06F 9/00* (2006.01)

(52) U.S. Cl. .................. 386/52; 386/54; 386/96; 360/13; 369/83; 715/727

(58) Field of Classification Search .................... 386/4, 386/39, 52, 54, 96–106; 360/13; 369/83; 715/716, 719, 723, 725, 727, 729; H04N 5/76, H04N 5/781, 9/79
See application file for complete search history.

(56) References Cited

U.S. PATENT DOCUMENTS 5,227,892 A * 7/1993 Lince ......................... 386/54

(Continued)

Primary Examiner—Thai Tran
(74) Attorney, Agent, or Firm—Frommer Lawrence & Haug LLP; William S. Frommer; Darren M. Simon

(57) ABSTRACT

A data recording and/or reproducing apparatus having actuating buttons or adjustment volumes which enable a wide variety of processing operations despite a limited operating space, and which is able to display levels of plural audio data or to display various other data on a limited display area without detracting from viewability. To this end, the apparatus recording and/or reproducing includes a unit for recording and/or reproducing data for a non-linear accessible recording medium, at least one input port and at least one output port. The input port and the output port time-divisionally access the recording and/or reproducing unit to process the data inputted to the input port to output the processed data to the recording and/or reproducing a unit. The data reproduced from the recording and/or reproducing unit is processed by and outputted from the output port. The apparatus also includes a port actuation button for selecting the input and output ports, an actuation selection button for selecting recording or playback for the input port or the output port as selected by the port actuation button, and a controller for performing control so that the recording operation or the playback operation as selected by the actuation selection button will be executed by the input port or the output port as selected by the port actuation button.

12 Claims, 36 Drawing Sheets

U.S. PATENT DOCUMENTS 5,517,652 A * 5/1996 Miyamoto et al. .......... 725/115
5,953,485 A * 9/1999 Abecassis .................... 386/68
5,999,173 A * 12/1999 Ubillos ....................... 715/724
6,347,180 B1   2/2002 Kotani et al.
6,400,378 B1 * 6/2002 Snook ........................ 715/716
6,411,773 B1   6/2002 De Vos et al.
6,498,894 B1 * 12/2002 Ito et al. ....................... 386/52
2003/0091329 A1 * 5/2003 Nakata et al. ................ 386/52

* cited by examiner

US 7,031,594 B2

RECORDING AND/OR REPRODUCING APPARATUS FOR DETECTING AND DISPLAYING AUDIO SIGNAL LEVELS OF INPUT AND OUTPUT AND PORTS

This application is a divisional application of U.S. patent application Ser. No. 09/435,961, filed Nov. 9, 1999, now U.S. Pat. No. 6,771,876.

BACKGROUND OF THE INVENTION

1. Field of the Invention

This invention relates to a data recording and/or reproducing apparatus for recording and/or reproducing data for a recording medium. More particularly, it relates to a data recording and/or reproducing apparatus which may be used with advantage when using a non-linear-accessible recording medium as a recording medium.

2. Description of the Related Art

As a recording and/or reproducing apparatus for recording and/or reproducing video or audio data, there is proposed a hybrid recording and/or reproducing apparatus having a hard disc drive (HDD) and a VTR enclosed therein, as shown in, for example, the International Application No. PCT/J95/01617. This hybrid recording and/or reproducing apparatus is used as a so-called on-line editor in which the video and audio data are stored once on a HDD and edited so as to be then recorded on a tape on the VTR for transmission for broadcast reproduction from the tape. This hybrid recording and/or reproducing apparatus usually includes a control panel which is provided with actuating buttons for controlling the recording, reproduction, fast feed, rewind and stop etc.

Also, the above-mentioned recording and/or reproducing can be loaded on an external equipment for recording data outputted from this external equipment. That is, the hybrid recording and/or reproducing apparatus can be connected to a portable AV editor so that data reproduced from the hybrid recording and/or reproducing apparatus is outputted to the portable editor so that edited data from the editor is again inputted to the hybrid recording and/or reproducing apparatus.

The hybrid recording and/or reproducing apparatus outputs command signals to the AV editor in accordance with the operating contents of its own control panel to control the recording and/or reproducing processing of the external equipment. This enables the hybrid recording and/or reproducing apparatus to perform the editing using data outputted by the external equipment and data of the recording medium the apparatus is supervising.

FIG. 1 shows an illustrative actuating button of a circuit control panel provided in a recording and/or reproducing apparatus such as the aforementioned hybrid respective apparatus.

On actuating an actuating button "PLAYER" 1001, data is reproduced from an external playback VTR. When the external playback VTR and the external recording VTR are connected to the recording and/or reproducing apparatus having this actuating button, an actuating button "RECORDER" 1002 is actuated to record data on the external recording VTR. For cut-editing by cut switching by the control panel, the external playback VTR is selected by the actuating button "PLAYEER" 1001 to determine a cut-in point and a cut-out point on the reproducing side. The external recording VTR is selected by the actuating button "RECORDER" 1002 to determine a cut-in point and a cut-out point on the recorder side. Meanwhile, the cut-in point and the cut-out point mean editing start and editing end points in cut editing, respectively. For example, the cut-in point and the cut-out point are determined on selecting an actuating button "IN" 1003 and an actuating button "OUT" 1004 on the control panel, as shown in FIG. 2.

The recording and/or reproducing apparatus includes, on a control panel 1012, an actuating button "PLAYER" 1005 for selecting the reproducing side, an actuating button "RECORDER" 1006 for selecting the recording side, an actuating button "EXT" 1007, actuating buttons "TAPE" 1008, 1010 and actuating buttons "DISC MASTER" 1009, 1011 for specifying recording mediums selectable on the playback and recording sides, as shown in FIG. 3.

For example, each actuating button is substantially square-shaped and is illuminated when thrust.

It is noted that the an actuating button "EXT" 1007 is associated with signals from outside (external signal) and the actuating buttons "TAPE" 1008, 1010 are associated with a tape provided in the inside (internal tape), while the actuating buttons "DISC MASTER" 1009, 1010 are associated with a hard disc provided in the inside (internal hard disc). The actuating buttons 1007, 1008, 1009 are arranged on the control panel as a button group associated with the actuating button "PLAYER" 1005, while the actuating buttons 1010, 1011 are arranged on the control panel as a button group associated with the actuating button "RECORDER" 1006. Thus, for example, the actuating buttons "DISC MASTER", "TAPE" and "EXT" being illuminated indicates selection of the internal hard disc, internal tape and external signals, respectively.

If, for example, the external signals and the internal hard disc are selected on the playback side and on the recording side, respectively, to perform the editing operation, the following operations are executed:

If the external signals are used on the editing playback side, the actuating button "PLAYER" 1005 and the actuating button 1007 are thrust simultaneously. If the internal hard disc is used on the recording side, the actuating button "RECORDER" 1006 and the actuating button 1010 "DISC MASTER" are thrust simultaneously. This illuminates the actuating button "EXT" 1007 on the reproducing side and actuating button 1010 "DISC MASTER" 1010 on the recording side.

In this state, only the the actuating button "PLAYER" 1005 is thrust to set the editing point on the playback side. Similarly, only the actuating button "RECORDER" 1006 is thrust to set the editing point on the recording side. For example, the actuating button "IN" 1003 and the actuating button "OUT" 1004 shown in FIG. 14 are actuated to set the cut-in and cut-out points.

The above-mentioned actuating buttons enable various processing operations, such as data editing.

It is noted that reduction in size of electronic equipments is crucial in that portability is thereby improved. Since the recording and/or reproducing apparatus has the above-mentioned control panel on a portion of the casing, this control panel needs to be reduced in size simultaneously for miniaturization of the apparatus itself. In such case, it is necessary to arrange actuating buttons enabling a wide variety of operations within a limited space.

Recently, an A/V server employing a random access memory such as a hard disc has been proposed. In general, the AN server is used extensively for broadcast operations. If the AN server is used for broadcast operations, sufficient data reliability needs to be guaranteed. To this end, a so-called RAID (Redundant Array of Inexpensive Discs)

structure, in which plural HDDs (hard disc drives) are arranged side-by-side, is used.

Also, multiple channels for the broadcast equipments recently have been in use for realization of digital television broadcasting. In order to cope with this, the AV server is configured for inputting/outputting plural channels simultaneously. That is, a sole AV server realizes the functions of plural VTRs in contradistinction from other VTRs (video tape recorders).

In keeping up with increase in the number of channels, an equipment for controlling the AV server tends to be larger in scale in an unprecedented fashion. A large-scale system, centered about the AV server, constructed by, for example, a control PC or plural PCs for application, usually needs to be provided for controlling the AV server.

In recent broadcasting stations, this AV server is demanded to be arranged in a limited space, such as in a relaying car. In addition, the functions played by the control PC or the application PC configured for controlling the AV server are requested to be loaded on the AV server itself.

In realizing these functions by the AV server, it may be contemplated to provide an actuating control button on the entire surface of the AV server. In the current state of the art, the size of the casing of the AV server itself is fixed to a certain extent, it is extremely difficult to provide actuating buttons configured for accommodating the various functions in their entirety.

Also, level meters of audio data inputted/outputted to or from the AV server are displayed to determine the audio level with which the audio data is to be outputted for editing or transmission. If, in such case, a display area is provided on the front side of the above-mentioned AV server, it is extremely difficult to display the entire input/output of the plural channels in consideration of the casing size. In particular, in the digital TV it is proposed to send out the speech over eight channels, such that there is posed a problem in displaying the level meters of the audio data so that eight channels are associated with each of the AV server channels.

If the totality of the channels could be displayed, the display area on the AV server casing is limited, in consideration of its size, so that the display of the entire data inputted or outputted to or from the respective channels of the AV server necessarily becomes smaller in size because a variety of displays such as displays of data inputted to or outputted from the AV server or displays on the input/output channel need to be made on the display area in addition to the audio data.

There is also raised a problem that, since the display area is reduced and hence the discrimination of the display of the selected channel becomes difficult, the channel discriminated in a mistaken fashion is changed even if the setting contents of the respective channels are desired to be changed.

Moreover, if the size of the display area is increased to facilitate the recognition of the contents or the audio level of the respective channels, it is necessary to provide a variety of buttons, adjustment volumes or the above-mentioned actuating buttons in order to realize the above-mentioned functions of the AV server, as a result of which there is left no space in which to mount these buttons.

SUMMARY OF THE INVENTION

It is therefore an object of the present invention to provide a data recording and/or reproducing apparatus having actuating buttons or adjustment volumes which enable a wide variety of processing operations despite the limited operating space.

It is an object of the present invention to provide a data recording and/or reproducing apparatus that is able to display levels of plural audio data or to display various other data on a limited display area without detracting from viewability.

In one aspect, the present invention provides a data recording and/or reproducing apparatus including recording and/or reproducing means for recording and/or reproducing data for a non-linear accessible recording medium, at least one input port and at least one output port, with the input port and the output port time-divisionally accessing the recording and/or reproducing means to process the data inputted to the input port to output the processed data to the recording and/or reproducing means, the data reproduced from the recording and/or reproducing means being processed by and outputted from the output port. The apparatus further includes a port actuation button for selecting the input and output ports, an actuation selection button for selecting recording or playback for the input port or the output port as selected by the port actuation button, and a controller for performing control so that the recording operation or the playback operation as selected by the actuation selection button will be executed by the input port or the output port as selected by the port actuation button.

In another aspect, the present invention provides a port actuation method for a data recording and/or reproducing apparatus including recording and/or reproducing means for recording and/or reproducing data for a non-linear accessible recording medium, at least one input port and at least one output port, with the input port and the output port time-divisionally accessing the recording and/or reproducing means to output data inputted to the input port to the recording and/or reproducing means, the data outputted from the recording and/or reproducing means being inputted to the output port and outputted therefrom. The port actuation method includes a first step for selecting the input port and/or the output port, a second step for selecting whether a recording operation is to be performed or a reproducing operation is to be performed on the input port or the output port selected by the first step and a third step for performing control for causing the recording operation or the reproducing operation as selected by the second step to be performed by the input port and/or the output port as selected in the first step.

In still another aspect, the present invention provides a data recording and/or reproducing apparatus including recording and/or reproducing means for recording and/or reproducing data for a non-linear accessible recording medium, at least one input port and at least one output port, with the input port and the output port time-divisionally accessing the recording and/or reproducing means, the input port outputting the data inputted to the recording and/or reproducing means and the output port being fed with the data reproduced by the recording and/or reproducing means to output the data. The apparatus further includes level detection means for detecting the level of audio data contained in data inputted to and outputted from the input and output ports and display means fed with level data detected by the level detection means for displaying the audio level inputted to and outputted from the input and output ports based on the level data. The port selected by the port selection switches in a manner different from the audio level of the other non-selected port.

In still another aspect, the present invention provides an audio level displaying method for a data recording and/or reproducing apparatus including recording and/or reproducing means for recording and/or reproducing data for a non-linear accessible recording medium, at least one input port and at least one output port, with the input port and the output port time-divisionally accessing the recording and/or reproducing means to output the data inputted to the input port to the recording and/or reproducing means, the data outputted from the recording and/or reproducing means being inputted to the output port. The port actuation method includes a first step for detecting the audio level contained in the data inputted to the input port and to the output port and a second step for displaying the audio level detected at the first step.

In still another aspect, the present invention provides an adjustment volume for an audio level displaying method in a data recording and/or reproducing apparatus including recording and/or reproducing means for recording and/or reproducing data for a non-linear accessible recording medium, at least one input port and at least one output port, with the input port and the output port time-divisionally accessing the recording and/or reproducing means, the input port outputting the input data to the recording and/or reproducing means. The data reproduced from the recording and/or reproducing means is inputted to and outputted from the output port. The apparatus includes storage means for storing pre-set values of the input level of the data inputted to the input data and the output data, port selection means for selecting the input port and the output port, memory position displaying means in the adjustment volume for displaying an adjusted graduated position and control means for reading out the pre-set value stored in the storage means for displaying the pre-set values on the graduated position displaying means on adjusting the input level at the input port and the output port by the adjustment volume and on selecting the input port and the output port by the port selection means.

In yet another aspect, the present invention provides a method for selective display of an adjustment volume in a data recording and/or reproducing apparatus including recording and/or reproducing means for recording and/or reproducing data for a non-linear accessible recording medium, at least one input port and at least one output port, with the input port and the output port time-divisionally accessing the recording and/or reproducing means to output the data inputted to the input port to the recording and/or reproducing means, the data reproduced from the recording and/or reproducing means being inputted to the output port. The selective display method includes a first step of displaying a setting value of a data level inputted to the input port and the output port on a graduated display portion of the adjustment volume, a second step of selecting the input port or the output port and a third step for displaying the setting value inputted to the other port on the graduated display portion of the adjustment volume on selection of the other port at the second step at a data level displayed at the first step on the graduated display portion.

DESCRIPTION OF THE PREFERRED EMBODIMENTS

Figure 1:
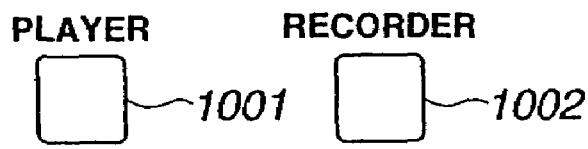
FIG. 1 is a front view showing a "PLAYER" button and an actuation button "RECORDER" provided on a conventional control panel.

Referring to the drawings, a preferred embodiment of the present invention will be explained in detail. In the preferred embodiment, the recording and/or reproducing apparatus of the present invention is applied to an A/V server configured for recording and/or reproducing data containing audio and/or video signals for a non-linear accessible recording medium. The HDD has a so-called RAID (Redundant Array of Inexpensive Discs) structure for maintaining reliability of recorded data. To each input/output processor is allocated a time slot within which the input/output processor accesses the RAID to input/output data. The spedified structure of the A/V server will be explained subsequently.

Figure 4:
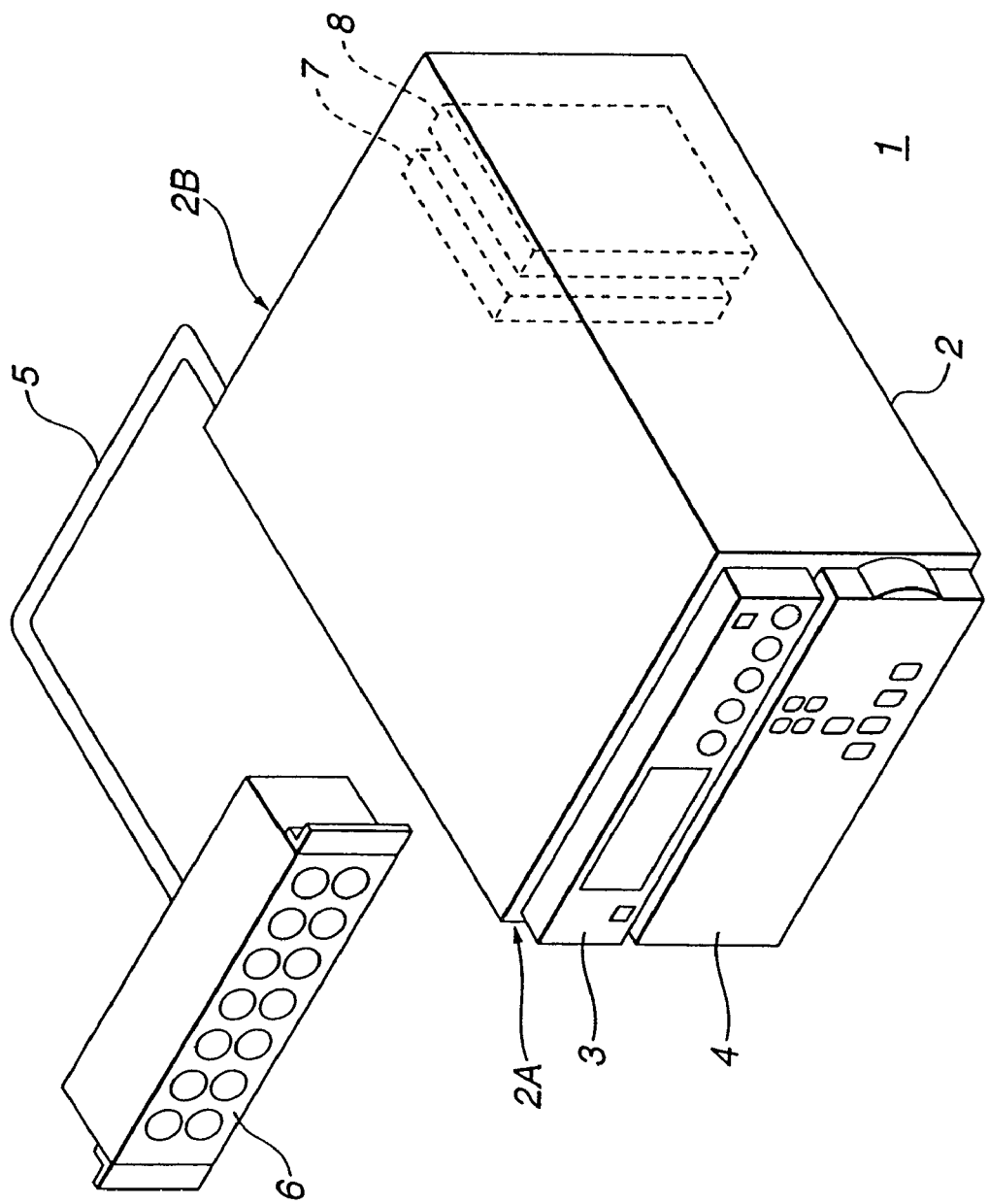
FIG. 4 is a diagrammatic front view showing the structure of an embodiment of a video server according to the present invention.

In FIG. 4, 1 denotes a video server embodying the present invention. On a front side 2A of the casing A are arranged a meter panel 3 and a control panel 4. To a rear surface 2B of the casing 2 is connected an electrical connection unit 6 over a pre-set connection cable 5. The electrical connection unit 6 is made up of a plurality of external connection terminals.

Within the casing 2, there are arranged a plurality of hard disc drives, making up the RAID, and a mother board connected to a variety of data processing boards. To this mother board are connected data processing boards 7 and 8 as input/output processors.

Figure 5:
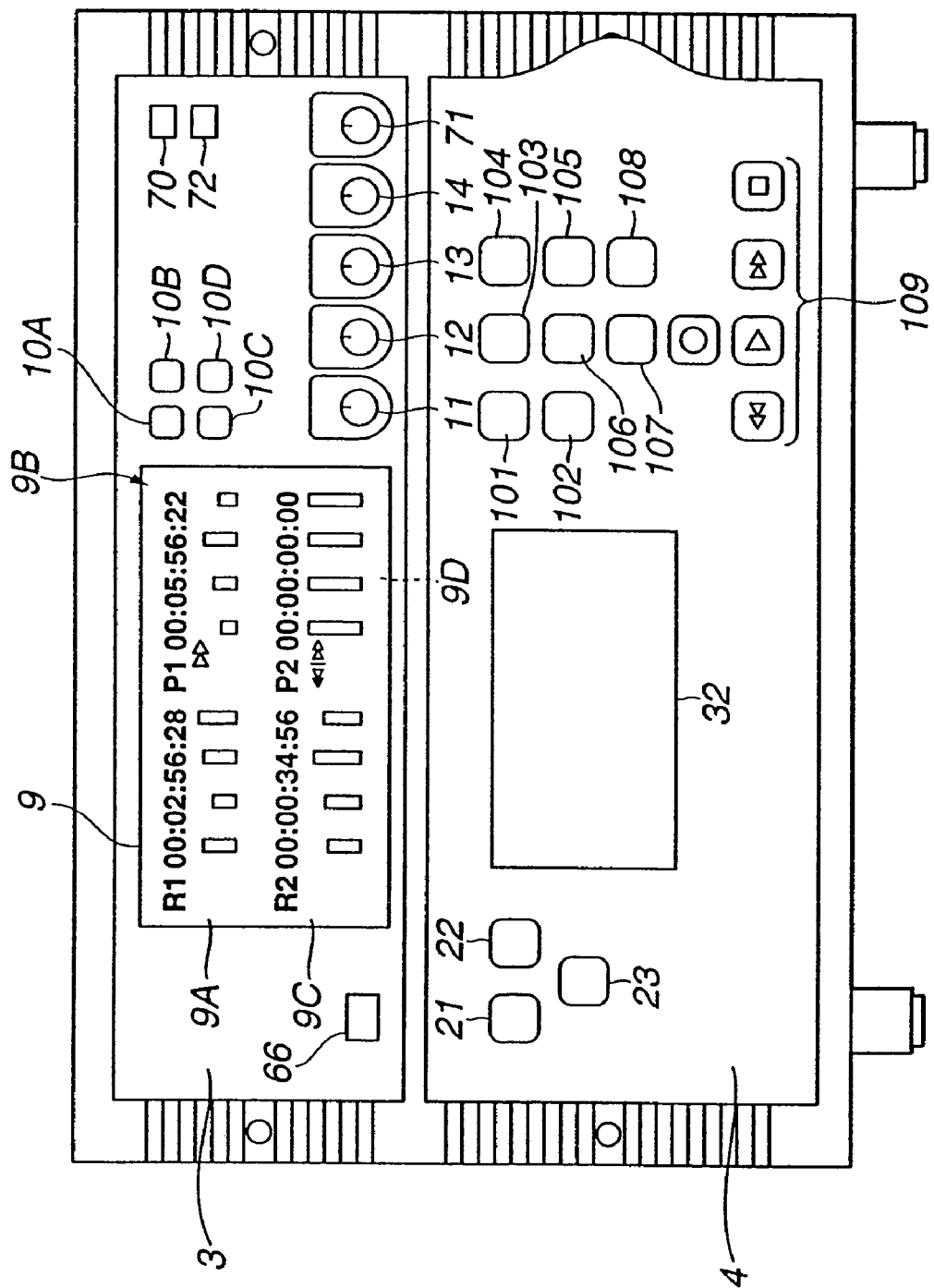
FIG. 5 is a diagrammatic front view showing a meter panel and a control panel.

FIG. 5 shows the meter panel 3 and the control panel 4 of the video server 1 from the front side. On the meter panel 3 is arranged a meter display unit 9 within which there are provided first to fourth meter display areas 9A to 9D associated with the input/output port of the mother board. Within each of the first to fourth meter display areas 9A to 9D, there are provided four bar-shaped level meters.

On the meter panel 3, there are arranged port selection buttons 10A to 10D capable of selecting respective input/output ports and four volumes 11 to 14 associated with the four level meters. The input/output processor is herein termed an input/output port. The port for performing only the input processing and the port for performing only the output processing are termed an input port and an output port, respectively.

If, in the meter panel 3, the port selection buttons 10A to 10D are thrust, the audio level of the audio data of the four channels to be inputted or outputted via the selected input/output port is displayed on the four level meters in the associated first to fourth meter display areas 9A to 9D, at the same time as a variety of the information, such as time codes previously annexed to the speech data, are displayed in the associated first to fourth meter display areas 9A to 9D.

In this meter panel 3, the audio level can be adjusted by the associated volumes 11 to 14.

The control panel 4 is arranged on the surface of the casing, and includes actuating buttons 101 to 108 and actuating buttons 107, 108 for switching these plural actuating buttons 101 to 108. The recording and/or reproduction for the selected port is performed by actuating these actuating buttons.

Figure 6:
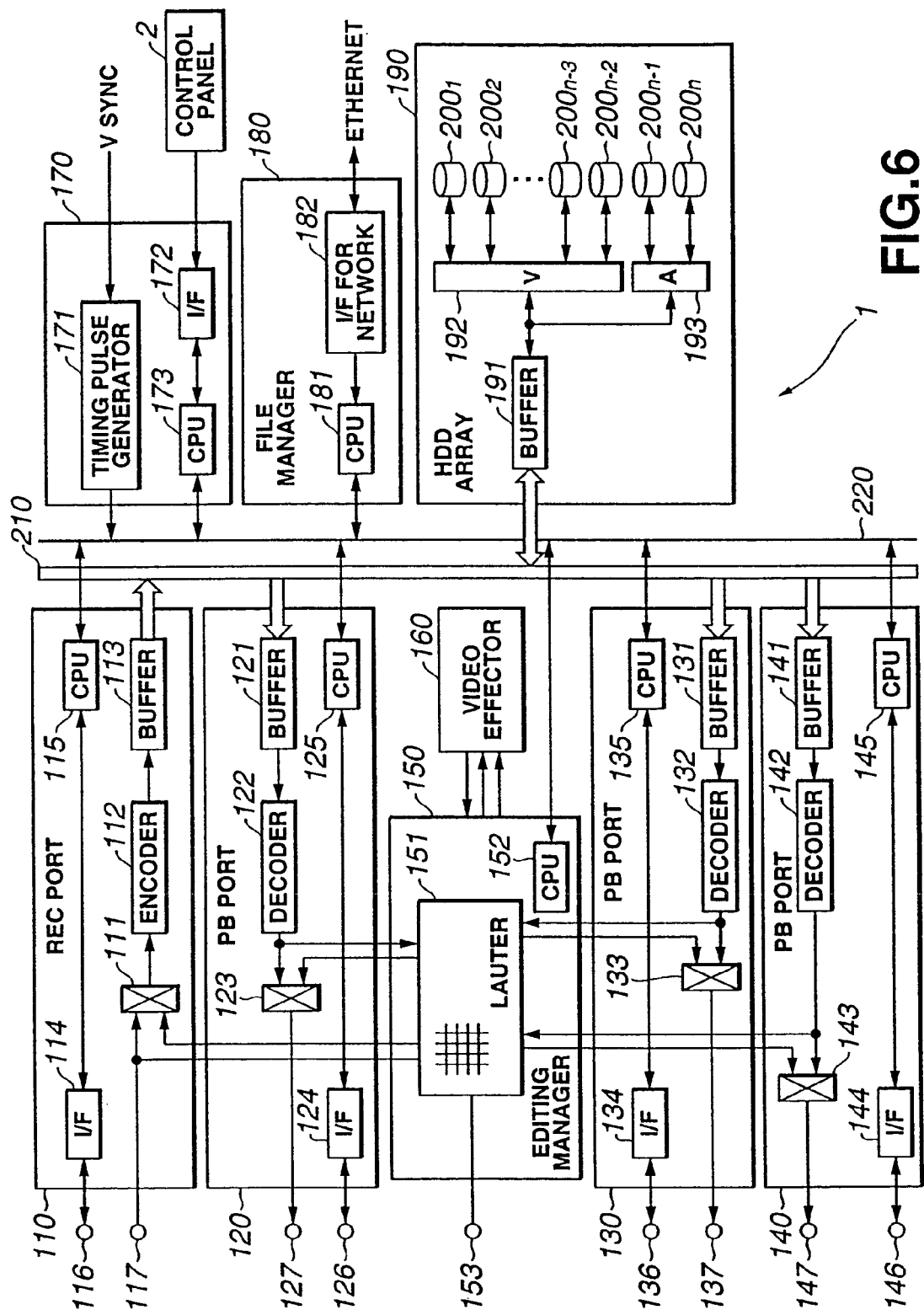
FIG. 6 is a block diagram showing a structure of an A/V server.

A specified structure of the interior of the video server 1 is explained. Referring to FIG. 6, these ports include a port 110 for recording data inputted from outside on the HDD and input ports 120, 130 and 140 for outputting the data recorded on the HDD to outside. The input port 110 inputs data to the HDD via an input encoder 112 which encodes or serial/parallel converts input data, while the reproducing ports 120, 130 and 140 outputs the data from the HDD via decoders 122, 132, 142 which parallel/serial converts and decodes the data. These input and output ports will be explained subsequently.

The control panel 4 selects and controls the output ports 120, 130 and 140 for reproducing processing, the input port 110 for recording processing, or an external equipment connected externally to the video server 1. The external equipment may, for example, be a VTR adapted for recording video signals on a video tape.

The video server 1, shown in FIG. 6, includes a recording port (REC port) as an input processing unit, playback ports (PB ports) as output processing units 120, 130, 140, an editing manager 150, a video effector 160, a timing manager 170, a file manager 180 and a HDD array (RAID) 190 having plural hard disc drives (HDDs) $200_1, 200_2, \ldots, 200_{n-3}, 200_{n-2}, 2000_{n-1}$ and $200_n$.

The video server 1 includes a data bus 210 for performing data transfer between the input port 110, output ports 120, 130, 140 and the HDD array 190, and a control bus 220 for transferring control signals used for controlling various components.

The structure of various portions of the video server 1 is explained in detail.

The input port 110 includes a selector 111, an encoder 112, a buffer 113, an I/F 114, a CPU 115, a remote signal input terminal 116 and an external input terminal 117.

The selector 111 is selection means for selecting input data and outputting the selected input data, and is connected to an external input terminal 117 and to an output of a lauter 151 of the editing manager 150. Specifically, the selector 111 selects one of a signal from the external input terminal 117 or a signal from the lauter 151 of the editing manager 150 to output the selected signal to the encoder 112. For example, the selector 111 is fed with digital audio and/or video signals from the external input terminal 117.

Meanwhile, an input signal from the external input terminal 117 is inputted to the selector 111 and to the editing manager 150.

The encoder 112 encodes and serial/parallel converts an output signal from the selector 111 to output the resulting signals. The encoding is by MPEG (Moving Picture Experts Group) system on input signals. It is noted that encoding needs to be performed only as necessary such that non-encoded signals may be outputted from the encoder. In the following explanation, it is assumed that the input signals are encoded and outputted in the encoded state by the encoder. The compressed data from the encoder 112 are inputted to the buffer 113.

The buffer 113 is storage means for transiently storing the compresssed data outputted by the encoder 113. The compressed data is transiently stored by this buffer 113 and sent over the data bus 112 to the HDD array 190 in accordance with a scheduling. The scheduling is the processing of allocating time slots to the CPU of each port from a timing pulse generator 171 and of running each port within this time slot.

The I/F 114 is an interface for remote signals inputted from the input terminal 116. For example, the remote signals are command signals transmitted from the external equipment for controlling the recording port 110

The CPU 115 is control means for controlling various portions of the recording port 110. The CPU 115 controls various portions of the REC port 110 by command signals inputted from the I/F 114 or the control bus 220.

The output port 120 is configured as an outputting processor for outputting the data recorded in the HDD array 190 to outside. This output 120 includes a buffer 121, a decoder 122, a selector 123, an I/F 124, a CPU 125, a remote signal input terminal 126 and an external output terminal 127.

The buffer 121 is storage means for transiently storing data transmitted from the HDD array 190 over a data bus 210. The data from the HDD array 190 is inputted to the buffer 121 over the bus 210 within the above-mentioned time slot.

The decoder 122 converts the output parallel data from the buffer 121 into serial data to decodes the encoded compressed data. The signals decoded by the decoder 122 are also inputted to the editing manager 150.

It suffices if the decoder 122 performs the processing reversed from that performed by the encoder 112. Thus, if no encoding is performed in the encoder, the corresponding decoding is not done in the decoder 122.

The selector 123 is data selection means configured for selecting data outputted to outside. Specifically, the selector 123 is connected to an output of the decoder 122 and to an output of the lauter 151 and selects the signal from the decoder 122 or the signal from the lauter 151 to output the selected signal to the external output terminal 127.

The I/F 124 is an interface for remote signals inputted from the remote signal input terminal 126. The remote signal may, for example, a command signal sent from the external equipment for controlling the output port 120.

The CPU 125 is control means for controlling various portions of the output port 120. The CPU 125 controls various portions of the output port 120 by e.g., command signals inputted via the I/F port 124 or over control bus 220.

The output ports 130, 140 are arranged similarly to the output port 120 configured as described above.

That is, the output port 130 includes a buffer 131 for transiently storing data from the HDD array 190, a decoder 132 for decoding compressed data from the buffer 131, and a selector 133 for selecting one of the signal from the decoder 132 and the signal from the lauter 151 and for outputting the selected signal to an external output terminal 137. The output port 130 also includes an I/F 134 for remote signals, inputted from the remote signal input terminal 134, and a CPU 135 for controlling various portions of the output port 130 by e.g., command signals.

The output port 140 includes a buffer 141 for transiently storing data from the HDD array 190, a decoder 142 for decoding compressed data from the buffer 141 and a selector 143 for selecting one of the signal from the decoder 142 and the signal from the lauter 151 to output the selected signal to the external output terminal 147. The output port 140 also includes an I/F 144 operating as an interface such as remote signals inputted from a remote signal input terminal 146 and a CPU 145 for controlling the various portions of the output port 140 by e.g., command signals.

Similarly to the output port 120, the output ports 130, 140 also output the decoded signals from the decoder to the editing manager 150. The data is outputted from the output ports 130, 140 to the editing manager 150 when cut-editing in the lauter 151 of the editing manager 150 or when performing special effect processing (effecting) by a video effector 160.

The editing manager 150 inputs/outputs signals in the input port 110 and in the output ports 120, 130, 140 to the lauter 151 adapted to perform cut editing, while inputting/outputting the signals for the video effector 160.

The editing manager 150 is constituted by the lauter 151, CPU 152 and an external output terminal 153, and is provided in order to perform editing on data inputted from the selector of each port. The data outputted from the lauter 151 is outputted to the selector of each port.

The lauter 151 selectively switches data at the respective ports 110, 120, 130, 140 to perform cut editing, or achieves data input/output between the ports 110, 120, 130, 140 and the video effector 160.

For example, the lauter 151 includes plural selectors by which it performs cut editing or outputs data to the video effector 160. The lauter 151 outputs picture data processed for special effect by the video effector 160 to pre-set ports 110, 120, 130, 140.

Specifically, the lauter 151 switches the input/output signal and, if it is necessary to perform special effect processing, such as keying or transition, at e.g., switching points, the lauter changes over the switching points, under control by the CPU 152, to send the resulting signals to the video effector 160.

An external output terminal 153 is used for outputting, a picture cut-edited by the lauter 151 or processed for special effect by the effector 160 to a monitor, not shown. A picture edited by the lauter 151 can be checked on the monitor based on an output from the external output terminal 153.

The CPU 152 is control means for controlling various portions of the editing manager 150. The CPU 152 also has the functions as main control means for controlling the CPUs 115, 125, 135, 145 of the ports 110, 120, 130, 140. Since the CPU 152 is able to control the CPUs 115, 125, 135, 145 of the ports 110, 120, 130, 140 in this manner, it becomes possible to perform editing processing which controls the plural ports simultaneously.

By this editing manager 150, the following processing becomes possible:

The editing manager 150 selects the picture data, decoded by the output ports 120, 130, 140, and outputs the selected data to the video effector 160. The editing manager 150 then outputs the picture data, edited by the video effector 160, to the encoder 112 of the recording port 110. The edited picture data is decoded in this manner in the encoder 112 and recorded on the HDD 200.

The video effector 160 performs special effect processing using plural input data. Specifically, the video effector 160 performs special effect processing, such as keying, transition or picture-in-picture (PinP) on picture signals inputted to the editing manager 150.

The timing manager 170 includes a timing pulse generator 171 for generating timing pulses, based on which time slots are allocated to the CPUs 115, 125, 135, 145 of the respective ports 110, 120, 130, 140.

The timing manager 170 includes a CPU 173, a control panel 4 and an I/F 172 which is an interface for the CPU 173. The CPU 173 performs various control on control signals from the control panel 4 inputted via this I/F 172. The control panel 4 is a UI (user interface) acted on by a user to generate corresponding control signals.

Figure 2:
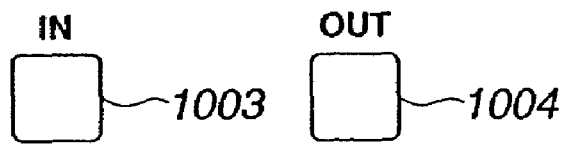
FIG. 2 is a front view showing an "IN" button and an actuation button "OUT" provided on a conventional control panel.
Figure 3:
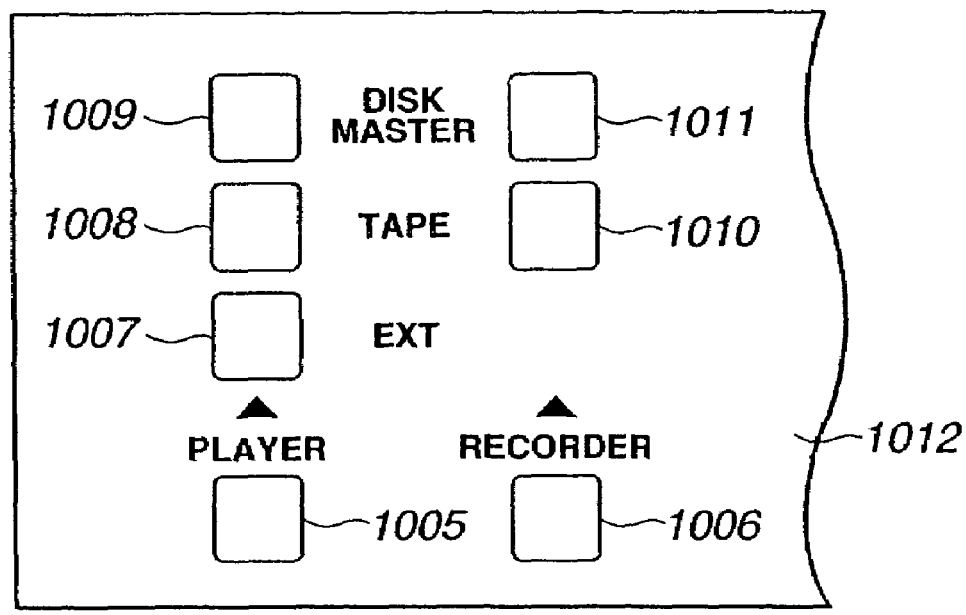
FIG. 3 shows an exemplary conventional control panel.

The control panel 4 has the aforementioned actuating buttons, specifically, buttons 103 to 106, shown in FIG. 2, and selects the input port 110, output ports 120, 130, 140 or the external equipment responsive to the actuation of the actuating buttons to output control signals to the selected port or external equipment. The processing operations for various portions responsive to these actuating buttons will be explained subsequently.

The control signals are inputted over the control bus 220 to the CPUs 115, 125, 135, 145 of the respective ports 110, 120, 130, 140. The respective ports or the external equipment control various portions by, for example, recording, reproducing or editing signals.

The file manager 180 includes a CPU 181 and an I/F for network 182.

The I/F for network 182 is an interface to the external network. For example, the I/F for network 182 is connected to the Ethernet.

The CPU 181 performs data management based on input signals from the I/F for network 182. That is, the file manager 180 controls various portions based on control signals transmitted from the network. In a memory, not shown, of the file manager 180, there is stored the file system information on management of files recorded on the HDDs $200_1$ to $200n$. If control signals instructing recording and/or reproduction of a pre-set file are inputted from outside, the file manager 180 accesses a memory having stored therein the file system information to constitute the file system. The file manager 180 can access a file by having reference to a leading address of each file.

The HDD array 190 includes a buffer 191, plural HDDs $200_1$, $200_2$, ..., $200_{n-3}$, $200_{n-2}$, $200_{n-1}$ and $200_n$ a picture data write/readout processor 192 and an audio data write/readout processor 193.

The buffer 191 transiently stores data when performing data transfer between it and the data bus 220. The data from the HDDs $200_1$, $200_2$, ..., $200_{n-3}$, $200_{n-2}$, $200_{n-1}$ and $200_n$ are buffered in the buffer 191 and subsequently outputted on the data bus 210 in accordance with the scheduling.

The picture data write/readout processor 192 performs picture data writing and/or readout on the HDDs $200_1$, $200_2$, ..., $200_{n-3}$ and $200_{n-2}$. For example, the picture data write/readout processor 192 performs selective data readout and writing on the HDDs $200_1$, $200_2$, ..., $200_{n-3}$ and $200_{n-2}$.

The audio data write/readout processor 193 performs speech data writing and readout on the HDDs $200_{n-2}$ and $200_n$. For example, the audio data write/readout processor 193 selectively reads out and writes data for the HDDs $200_{n-1}$ and $200_n$ for audio data.

Meanwhile, the HDDs $200_1$, $200_2$, ..., $200_{n-3}$, $200_{n-2}$, $200_{n-1}$ and $200_n$ are plural HDDs arrayed in parallel as shown. The HDDs $200_1$, $200_2$, ..., $200_{n-3}$, $200_{n-2}$ for picture recording are of the so-called RAID3 structure, while the HDDs $200_{n-1}$ and $200_n$ for audio data are of the so-called RAID1 structure.

Meanwhile, the number of the HDDs $200_1$, $200_2$, ..., $200_{n-3}$, $200_{n-2}$, $200_{n-1}$ and $200_n$, connected to the picture data write/readout processor 192 and to the audio data write/readout processor 193, can be modified depending on the data volume.

The foregoing is the structure of various components of the video server 1. In this video server 1, the port 110 operates as an input of a channel, whilst the output ports 120, 130, 140 operate as outputs of three channels. That is, if the input port 110 is selected by an actuating button on the control panel 4, the server can be operated as a recording device in the recording device mode. If the output ports 120, 130, 140 are selected, the server can be operated as a reproducing device in the reproducing device mode.

The control panel 4 will be explained in detail with reference to FIGS. 7 to 17.

Figure 7:
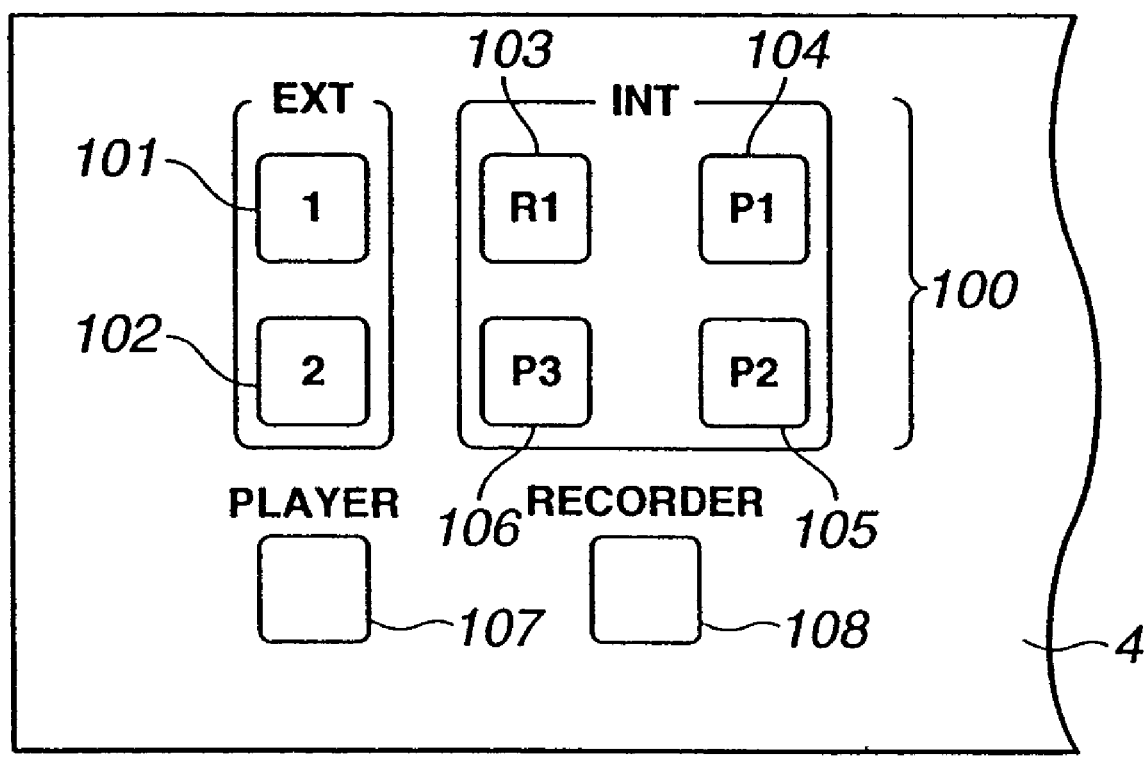
FIG. 7 is a front view showing a control panel provided on the A/V server embodying the present invention.

FIG. 7 shows, to an enlarged scale, the actuating buttons 101 to 108 used for actuating input/output ports of the control panel 4 and the external equipment shown in FIG. 5.

The actuating buttons 101 to 108 are formed on the control panel 4, which is configured for outputting control signals associated with the buttons subject to thrusting of these actuating buttons. Moreover, the actuating buttons 101 to 108 are switched between the illuminated and extinguished states responsive to the thrusting actuation. For example, the actuating buttons 101 to 108 are constructed as illuminated type buttons in which the illuminated states indicated the selected states.

Figure 8:
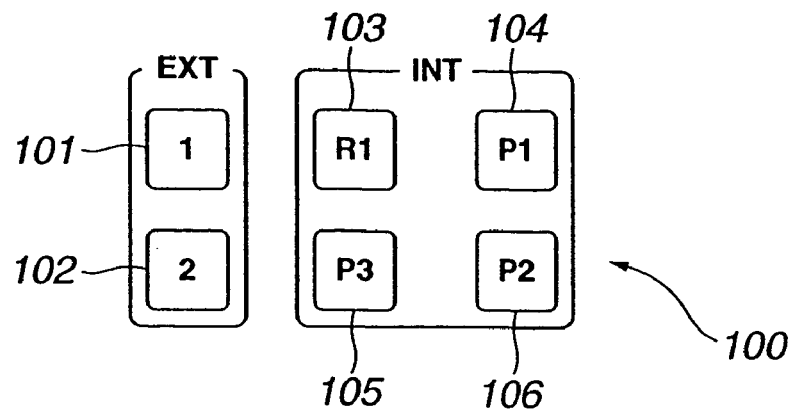
FIG. 8 is a front view showing a structure of a port selection button set of the control panel.
Figure 9:
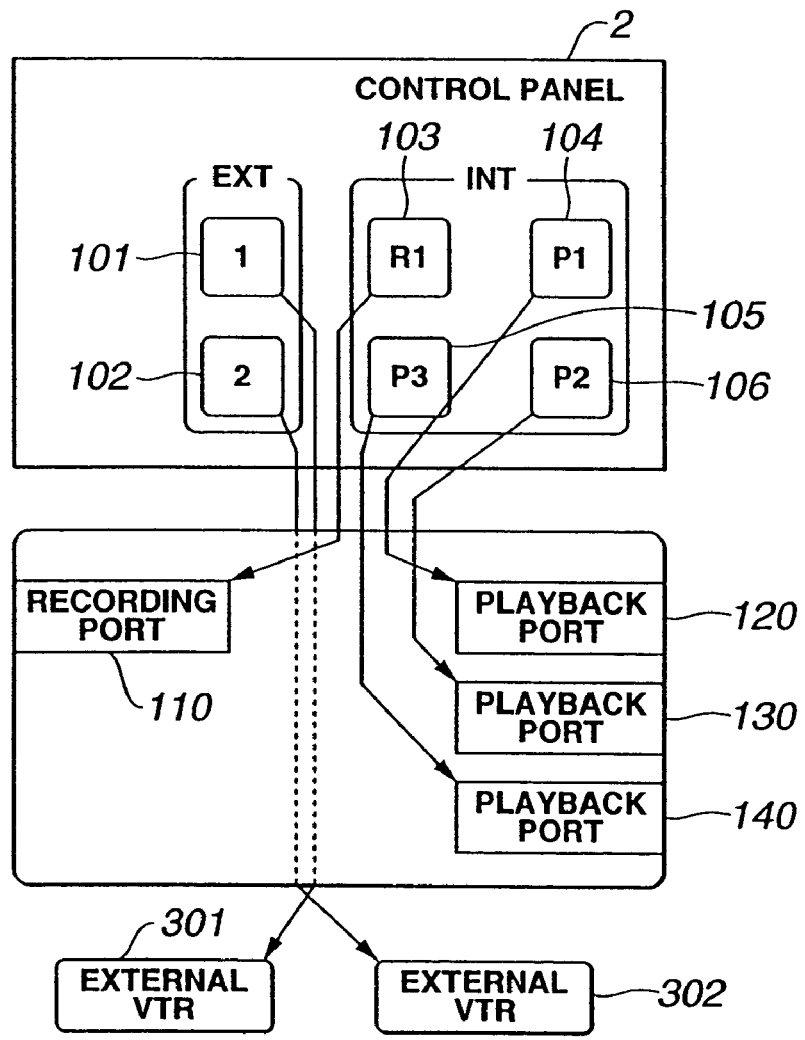
FIG. 9 shows the correspondence between the actuating buttons of the port selection button set and the ports and an external VTR.

Referring to FIGS. 8 and 9, the actuating buttons 101 to 106 making up a port selecting button group 100 will be explained in detail.

In FIG. 8, the actuating buttons 101, 102, arranged on a portion EXT, are used for selecting an external equipment. That is, if the actuating button "1" 101 or "2" 102 is selected, a corresponding external equipment is selected as an object to which command signal are to be transmitted.

The actuating buttons 103 to 106 are used for selecting the respective ports. That is, if one of these actuating buttons 103 to 106 are selected, the associated ports are selected as being the object to which command signal are to be transmitted.

Meanwhile, the actuating buttons 101, 102 are numbered in association with terminals of the A/V server 1 to which is connected the external equipment. For example, "1", "2" are affixed to the actuating buttons 101, 102 in association with the terminals "1", "2", respectively. The actuating buttons 103 to 106 are numbered in association with the ports such that "R1", "P2", "P3" and "P3" are affixed to the actuating buttons 103, 104, 105 and 106, respectively. For example, the actuating button 106 is associated with external VTRs 301, 302, the actuating buttons 101, 102, 103 are associated with the recording port 110 and the actuating buttons 104, 105, 106 are associated with the playback ports 120, 130, 140, respectively.

That is, the respective actuating buttons are directly coupled to the objects to be acted on such that the actuating buttons are constructed to permit selection of the respective buttons as the operator is conscious of the ports to be in use.

In this structure, it is possible for the operator to perform operations in consciousness of the port resources to make effective utilization of the ports if limited resources are to be used efficiently, such as when a slow-motion picture is reproduced and highlight editing is simultaneously performed at the same time as a live picture is being recorded on a sole recorder.

For example, a conventional UI, such as UI employing a personal computer or a workstation, is configured so that the user will have to be conscious of the respective ports, including external equipments, only to the least extent possible. The reason that the operation is based on the GUI of pasting an optional cut on an arbitrary time axis position. This method operates as effective means in simplifying the operation if a sufficient quantity of recording and playback ports as the resources can be used. However, if a slow-motion picture is reproduced and highlight editing is simultaneously performed at the same time as a live picture is being recorded on a sole recorder, the user needs to be conscious of the limited port resources. In such case, the aforementioned method cannot be said to be effective means.

The respective actuating buttons and the respective ports are associated, such that the respective ports and the external equipments are selected subject to selection of the actuating buttons.

The specified operations on the selected ports and the external equipment are hereinafter explained with reference to FIG. 10. In actuality, the respective buttons are arranged as shown in FIG. 5, however, the following explanation is based on the arrangement of FIG. 7 for simplicity of explanation.

Figure 10:
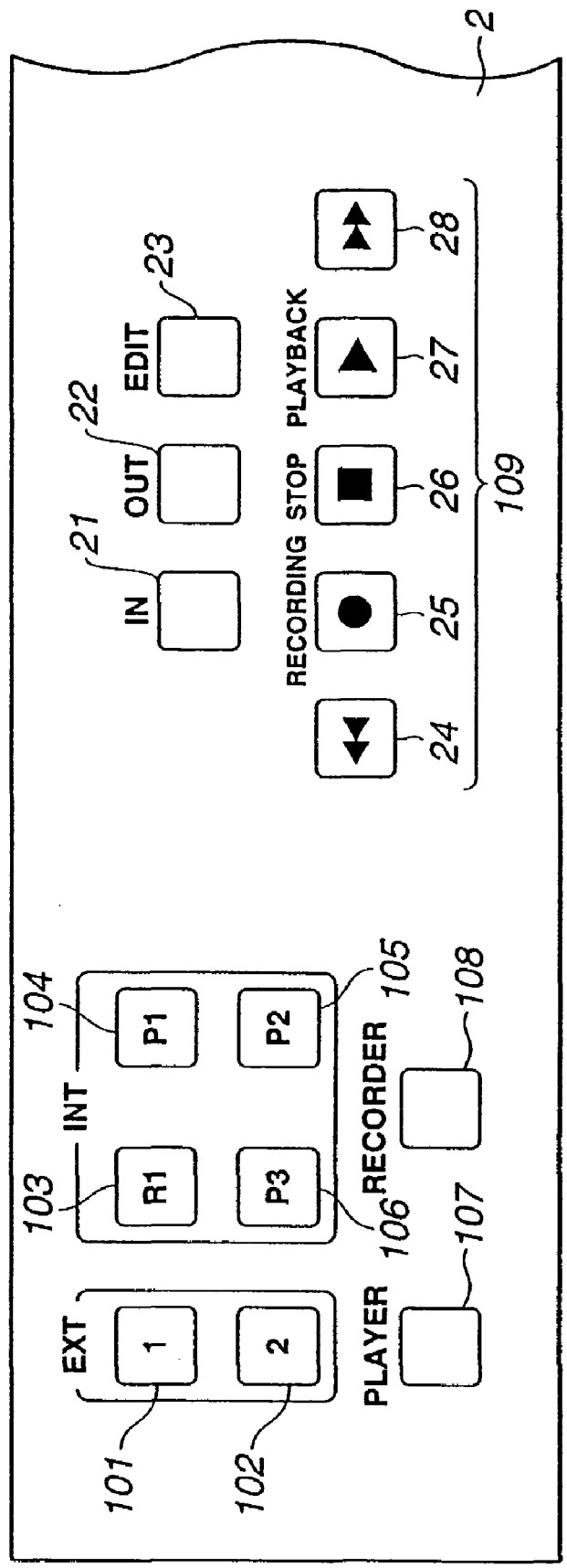
FIG. 10 is a front view showing the structure of a control panel made up of the port selection button set and a port selection button set.

The selected ports and the selected external equipments are run by acting on the actuating buttons 21 to 28 constituting a port controlling button group 109, as shown in FIG. 10.

The actuating button "IN" 21 and the actuating button "OUT" 22 are used when editing data. The actuating button "IN" 21 is used for designating a cut-in point, while the actuating button "OUT" 22 is used for designating a cut-out point. It is noted that the cut-in point and the cut-out point denote an editing point for switching from a certain material to another material and an editing point for switching from the other material to the original material.

The actuating button "EDIT" 23 is an editing start button for starting the data editing. That is, the actuating button "EDIT" 23 is used for starting the editing after designating the cut-in point and the cut-out point.

The actuating button "RECORD" 25 is an actuating button for starting the data recording, while the actuating button "PLAYBACK" 27 is used for starting the data reproduction.

The actuating buttons 24, 28 correspond to a so-called fast feed button and a so-called rewind button in a VTR equipment, respectively.

The actuating button "stop" 26 is used for stopping the processing. For example, the playback processing, recording processing and the editing processing are halted by acting on this actuating button "stop" 26.

By the aforementioned actuating buttons, making up the port controlling button group 109, the control of the processing in the ports and the external equipments selected by acting on the actuating buttons of the port controlling button group is executed.

That is, if the actuating buttons 21 to 28 of the port controlling button group 109 are acted on, the CPUs 115, 125, 135, 145 of the ports 110, 120, 130, 140 or the external equipments 301, 302 as selected to receive command signals corresponding to the actuation transmitted from the control panel 4 to start the control of the various parts based on the command signals.

Figure 11:
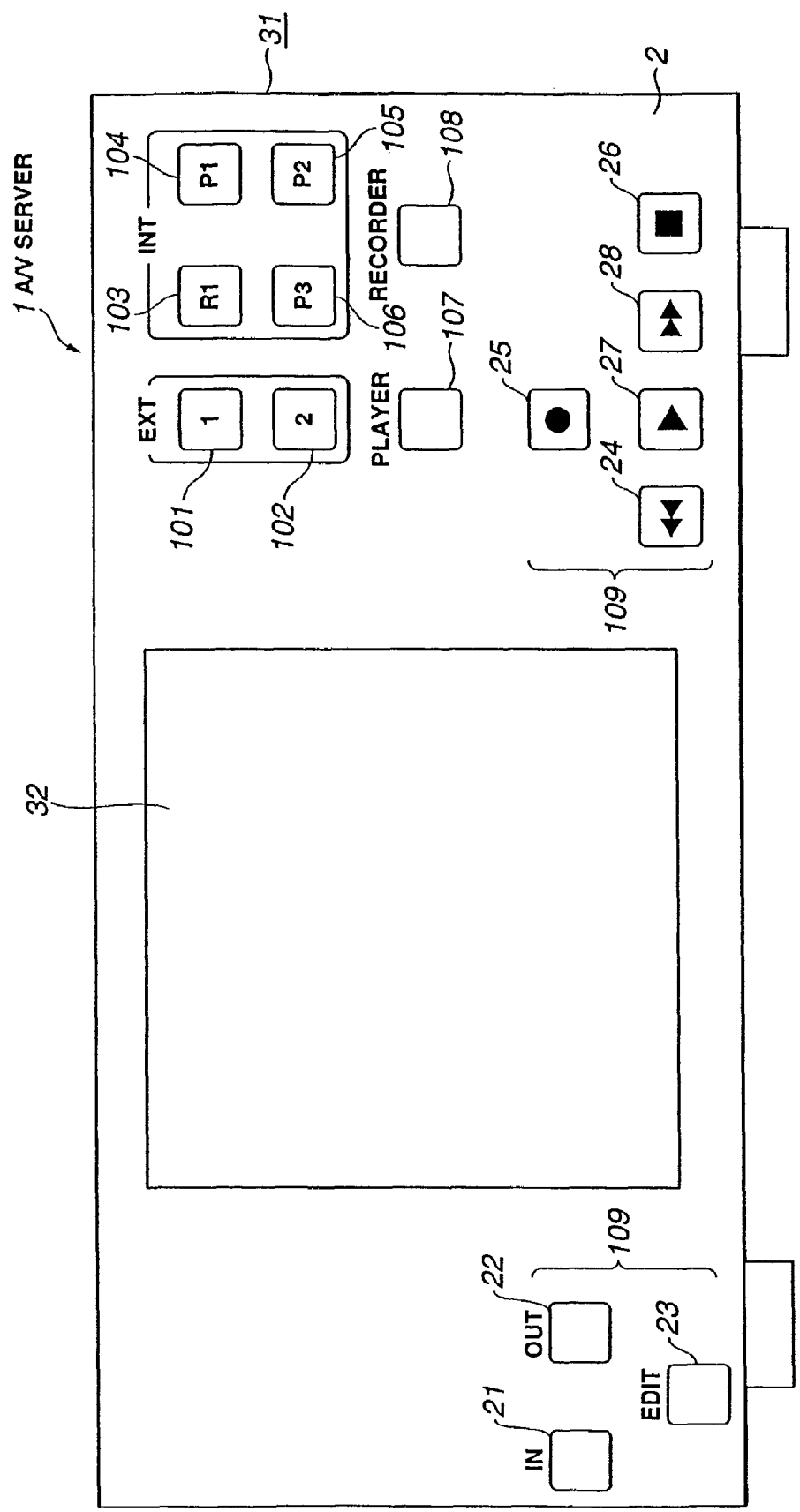
FIG. 11 is a front view showing the a more specified structure of the control panel.

The port selecting button group 100 and the port controlling button group 109 constitute the control panel 4 in the A/V server 1, as shown in FIG. 11.

The control panel 4 of the embodiment shown herein is constructed on the front surface of a substantially box-shaped casing, and includes a display screen 32, port selecting button group 100, actuating buttons 101, 102, port controlling button group 109 and the port control buttons 107, 108, as shown in FIG. 5. The actuating buttons on the control panel 4 are distributed on both sides of the display screen 32. Specifically, the actuating buttons 24 to 28, port selecting button group 100, port control buttons 107, 108, and parts of the port controlling button group 109, that is the actuating buttons 24 to 28, are arranged on the right side of the display screen 32, whilst the actuating button "IN" 21, actuating button "UT" 22 and the actuating button "edit" 23 are arranged on the left side of the display screen 32. It is noted that the display screen 32 serves as display means for demonstrating the various information.

The structure of the control panel 4 is hereinafter explained.

Figure 12:
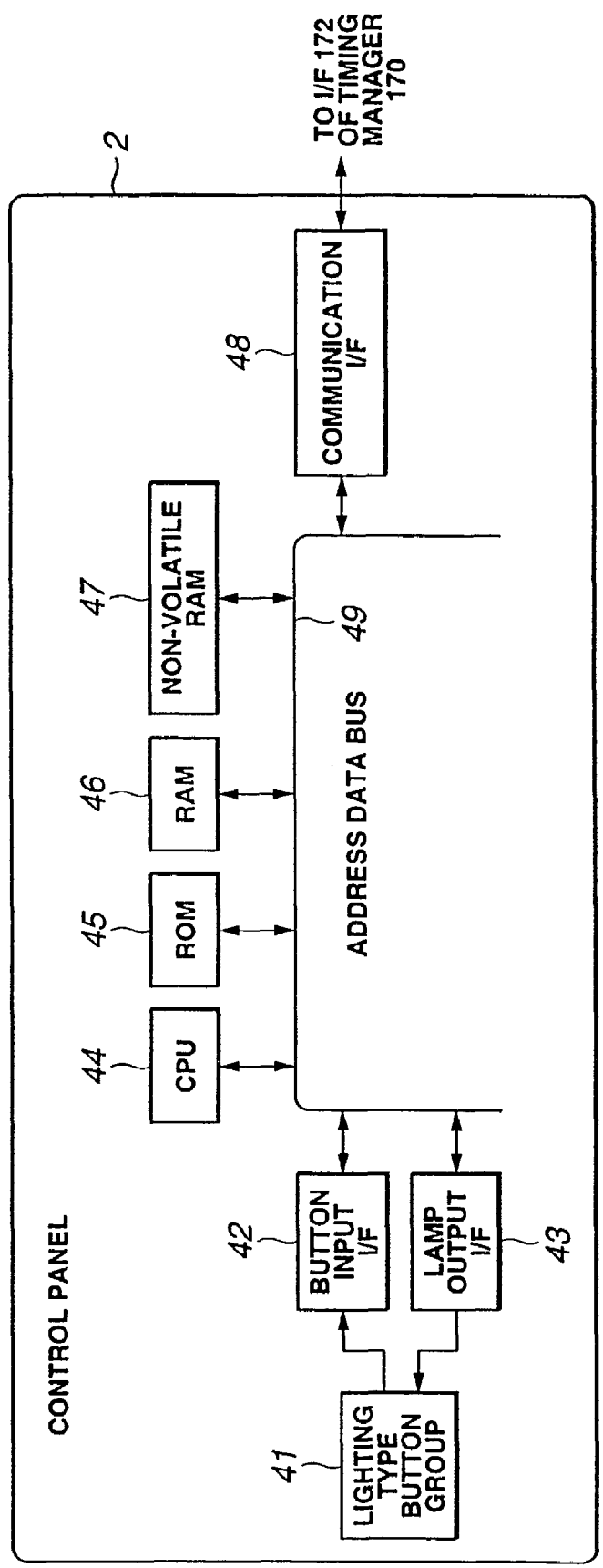
FIG. 12 is a block circuit diagram showing the structure of an internal circuit of the control panel.

Referring to FIG. 12, the control panel 4 is made up of a lit type actuating button group 41, made up of the aforementioned buttons, a button input I/F 42, a lamp I/F 43, a CPU 44, a ROM 45, a RAM 46, a non-volatile RAM 47, and a communication I/F 48. The respective parts are connected to an address and data bus 49, as shown in FIG. 12.

The button input I/F 42 is responsive to the actuation on the actuating buttons to transmit control signals etc to the CPU 44.

The lamp I/F 43 is an interface for lighting the actuating buttons. The ROM 45 is memory means in which programs etc are stored.

The RAM 46 and the non-volatile RAM 47 are memory means for storage of various data used transiently. In the RAM 46 and in the non-volatile RAM 47, the selection states of the actuating buttons and the bind information as later explained are stored.

The communication I/F 48 is an interface for transferring data with the main body unit of the A/V server 1. The communication I/F 48 is connected to the I/F 172 of the timing manager 170 to transfer data such as control signals.

The CPU 44 is control means for controlling various portions of the control panel 4. For example, the CPU 44 controls the various parts based on signals transmitted via the button input I/F 42 responsive to the actuation of the actuating buttons, such as by lighting the actuating buttons acted on.

The processing realized by the A/V server 1, having the control panel 4 constructed as described above, is explained with reference to FIGS. 13 to 15.

Figure 13:
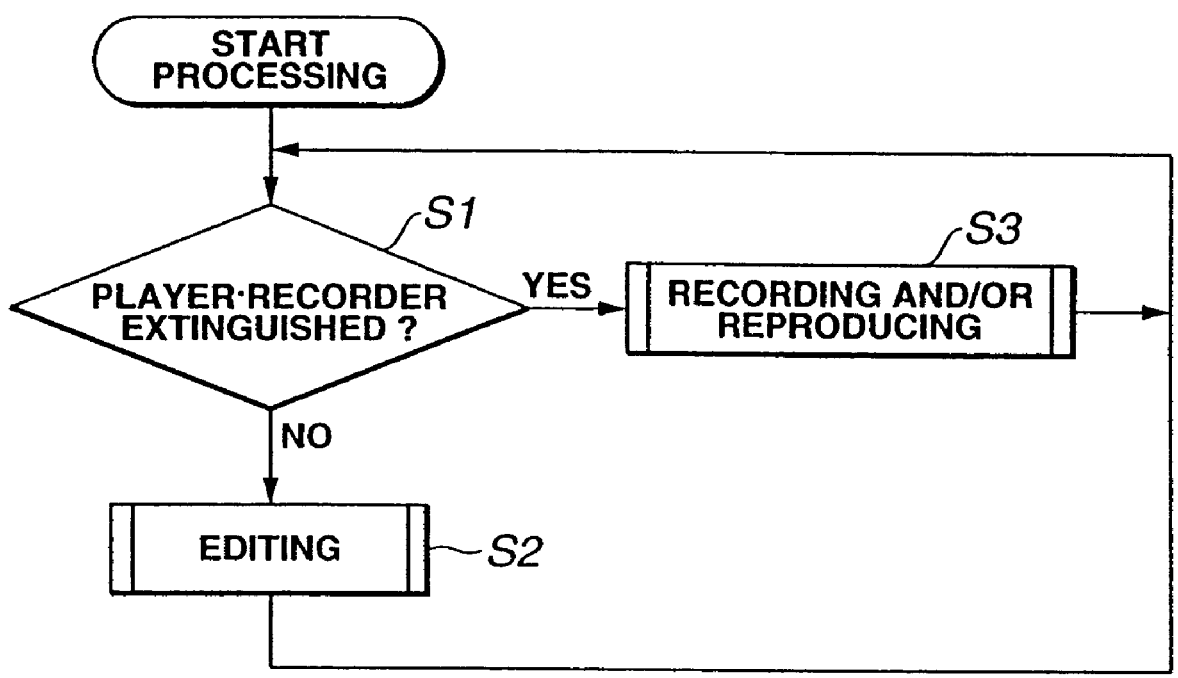
FIG. 13 is a flowchart showing a sequence of operations for the control panel in selecting the processing for recording or the processing for editing.
Figure 14:
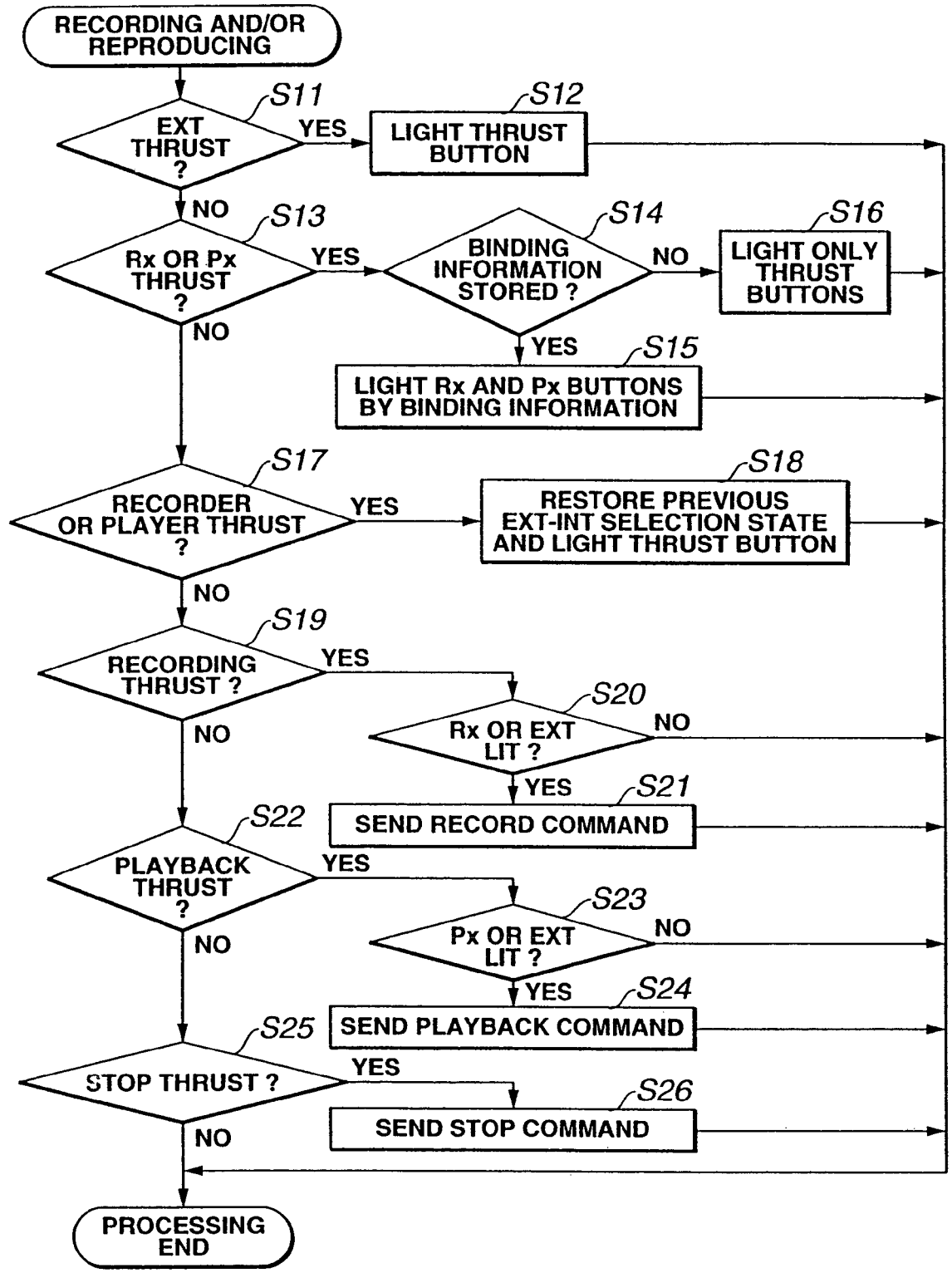
FIG. 14 is a flowchart showing a sequence of processing operations for the control panel in recording and/or reproducing processing.
Figure 15:
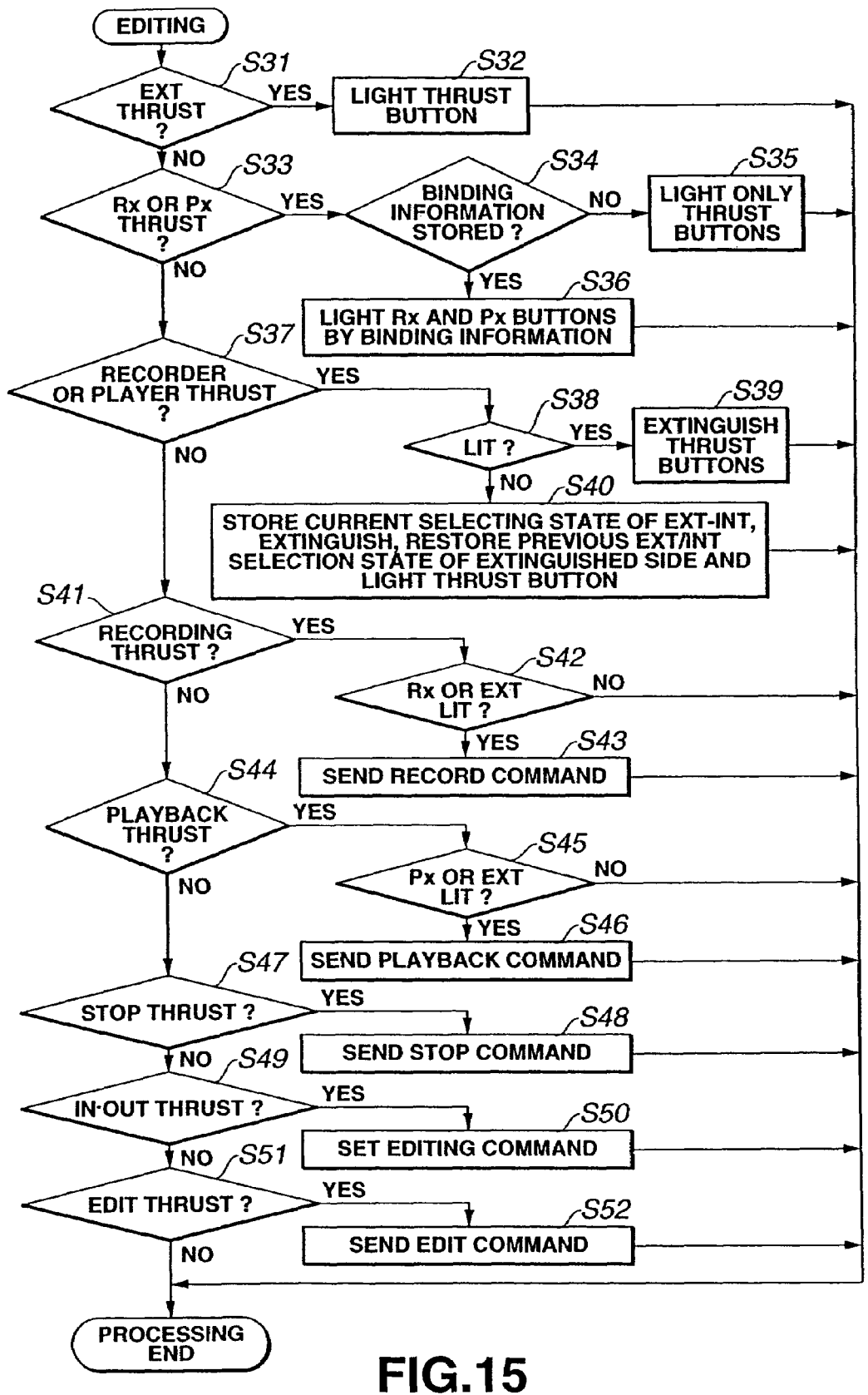
FIG. 15 is a flowchart showing a sequence of processing operations for the control panel in editing processing.

The A/V server 1 has the ports 110, 120, 130, 140 selected by the actuating buttons of the port selecting button group 100. The processing, such as recording and playback of the selected port, can be initiated by the actuating buttons of the port controlling button group 109. FIG. 13 shows the sequence of enabling the recording and/or reproducing processing of the ports 110, 120, 130, 140 and the external equipments 301, 302. FIG. 14 shows the sequence of enabling the recording and/or reproducing processing using a desired port, and FIG. 15 shows the sequence of enabling the editing using a desired port.

The button operation for recording and/or reproducing processing and editing operation processing is executed in accordance with Table 1. That is, the control panel 4 illuminates and extinguishes respective actuating buttons in keeping with the recording and/or reproducing processing and editing operation processing.

TABLE 1

| operating mode | objective | | specifications |
|---|---|---|---|
| non-linear | recording and/or reproduction | condition | both "R" and "P" are off. |
| | | actuation | Thrust and light "Px" or "Rx"; in binding setting, thrust "Px" or "Rx" to light it again. |
| | editing | operation condition | Actuation of lit port is possible. "R" and "P" being lit. |
| | | actuation | If "R" and "P" are off, thrust the button to be actuated to light it; if "R" or "P" only is thrust as it is off, the port selected directly previously is again selected; if desired to change ports, "EXTx", |

TABLE 1-continued

| operating mode | objective | specifications |
|---|---|---|
| | | "Rx" or "Px" is thrust; if "Rx" is selected in "R", "Px" is always bound. |
| | operation | Actuation on port lit as "R" or "P" becomes possible. |

In the above table, "R" denotes an actuating button "RECORDER" 107, "P" denotes an actuating button "PLAYER" 108, "Px" denotes one of the actuating buttons "P1" 103, "P2" 104 and "P3" 105 and "Rx" denotes an actuating button "R1" 103. These expressions are also used in FIGS. 12 and 13.

The binding means automatically selecting the playback port if the recording port 110 is selected by the actuating button 103 in the recording device mode, that is, it means the state of selecting the recording port 110 and one of the playback ports 120, 130 and 140 as a combination. If, in an apparatus type in which the playback ports 120, 130 and 140 and the recording port 110 can be selected and acted on completely independently, as is the present apparatus, only the recording port 110 is selected, the picture and the speech being recorded cannot be monitored simultaneously. Thus, for simultaneous monitoring, one of the playback ports 120, 130 and 140 is acquired by this binding, if the recording port is selected, so that data inputted at the recording port 110 as shown in FIG. 2 will be inputted to the lauter 151 upstream of the port 110, switched by the lauter 151 and outputted to selectors 123, 133, 143 of the playback ports 120, 130 and 140 in the bound state. The selectors 123, 133, 143 select the lauter output to output the selected output to outside. This output is monitored to enable concurrent monitoring. Alternatively, it is possible to output a data from the recording port 110 inputted to the lauter 151 at a terminal 153 on switching to output the data to the monitor. If playback is to follow the recording immediately, the presence of a state of simultaneous selection of the recording and playback ports is convenient in that there is no necessity of selecting the port each time recording or playback is to be executed.

The sequence of supervising the recording and/or reproducing processing of the ports 110, 120, 130, 140 and the external equipments 301, 302 and the editing is explained in detail by referring to FIG. 13 and to Table 1.

It is verified at step S1 in FIG. 13 whether the actuating buttons "PLAYER" and "RECORDER" 107, 108 are extinguished. If both the actuating buttons "PLAYER" and "RECORDER" 107, 108 are extinguished, the recording and/or reproducing processing is started. If one of the actuating buttons "PLAYER" and "RECORDER" 107, 108 is lit, the editing is started. The reason is that, if the recording and/or reproduction and editing of Table 1 are targeted, the condition is that the actuating buttons 107, 108 are extinguished at all times or one of the actuating buttons is lit.

The processing in case the recording and/or reproduction processing is selected is shown in FIG. 15.

At step S11 in FIG. 14, it is verified whether or not one of the actuating buttons 101, 102 is thrust. If the result is YES, the program moves to step S12 and, if otherwise, to step S13.

At step S12, the thrust actuating button "EXT" is lit to terminate the processing. A control signal indicating the thrusting by the actuation of the button group is inputted to the CPU 44 over button input I/F 42 and bus 49 to light the thrust button.

At step S13, it is checked whether or not the actuating button "Rx" 103 or the actuating buttons "Px" 104, 105, 106 have been thrust, because the recording and/or reproducing operation is started on thrusting one of the actuating buttons "Px" and "Rx". If the actuating button "Px" or "Rx" has been thrust, the program moves to step S14 and, if otherwise, to step S17. Which button has been thrust is stored via button input I/F 42 and bus 49 in the RAM 46, as shown in FIG. 8, under control by the CPU 44.

At step S14, it is verified whether or not the binding information has been stored. Whether or not the binding has been stored is detected within the non-volatile RAM 47 shown in FIG. 12.

If the binding information has been stored, the program moves to step S15 and, if otherwise, to step S16.

At step S15, the actuating button "Rx" 103 or the actuating buttons "Px" 104, 105, 106 are lit to terminate the processing. It is noted that, if the binding setting is made as shown in Table 1, and the actuating button "Rx" 103 or one of the actuating buttons "Px" 104, 105, 106 is thrust, the other button in the binding setting state is also lit.

At step S16, only the actuating button "Rx" 103 or one of the actuating buttons "Px" 104, 105, 106 as thrust is lit to terminate the processing. In lighting the buttons, if the processing of lighting the thrust button based on the information stored in the RAM 46 from the CPU 44 shown in FIG. 12 as described above is performed, the thrust button is lit via the bis 49 and the lamp I/F 43.

At step S17, it is checked whether or not the actuating button "PLAYER" or "RECORDER" 107, 108 is thrust. If the actuating button "PLAYER" or "RECORDER" 107, 108 is thrust, the program moves to step S118 and, if otherwise, to step S19.

At step S18, the previous state of selection of the actuating button "EXT" or the actuating button "INT" is restored to illuminate the thrust actuating button "EXT" or the actuating button "INT" to terminate the processing.

At step S19, it is checked whether or not the actuating button "RECORDING" 25 is thrust. If the actuating button "RECORDING" 25 is thrust, the program moves to step S20 and, if otherwise, to step S22.

At step S20, it is checked whether or not the actuating button "103" or the actuating buttons "EXT" 101, 102 is lit. If the actuating button "Rx" 103 or the actuating buttons "EXT" 101, 102 is lit, the program moves to step S21 and, if otherwise, the processing is terminated.

At step S21, the a recording command is transmitted to the port or to the external equipment corresponding to the illuminated actuating button "Rx" 103 or the actuating buttons "EXT" 101, 102 to terminate the processing. The recording command to the associated port is issued by the CPU 44, and is sent from the communication I/F 48 over the bus 49 to the I/F 172 and CPU 174 of the timing manager 170. The CPU 173 inputs this recording command over the internal bus 220 to the CPU 152 of the pointing device 150. The CPU 152 outputs the command to the CPUs 115, 125, 135, 145 of the relevant ports to permit the associated port to perform the recording. That is, the CPU 152 sends the recording command to the external equipment connected thereto over the bus 220, CPUs 115, 125, 135, 145 of the ports 110, 120, 130, 140 and I/Fs 114, 124, 134, 144. Alternatively, the CPU 152 issues the command over the bus 220 and via the CPU 181 of the file manager 180, I/F 182 and over the Ethernet.

At step S22, it is checked whether or not the actuating button "PLAYBACK" 27 has been thrust. If the result of check is YES, the program moves to step S23 and, if otherwise, the program moves to step S25.

At step S23, it is checked whether or not the actuating button "Px" 103 or the actuating buttons "EXT" 101, 102 has been thrust. If the result of check is YES, the program moves to step S24 and, if otherwise, the processing is terminated.

At step S24, a playback command is sent to the port or the external equipment associated with the illuminated actuating button "Px" 103 or the actuating buttons "EXT" 101, 102 to terminate the processing. The flow of transfer of the playback command is the same as the route of the recording command.

At step S25, it is checked whether or not the actuating button "stop" 26 has been thrust. If the result of check is YES, the program moves to step S26 and, if otherwise, the processing is terminated.

At step S26, a stop command is sent to the port or to the external equipment to which the recording command or the playback command has been transmitted at step S21 or step S24 to terminate the processing. The flow of transfer of the stop command is the same as the route of the recording command and the playback command.

By the above-described sequence of operations, the port or the external equipment is selected, and the recording or reproducing processing by the selected port or the external equipment is executed.

The process of the editing and special processing is now explained with reference to FIG. 15.

In the editing processing, it is checked whether or not one of the actuating buttons "EXT" 101 and 102 has been thrust. If the result of check is YES, the program moves to step S32 and, if otherwise to step S33.

At step S32, the actuating buttons "EXT" 101 and 102 are lit to terminate the processing. To this end, the information concerning the thrust button is stored from the button group 41 via button input I/F 42 and bus 49 in RAM 46, as shown in FIG. 12. The CPU 44 then illuminates the thrust button via the bus 49 and the lamp output from the information.

At step S33, it is verified whether or not the actuating button "Rx" 103 or the actuating buttons "Px" 104 to 106 have been thrust. If the actuating button "Rx" 103 or the actuating buttons "Px" 104 to 106 have been thrust, the program moves to step S34 and, if otherwise, to step S37. It is noted that, if the editing is to be performed as shown in Table 1, the actuating button "Rx" 103 or the actuating buttons "Px" 104 to 106 need to be lit.

At step S34, it is checked whether or not the binding information has been stored. If the binding information has ben stored, the program moves to step S35 and, if otherwise, to step S36.

At step S35, the actuating buttons "Rx", "Px" are lit in accordance with the binding information to terminate the processing. The binding herein means combining the input point 110 and one of the output points 120, 130 and 140 and processing data inputted from outside via two input/output points to output the processed data to outside. The information on the sets of the input and output points is stored in the non-volatile RAM 47 shown in FIG. 9, so that, if one of the points is selected, the other is also selected.

At step S36, only the thrust actuating button "Px" 101 or actuating buttons "Px" 102 to 104 are lit to terminate the processing.

At step S37, it is checked whether or not the actuating button "PLAYER" or the actuating button "RECORDER" 107 or 108 is thrust. If the actuating button "PLAYER" or the actuating button "RECORDER" 107 or 108 is thrust, the program moves to step S38 and, if otherwise, to step S41.

At step S38, it is checked whether or not the thrust actuating button "PLAYER" 107 or the actuating button "RECORDER" 108 has been lit. If the thrust actuating button "PLAYER" 107 or the actuating button "RECORDER" 108 has been lit, the program moves to step S39 and, if otherwise, to step S40.

At step S39, the thrust actuating buttons 101, 102, 103, 104 are extinguished to terminate the processing.

At step S40, the state of selection of the current lit actuating buttons "EXT" 101 and 102 or the actuating buttons "INT" 103 to 106 is stored to extinguish the buttons to restore the state of selection of the previous non-lit actuating buttons "EXT" 101, 102 or the actuating buttons "INT" 103 to 106 to illuminate the actuating buttons 101 to 106 as the previous state of selection to terminate the processing. That is, at this step S40, the state of selection of the port selecting button group 100 prior and subsequent to mode switching is stored to realize the processing.

For example, the state of selection of the current actuating buttons "EXT" or the actuating buttons "INT" 103 to 106 is stored in the RAM 46 shown in FIG. 12. The information on the state of selection of the extinguished previous actuating buttons "EXT" 101, 102 or the actuating buttons "INT" 103 to 106 is read from the RAM 46.

At step S41, it is checked whether or not an actuating button "RECORDING" 25 has been thrust. If the actuating button "RECORDING" 25 has been thrust, the program moves to step S42 and, if otherwise, to step S44.

At step S42, it is verified whether or not the actuating button "Px" 103 or the actuating button "EXT" 101 or 102 has been lit. If the result of check at step S42 is YES, the program moves to step S43 and, if otherwise, the processing is terminated.

At step S43, a recording command is transmitted to the port or the external equipment associated with the illuminated actuating button "Px" 103 or the actuating buttons "EXT" 101, 102 to terminate the processing. The processing for the recording command is the same as that for the recording command for the recording and/or reproducing processing. That is, the recording command is inputted from the CPU 44 of the control panel 4 over the buses 49, 220 to the CPU 152 of the timing manager 170 and to the CPU 151 of the input port 110 to execute the recording processing.

At step S44, it is checked whether the actuating button "PLAYBACK" 27 has been thrust. If the actuating button "PLAYBACK" 27 has been thrust, the program moves to step S45 and, if otherwise, to step S49.

At step S45, it is checked whether the actuating button "Px" 103 or the actuating buttons "EXT" 101, 102 has been lit. If the result of check at step S45 is YES, the program moves to step S46 and, if otherwise, the processing is terminated.

At step S46, a playback command is sent to the port or the external equipment corresponding to the illuminated actuating button "Px" 103 or actuating buttons "EXT" 101, 102 to terminate the processing. The processing for the playback command is the same as that for the playback command for the recording and/or reproducing processing. That is, the recording command is inputted from the CPU 44 of the control panel 4 over the buses 49, 220 to the CPU 152 of the timing manager 170 and to the CPUs 125, 135 and 145 of the playback ports to execute the playback processing.

At step S47, it is checked whether the actuating button "stop" 26 has been thrust. If the actuating button "stop" 26 has been thrust, the program moves to step S48 and, if otherwise, to step S49.

At step S48, a stop command is transmitted to the ports 110, 120, 130 or 140 or to the external equipments 301, 302 to which the recording command or the playback command is transmitted at step S43 or S46 to terminate the processing. The processing of the stop command is also the same as that for the above-described recording and/or reproducing processing.

At step S49, it is checked whether or not the actuating button "IN" 21 or the actuating button "OUT" 22 has been thrust. If the result of check at step S49 is YES, the program moves to step S50 and, if otherwise, to step S51.

At step S50, an editing point is set. That is, if the actuating button "IN" 21 is thrust, a cut-in point is set, whereas, if the actuating button "OUT" 22 is thrust, a cut-out point is set. After setting the editing point at this step S50, the processing is terminated.

At step S51, it is checked whether or not the actuating button "EDIT" 23 has been thrust. If the actuating button "EDIT" 23 has been thrust, the program moves to step S52 and, if otherwise, the processing is terminated.

At step S52, an editing command is transmitted to the port 110 or the external equipments 301, 302, performing the recording processing, and to the ports 120, 130, 140 or the external equipment 301, 302 performing the playback processing to terminate the processing. The processing of the editing command is also similar to the above-described command flow. However, the editing command, outputted by the CPU 44, is inputted over the buses 41, 220 to the CPU 152 of the editing manager 150, whereas the CPU 152 performs the aforementioned editing by performing switching control of the data inputted to the lauter 151. For example, the CPU 152 switches the data inputted from the output-port 120 to output the data to the selector 111 of the input port 110. The CPU 152 also changes over the switching at the cut-in point to output data from the output point 120 to input the data inputted from the input port 110 to the selector 111.

By the above-described sequence of operations, the recording port 110 or the playback ports 120, 130, 140 are selected to enable the editing.

With the A/V server 1, having the above-described control panel 4, a larger number of recording and/or reproducing ports can be actuated on a limited operating area.

That is, with the A/V server 1, an actuating button corresponding to the recording port 110, the playback ports 120, 130, 140 or the external equipment 111 is selected when the actuating buttons "PLAYER" and "RECORDER" 107, 108 are extinguished, as described above, to enable the recording or reproducing processing by the port or the electronic equipment associated with the selected actuating button. In the editing state, the recording or reproducing port or the external equipment is selected by the sole port selecting button group 9 to control the selected port or external equipment.

Figure 16:
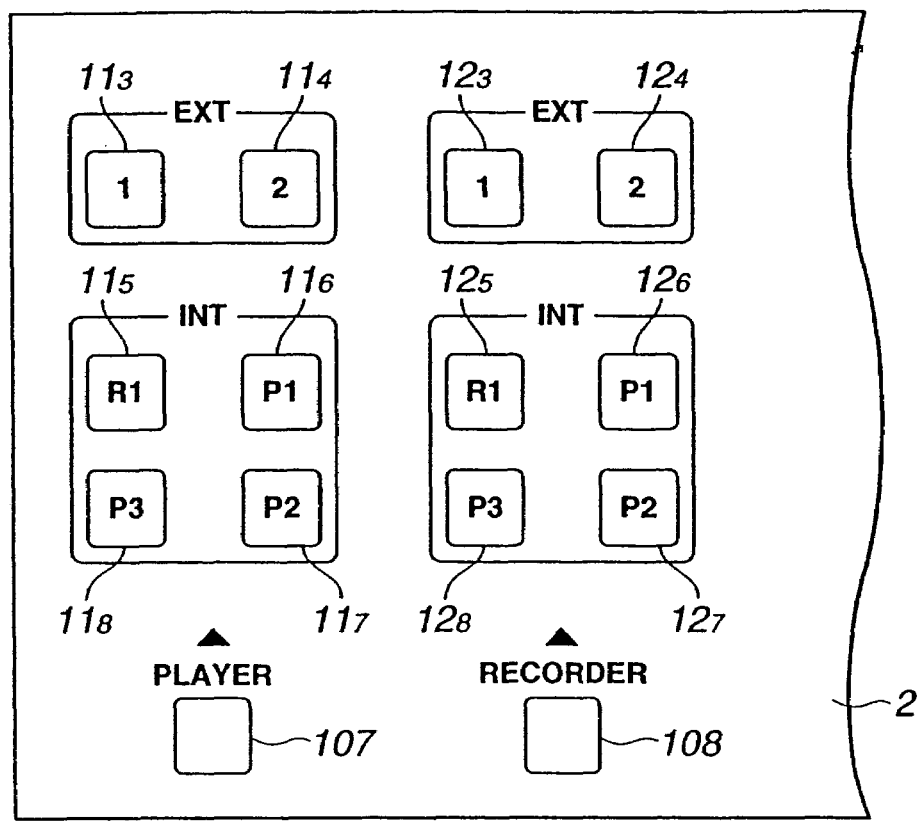
FIG. 16 is a front view showing the structure of a control panel provided with plural port selection button sets.

FIG. 16 shows an embodiment in which a port selecting button group is provided for each of the actuating buttons "PLAYER" and "RECORDER" 107, 108. That is, there are provided, as a port selecting button group for the actuating button "PLAYER" 107, actuating buttons "EXT" $11_3$, $11_4$, actuating button "R1" $11_5$ and actuating buttons "P1" "P2" "P3" $11_6$, $11_7$, $11_8$, while there are provided, as a port selecting button group for the actuating button "RECORDER" 108, actuating buttons "EXT" $12_3$, $12_4$, actuating button "R1" $12_5$ and actuating buttons "P1" "P2" "P3" $12_6$, $12_7$, $12_8$.

By so doing, it is possible to confirm the state of selection of the port or the external equipment selected at the time of editing processing on the recording and playback sides. However, since the port selecting button group is provided in association with the actuating buttons "PLAYER" and "RECORDER" 107, 108, there is encountered an inconvenience that the actuating area is increased, while the number of the actuating buttons twice the number of the ports is required.

Thus, with the control panel 4 provided on the A/V server 1, it is possible to actuate a large number of recording and/or reproducing ports on a limited operating area.

Thus, by saving the limited operating area of the control panel 4, it is possible to implement other high priority functions in the operating area.

Also, since the recording port and the playback port can be paired in operation by the binding function, the A/V server 1 can be acted on just like conventional VTRs even if the recording port and the playback ports are independent of each other.

Figure 17:
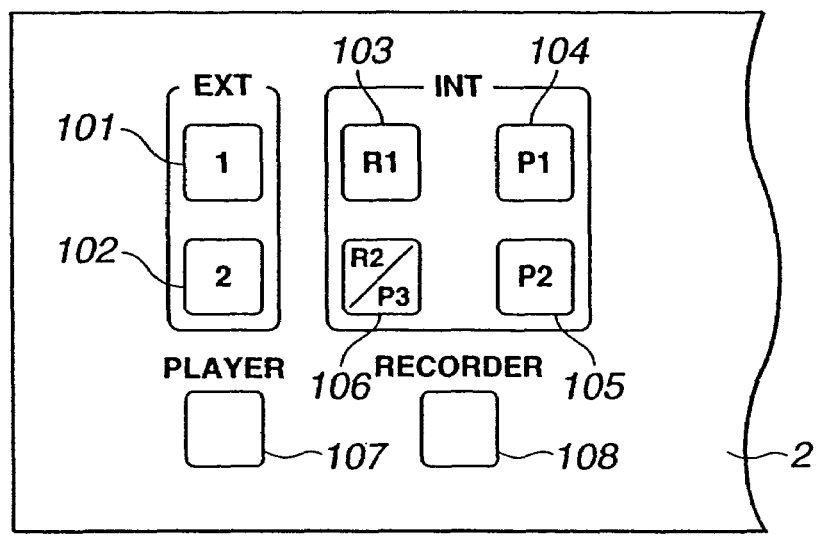
FIG. 17 is a front view showing a modification of a control panel.

Meanwhile, in the A/V server 1, the number of the recording port and the playback ports can be altered optionally. For example, the recording port 110 and the playback port 120, shown in FIG. 6, may be formed on the same substrate and moreover the playback ports 130, 140 may be formed on the same substrate to enable exchange with respect to the main body unit. The substrate comprised of the recording port and the playback port is exchanged for a substrate comprised of the playback ports 130, 140. The A/V server 1 then has two recording ports and two reproducing ports. In connection with this substrate exchanging possibility, the port selecting button group of the control panel 4 is constituted with the actuating button 106 then being an actuating button "R2/P5", to constitute the port selection button group, as shown in FIG. 17.

An audio level meter, displayed on a meter display unit 9, is explained in detail.

By this level meter display, the audio level, in particular, of the input/output data of the A/V server 1 can be known and used as an index for editing in visually confirming the level.

Figure 18:
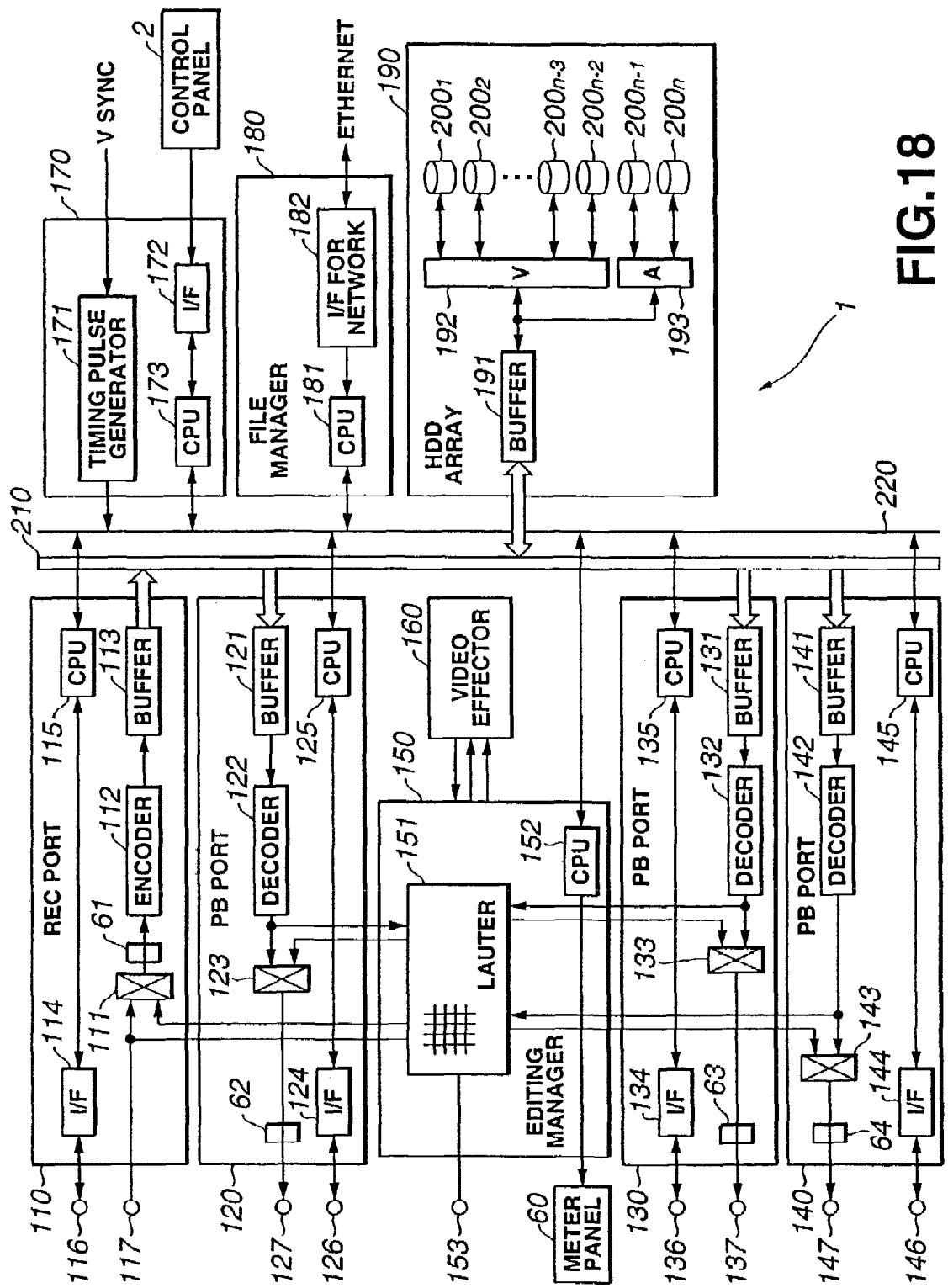
FIG. 18 is a block diagram showing the structure of an A/V server inclusive of a meter panel.

FIG. 18 shows an overall structure of the A/V server 1 inclusive of a meter panel 60.

Although FIG. 18 is similar to FIG. 6, the meter panel 60 is provided in FIG. 18. In addition, there is provided in the input port 110, between the selector 111 and the encoder 112, a level detection processor 61 for audio level detection, while there are provided in the output ports 120, 130, 140, downstream of the selectors 123, 133, 143, audio level detection processors 62, 63, 64 for detecting the audio level. Although this structure is inherently provided in the A/V server 1 shown in FIG. 6, this structure is not shown in FIG. 6 for simplifying the explanation.

The audio level detection processors 61 to 64 detect the level of audio data contained in input or output data. The level data acquired by the processors 61 to 64 are detected by the CPUs 115, 125, 135, 145 of the ports 110, 120, 130, 140 and inputted over the control bus 220 to the CPU 152 of the editing manager 150. The level data acquired on the meter panel 60 is displayed under control by the CPU 152.

Figure 19:
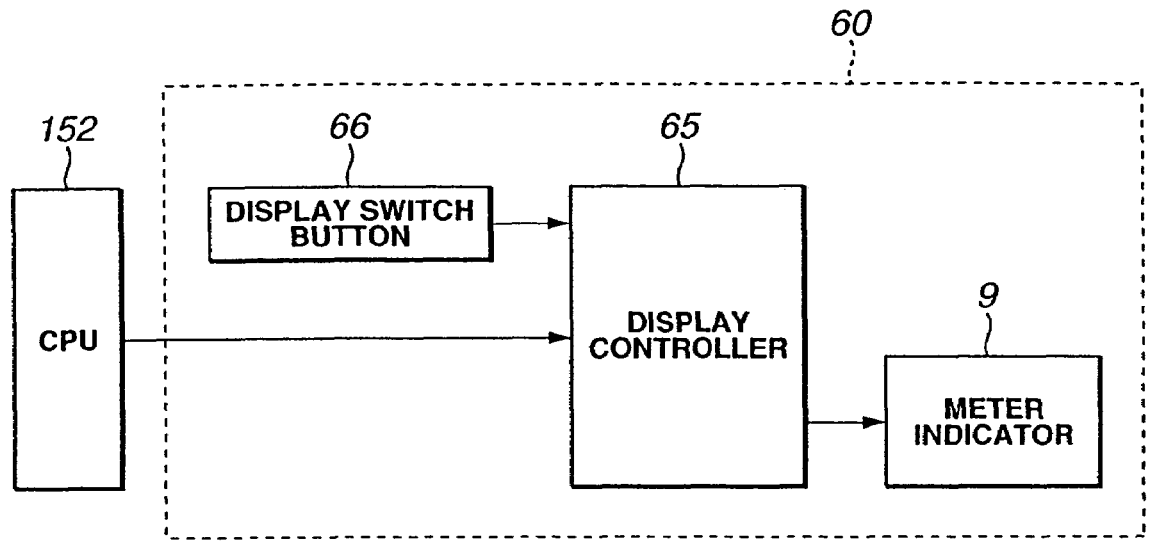
FIG. 19 is a block diagram showing the circuit structure in the meter panel.
Figure 21:
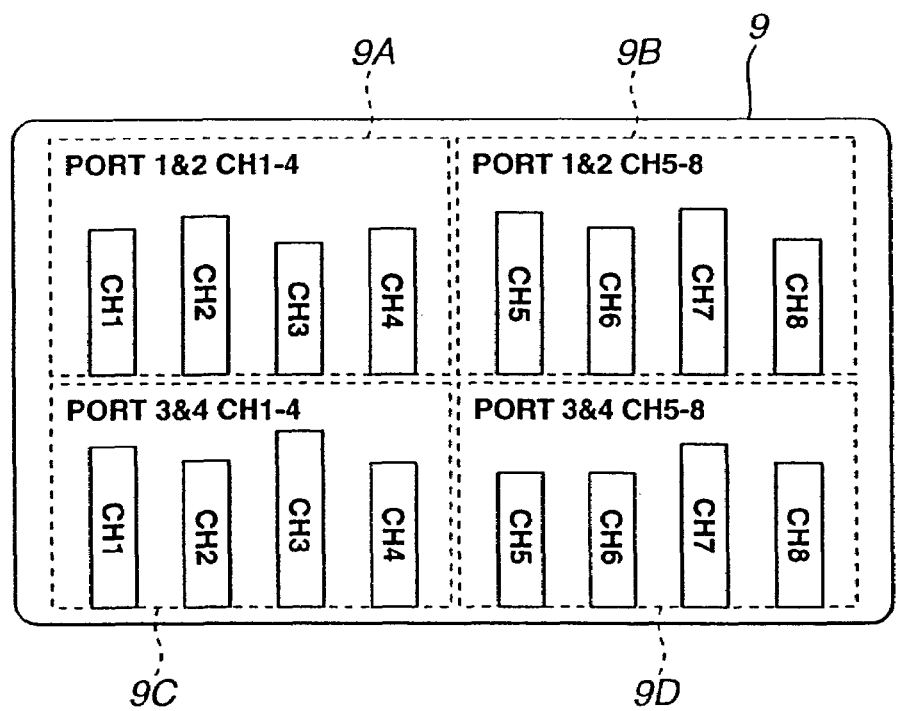
FIG. 21 is a diagrammatic view for explanation of the display on the meter indication unit.

FIG. 19 shows the structure of the CPU 152 of the editing manager 150 and the meter panel 60.

The meter panel 60 is made up of a display controller 65, a display switching button 66 and a meter display unit 9.

The display controller 65 is fed not only with the level data transferred from the CPU 152 of the editing manager 150 but also with the operation information and the configuration information.

The operation information is made up of the information concerning the ports bound in operation as described above, the information representing the recording and/or reproducing processing mode in carrying out the aforementioned recording and/or reproducing processing and the information representing the editing mode when performing the aforementioned editing.

The information on the binding is stored in a memory, not shown, of the CPU 152 of the editing manager 150. If the aforementioned editing or recording and/or reproducing processing is to be performed subject to previous binding, control commands are inputted/outputted with respective ports via control bus 220 with respect to the stored ports to be bound.

The recording and/or reproducing and editing processing are carried out by acting on pre-set actuating buttons of the control panel 4, as described above. The information on the actuation of the actuating buttons is stored in a memory, not shown, of the CPU 152 of the editing manager 150. Thus, the information as to whether the current processing mode is in the recording and/or reproducing processing mode or in the editing mode can be transferred from the CPU 152 to the meter panel 60.

The configuration information is made up of the information on the number of display areas that can be indicated on the meter display unit 9, the information on the number of level meters indicating the number of level meters demonstrated on the display areas, the information on the number of ports on the number of ports connected to the CPU 152 of the editing manager 150 (which is 4 in the embodiment shown in FIG. 18), and the information on the number of channels of audio data inputted to and outputted from the input/output ports 110, 120, 130, 140 (which is 2 if the audio data is only of L and R channels since then there are two channels).

The level data, the operation information and the configuration are inputted from the CPU 152 to the display controller 65 of the meter panel 60.

The display controller 65 allocates the level meter of the audio data to display areas 9A to 9D in the meter display unit 9 to output the display information to the meter display unit 9.

Figure 20A:
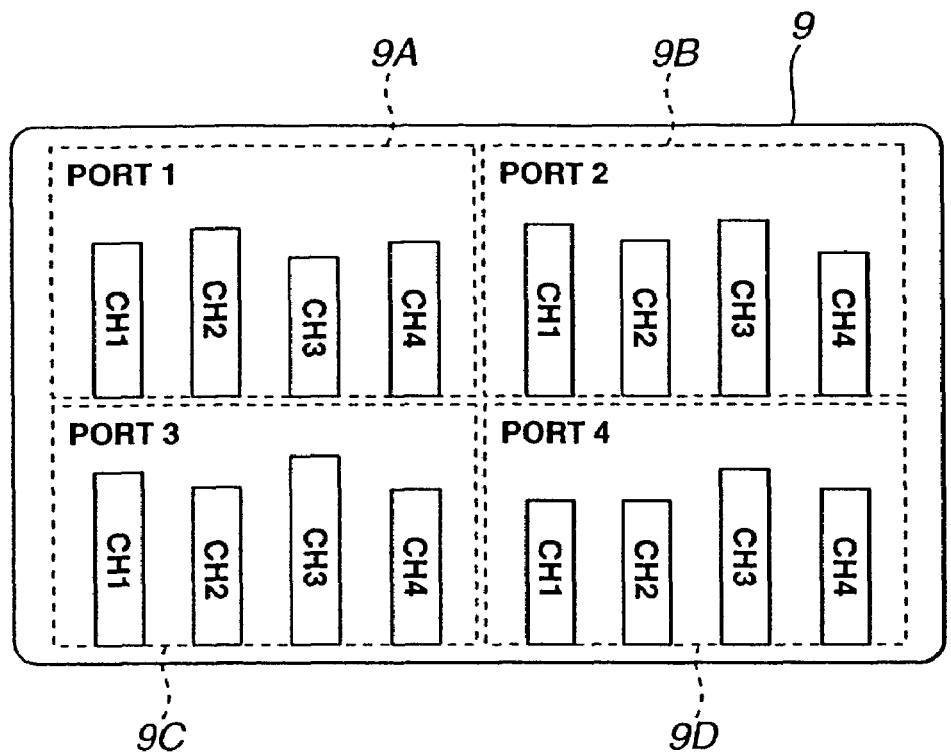
FIGS. 20A, 20B are diagrammatic views for explanation of the display on the meter indication unit for the independent processing mode.

Based on the display information from the display controller 65, the meter display unit 9 displays the audio level as shown in FIGS. 5 and 20.

In the level meter display shown in FIG. 20, the display unit 9 is divided into four regions in each of which is demonstrated the level of the audio data inputted to or outputted from the respective ports. Display is made for each channel of the audio data inputted to or outputted from the respective ports.

If the audio level of a number of channels larger than the four level meters is to be displayed in the display areas 9A to 9D, the display controller 65 switches the display of the audio level responsive to the actuation of the display switching button 66 provided on the meter panel 3, as shown in FIG. 5.

Figure 20B:
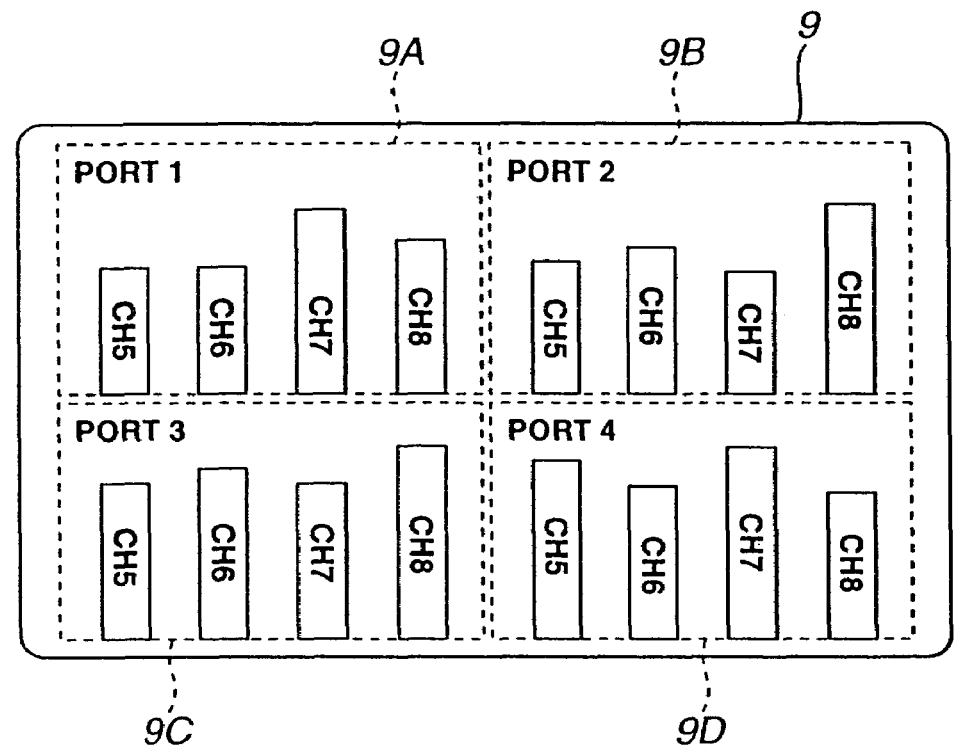

If the number of the input/output ports 110, 120, 130, 140 is equal to that of the first to fourth display areas 9A to 9D, these input/output ports 110, 120, 130, 140 are used in their entirety and the audio data of the eight channels are recorded and/or reproduced, the display controller 65 causes the levels of the first to fourth channels of the audio data to be displayed, while causing the audio levels of the five to eight channels to be displayed by the actuation of the display switching button 66, as shown in FIG. 20B.

If, in the input port 130, the input port 110 is bound to the output port 120, and the input port 130 is bound to the output port 140, by so-called 2-in-2-out, the audio levels of the audio data of all of the eight channels, inputted or outputted via one of the input/output ports of the paired input/output ports, that is the input port 110 and the output port 120 or the input port 130 and the output port 140, is displayed in the first and second meter display area 9A or the third and fourth meter display areas 9C and 9D.

If the recording and/or reproduction or the editing is to be executed as the input port 110 is bound to the output port 120 without binding the output ports 130, 140, the input/output port pair (input port 110 and the output port 120) is allocated to the first and second meter display areas 9A and 9B, while the output ports 130, 140 independent of each other are allocated to the third and fourth meter display areas 9C and 9D.

On the eight level meters in the first and second meter display areas 9A and 9B, the audio level of the audio data on the eight channels inputted or outputted via one of the input/output ports of the associated input/output port pair 110, 120 is indicated. On the four level meters of the third and fourth meter display areas 9C and 9D, the audio level the eight-channel audio data, inputted or outputted via corresponding input/output ports, is displayed as it is switched between the audio level of audio data D10 and D11 of four channels of from channel 1 to channel 4 and the audio level of audio data D10 and D11 of four channels of from channel 5 to channel 8.

If the input/output ports are allocated to the first to fourth display areas 9A to 9D, without binding the ports 110, 120, 130, 140, the display controller 65 sets the number of the totality of the input/output ports in use, referred to below as the number of ports in use, and the number of the first to fourth display areas 9A to 9D in the meter display unit 9, referred to below as the number of display areas, to "N_PORT" and to "N_METER", respectively, and sequentially uses the following equations (1) to (4):

$$(N\_METER/2) < N\_PORT \leq N\_METER \quad (1)$$

$$(N\_METER/3) < N\_PORT \leq (N\_METER/2) \quad (2)$$

$$(N\_METER/4) < N\_PORT \leq (N\_METER/3) \quad (3)$$

$$(N\_METER/(a+1)) < (N\_PORT \leq N\_METER/3) \quad (4)$$

to verify which of these equations (1) to (4) holds for the number of ports in use.

The display controller 65 also sets the number of channels of audio data inputted or outputted via the respective input/output ports and the number of level meters provided in each of the first to fourth display areas 9A to 9D, referred to below as the number of meters, to "N_CH" and "N_METER_CH", respectively, and sequentially uses the following equations (5) to (8):

$$N\_CH \leq N\_METER\_CH \quad (5)$$

$$N\_METER\_CH < N\_CH \leq (N\_METER\_CH \times 2) \quad (6)$$

$$(N\_METER\_CH \times 2) < N\_CH \leq (N\_METER\_CH \times 3) \quad (7)$$

$$(N\_METER\_CH \times b) < N\_CH \leq (N\_METER\_CH \times (b+1)) \quad (8)$$

where b 3, 4, 5, 6, . . . , m to verify which of the conditions of the equations (5) to (8) holds for the number of channels of the audio data.

Meanwhile, the value of the ultimate coefficient a used in dividing the number of the display areas in checking the relation between the number of ports in use and the number of display areas, and the value of the ultimate coefficient b used in multiplying the number of meters in checking the relation between the number of channels in use and the number of meters, are set to respective optional values.

If, based on the results of decision, obtained as described above, the number of the ports in use meets the equation (1) and the number of channels being processed meets the above equation (5), the number of the ports in use is of the same order of magnitude as the number of the display areas. The display controller 65 thus allocates an input/output port to each of the first to fourth display areas 9A to 9D.

Since the number of channels of the audio data is of the same order of magnitude as the number of meters, the audio level of the audio data of the totality of channels inputted or outputted via an associated input/output port is displayed in each level meter of each of the first to fourth display areas 9A to 9D to which are allocated the input/output ports.

If the number of ports meets the above equation (1) and the number of channels meets the above equation (6), the display controller 65 allocates an input/output port to each of the first to fourth display areas 9A to 9D.

Since the number of the channels being processed in this case is approximately twice that of the meters, there is displayed, on each level meter of each of the first to fourth display areas 9A to 9D, to which are allocated the input/output ports, the audio level of audio data of the totality of channels inputted or outputted via associated input/output port, as the audio level is switched in two steps, that is the audio level of audio data of four channels from channel 1 to channel 4 and that of audio data of channel 5 to channel 8.

If the number of ports in use meets the above equation (1) and the number of channels of the audio data meets the equation (7), the display controller 65 allocates each one input/output port to the first to fourth display areas 9A to 9D.

Since the number of channels is approximately thrice that of meters, there is displayed, on each level meter of each of the first to fourth display areas 9A to 9D, to which the input/output ports are allocated, the audio level of the audio data of the totality of channels inputted or outputted via an associated input/output port, as the audio level is changed over in three stages, that is the audio level of audio data of four channels of channel 1 to channel 4, audio level of audio data of four channels of channel 5 to channel 8 and the audio level of audio data of channel 9 and the following channels.

Also, if the number of the ports in use meets the above equation (1) and the number of channels being processed meets the above equation (8), the display controller 65 allocates each one input/output port to each of the first to fourth display areas 9A to 9D.

Since the number of processed channels is approximately (b+1) times the number of meters, there is displayed, in each level meter of each of the first to fourth display areas 9A to 9D, to which are allocated the input/output ports, the audio level of audio data of the totality of channels inputted or outputted via an associated one of the input/output ports, as the audio level is changed over in (b+1) stages.

If the number of ports in use meets the above equation (1), but the number of ports is less than that of the display areas, the display controller 65 does not allocate the input/output port to the first to fourth display areas 9A to 9D exceeding the number of the ports in use, thus not allowing the audio level to be displayed.

On the other hand, if the number of ports meets the above equation (2), and the number of channels of each audio data meets the above equation (5), the display controller 65 allocates each one input/output port to the first to fourth display areas 9A to 9D, because the number of channels being processed is approximately equal to the number of meters, even though the number of ports in use is not larger than one-half the number of display areas.

The result is that, in each level meters of each of the first to fourth display areas 9A to 9D, to which are allocated the input/output ports, the audio level of the audio data of the totality of channels inputted or outputted via an associated one of the input/output ports is collectively displayed. It is noted that the audio level is not displayed on the first to fourth display areas 9A to 9D to which the input/output port has not been allocated.

If the number of ports in use meets the above equation (2) and the number of channels being processed meets the above equation (6), the number of channels being processed is approximately twice that of the meters. Thus, the display controller 65 sequentially allocates each one input/output port to two of the first to fourth display areas 9A to 9D.

The result is that, in each level meters of each of the first to fourth display areas 9A to 9D, to which are allocated the input/output ports, the audio level of the audio data of the totality of channels inputted or outputted via an associated one of the input/output ports is collectively displayed.

If the number of ports in use meets the above equation (2) and the number of channels being processed meets the above equation (7), the display controller 65 sequentially allocates each one input/output port to two of the first to fourth display areas 9A to 9D.

The number of channels being processed in this case is approximately thrice that of the meters, so that, if two of the first to fourth display areas 9A to 9D are used for one input/output port, the audio level of audio data of the totality of channels, inputted or outputted via associated one of the input/output ports, cannot be displayed collectively on each level meter in the two of the first to fourth display areas 9A to 9D.

Thus, there is displayed, on the two level meters of each of the first to fourth display areas 9A to 9D, to which are allocated the input/output ports, the audio level of audio data of the totality of channels inputted or outputted via an associated input/output port, as the audio level is switched in two stages, that is the audio level of audio data of four channels from channel 1 to channel 8 and that of audio data of channel 9 and following channels.

If the number of ports in use meets the above equation (2) and the number of channels being processed meets the above equation (8), the display controller 65 sequentially allocates each one input/output port to two of the first to fourth display areas 9A to 9D.

The number of channels being processed in this case is approximately (b+1) times the number of meters, there is displayed, on each level meter of each of the two of the first to fourth display areas 9A to 9D, to which are allocated the input/output ports, the audio level of audio data of the totality of channels, inputted or outputted via an associated one of the input/output ports, as the audio level is changed over stepwise.

On the other hand, if the number of ports meets the above equation (3), and the number of channels of each audio data meets the above equation (5), the display controller 65 allocates each one input/output port to the first to fourth display areas 9A to 9D, because the number of channels being processed is approximately equal to the number of the display areas, even though the number of ports in use is approximately one-third of the number of display areas such that three of the first to fourth display areas 9A to 9D can be used for one input/output port.

The result is that, in each level meters of each of the first to fourth display areas 9A to 9D, to which are allocated the input/output ports, the audio level of the audio data of the totality of channels inputted or outputted via an associated one of the input/output ports is collectively displayed. It is noted that the audio level is not displayed by the display controller 65 on the first to fourth display areas 9A to 9D to which the input/output port has not been allocated.

If the number of ports in use meets the above equation (2) and the number of channels being processed meets the above equation (6), the number of channels being processed is approximately twice that of the meters. Thus, the display controller 65 sequentially allocates each one input/output port to two of the first to fourth display areas 9A to 9D.

The result is that, in each level meter of each of two of the first to fourth display areas 9A to 9D, to which are allocated the input/output ports, the audio level of the audio data of the totality of channels inputted or outputted via an associated one of the input/output ports is collectively displayed.

It is noted that, since there exist the first to fourth display areas 9A to 9D, to which are not allocated the input/output ports, the audio level is not displayed in these first to fourth display areas 9A to 9D.

If the number of ports in use meets the above equation (3) and the number of channels being processed meets the above equation (7), the number of channels being processed is approximately thrice that of the meters. Thus, the display controller 65 sequentially allocates each one input/output port to three of the first to fourth display areas 9A to 9D.

The result is that, in each level meter of each of three of the first to fourth display areas 9A to 9D, to which are allocated the input/output ports, the audio level of the audio data of the totality of channels inputted or outputted via an associated one of the input/output ports is collectively displayed.

If the number of ports in use meets the above equation (3) and the number of channels being processed meets the above equation (8), the display controller 65 sequentially allocates each one input/output port to three of the first to fourth display areas 9A to 9D.

Since the number of channels being processed in this case is approximately (b+1) times the number of meters, there is displayed, on each level meter of each of three of the first to fourth display areas 9A to 9D, to which are allocated the input/output ports, the audio level of audio data of the totality of channels, inputted or outputted via an associated one of the input/output ports, as the audio level is changed over stepwise.

It is noted that, if at least the number of the ports in use meets the above equation (4), the display controller 65 allocates the input/output port to the first to fourth display areas 9A to 9D, in accordance with the above-described display allocation technique.

On the other hand, if there are bound ports among the input/output ports 110, 120, 130, 140, the display controller 65 sets number of the port pairs as "N_PORT/2" and sequentially uses the following equations (9) to (11):

$$(N\_METER/3) < (N\_PORT/2) \leq (N\_METER/2) \quad (9)$$

$$(N\_METER/4) < (N\_PORT/2) \leq (N\_METER/3) \quad (10)$$

$$(N\_METER/(c+1)) < (N\_PORT/2) \leq (N\_METER/c) \quad (11)$$

where c=4, 5, 6, 7, . . . x to verify which of the conditions of the equations (9) to (11) holds for the number of paired ports.

Meanwhile, the value of the number of paired ports and the ultimate value of the coefficient c used in checking into the relation thereof to the number of display areas are previously set to optional values.

The display controller 65 sequentially uses the above equations (5) to (8) to verify which of the conditions of the equations (5) to (8) holds for the number of processing channels.

Based on the results of decision, obtained as described above, if the number of port pairs meets the above equation (9) and the number of audio data channels meets the above equation (5), the display controller 65 allocates each one input/output port pair to the first to fourth display areas 9A to 9D, because the number of audio data channels is approximately equal to the number of meters, even though the number of the paired ports is approximately one-half that of the display areas and two of the first to fourth display areas 9A to 9D can be used for each bound port set.

The result is that, in each level meter of each of the first to fourth display areas 9A to 9D, to which are allocated the input/output ports, the audio level of the audio data of the totality of channels inputted or outputted via one of the input/output ports of the bound port set is collectively displayed.

It is noted that the display controller 65 does not allow the audio level to be displayed on the first to fourth display areas 9A to 9D exceeding the number of the port pairs.

If the number of paired ports meets the above equation (9) and the number of channels of the audio data meets the equation (6), the display controller 65 sequentially allocates each one input/output port pair to two of the first to fourth meter display areas 9A to 9D because the number of channels o the speech data is approximately twice the number of meters.

The result is that, in each level meter of two of the first to fourth display areas 9A to 9D, to which are allocated the input/output ports, the audio level of the audio data of the totality of channels inputted or outputted via one of the input/output ports of the bound port set is collectively displayed.

If the number of paired ports meets the above equation (9) and the number of channels of the audio data meets the equation (7), the display controller 65 sequentially allocates each one input/output port pair to two of the first to fourth display areas 9A to 9D.

However, the number of audio channels is approximately thrice the number of the meters, such that, if two of the first to fourth display areas 9A to 9D are used for one input/output port pair, it is not possible for the level meters provided in the two of the first to fourth display areas 9A to 9D to make collective display of the audio level of the audio data of the totality of the channels inputted or outputted via one of the input/output ports of the associated input/output port pair.

Thus, there is displayed, on the two level meters of two of the first to fourth display areas 9A to 9D, to which are allocated the input/output ports, the audio level of audio data of the totality of channels inputted or outputted via one of input/output ports of the associated input/output port pair, as the audio level is switched in two stages, that is the audio level of audio data of from channel 1 to channel 8 and that of audio data of channel 9 and following channels.

If the number of ports in use meets the above equation (9) and the number of channels being processed meets the above equation (8), the display controller 65 sequentially allocates a bound input/output port pair to two of the first to fourth display areas 9A to 9D.

The number of channels being processed in this case is approximately (b+1) times the number of meters, there is displayed, on each level meter of two of the first to fourth display areas 9A to 9D, to which are allocated bound input/output port pairs, the audio level of audio data of the totality of channels, inputted or outputted via an associated input/output port of the bound input/output ports, as the audio level is changed over b stages.

On the other hand, if the number of ports meets the above equation (10), and the number of channels of each audio data meets the above equation (5), the display controller 65 allocates each one input/output port pair to the first to fourth display areas 9A to 9D, because the number of channels being processed is approximately equal to the number of the display areas, even though the number of ports in use is approximately one-third of the number of display areas such that three of the first to fourth display areas 9A to 9D can be used for one input/output port.

The result is that, in each level meter of each of the first to fourth display areas 9A to 9D, to which are allocated the bound input/output port set, the audio level of the audio data of the totality of channels inputted or outputted via one of the input/output ports of the bound port set is collectively displayed. It is noted that the audio level is not displayed by the display controller 65 on the first to fourth display areas 9A to 9D to which the bound input/output port set has not been allocated.

If the number of ports in use meets the above equation (10) and the number of channels being processed meets the above equation (6), the number of channels being processed is approximately twice that of the meters, even though three of the first to fourth display areas 9A to 9D can be used for one input/output port set. Thus, the display controller 65 sequentially allocates a bound port set to two of the first to fourth display areas 9A to 9D.

The result is that, in each level meter of two of the first to fourth display areas 9A to 9D, to which are allocated the input/output ports, the audio level of the audio data of the totality of channels inputted or outputted via one of the input/output port of the associated bound port set is collectively displayed. It is noted that the audio level here again is not displayed on the first to fourth display areas 9A to 9D to which the bound input/output port set has not been allocated.

If the number of port pairs meets the above equation (10) and the number of audio channels meets the equation (7), the display controller 65 sequentially allocates an input/output port to each of three of the first to fourth display areas 9A to 9D, because three of the first to fourth display areas 9A to 9D can be used for one input/output port pair and the number of audio channels is approximately thrice that of the meters.

The result is that, in each level meter of three of the first to fourth display areas 9A to 9D, to which are allocated bound input/output ports, the audio level of the audio data of the totality of channels inputted or outputted via one of the input/output port of the associated bound port set is collectively displayed.

If the number of port pairs meets the above equation (10) and the number of audio channels meets the equation (8), the display controller 65 sequentially allocates an input/output port to each of three of the first to fourth display areas 9A to 9D.

However, since the number of channels being processed in this case is approximately (b+1) times the number of meters, there is displayed, on each level meter of three of the first to fourth display areas 9A to 9D, to which are allocated bound input/output port pairs, the audio level of audio data of the totality of channels, inputted or outputted via an associated input/output port of the bound input/output port set, as the audio level is changed over stepwise.

If at least the number of port pairs meets the above equation (11), it is possible fort the display controller 65 to use c of the first to fourth display areas 9A to 9D for the bound port set. Thus, the display controller 65 sequentially allocates the bound port set to c of the first to fourth display areas 9A to 9D.

There is displayed, on each level meter of c of the first to fourth display areas 9A to 9D, to which are allocated the bound input/output port sets, the audio level of audio data of the totality of channels inputted or outputted via one of input/output ports of the associated input/output port pair, depending on the conditions satisfying the number of the audio channels.

In allocating the audio level display to the first to fourth display areas 9A to 9D when there co-exist ports to be bound and those not to be bound, basically the input/output ports are allocated to the first to fourth display areas 9A to 9D by a technique of allocating the input/output ports to the first to fourth display areas 9A to 9D without binding any ports. However, for the input/output ports acquired by binding, two of the first to fourth display areas 9A to 9D are acquired to allocate the display to these two areas, or the display is allocated to one of them without allocating the display to the other.

In this manner, the first to fourth display areas 9A to 9D in the meter display unit 9 are effectively used in the A/V server 1 to enable the audio level of the audio data to be displayed.

In the preferred embodiment, a menu button 70, a mode selection button 70, a mode selection knob 71 and a mode decision button 72 are arranged on the meter panel 3 shown in FIG. 5. If, after thrusting the menu button 70, one of the input/output port is selected and specified by the port selection buttons 10A to 10D, there is displayed in the associated one of the first to fourth display areas 9A to 9D the information representing the mode which executes the processing without binding any ports and the information representing the mode which executes the processing on binding any ports.

By turning the mode selection knob 71 of the meter panel 3, switching can be made between the two modes, such that, when the desired processing mode is displayed, and the mode decision button 72 is thrust, this processing mode can be set for the selected and designated input/output port.

Referring to FIGS. 23 to 32, the processing of display allocation as mentioned above is explained in detail.

The display controller 65 initiates the operation at step SP1 and captures the operation information S2 and the configuration information S3 outputted at step S2 from the CPU 152.

The display controller 65 advances to step SP3 to check whether or not, in the processing mode obtained based on the operation information S2, all ports are bound (bound processing mode).

A negative result obtained at this step SP3 means that the processing mode asset at this time point is such a mode in which the ports are not bound and are operated independently (independent processing mode), or such a mode in which certain ports are in the bound state (mixed processing mode). The display controller 65 at this time advances to step SP4 to check whether or not the number of ports in use meets the above-mentioned equation (1).

An affirmative result obtained at this step SP4 means that the number of ports in use is approximately equal to the number of display areas so that each one input/output port is allocated to the first to fourth display areas 9A to 9D. At this time, the display controller 65 advances to step SP5 to check whether or not the number of audio channels meets the equation (5).

If the affirmative result is obtained at this step SP5, it means that the number of audio channels is of the order of the number of the meters. At this time, the display controller 65 advances to step SP6 to allocate an input/output port to each of the first to fourth display areas 9A to 9D to cause collective display of the audio level of the audio data of the totality of channels inputted or outputted via an input/output port associated with each level meter of each of the first to fourth display areas 9A to 9D. The display controller 65 then advances to step SP7 to terminate the display allocation processing process RT1.

If conversely a negative result is obtained at this step SP5, it means that the number of audio channels is larger than approximately twice the number of meters. At this time, the display controller 65 advances to step SP8 to check whether or not the number of speech channels meets the equation (6).

If an affirmative result is obtained at this step SP8, it means that the number of the audio channels is approximately twice that of the meters. The display controller 65 then advances to step SP9 to allocate each one input/output port to each of the first to fourth display areas 9A to 9D to change over the audio level of the audio data of the totality of channels inputted or outputted via an input/output port associated with each level meter of each of the first to fourth display areas 9A to 9D in two steps. The display controller 65 then advances to step SP7 to terminate the display allocation processing sequence RT1.

If conversely a negative result is obtained at this step SP8, it means that the number of audio channels is larger than approximately twice the number of meters. At this time, the display controller 65 advances to step SP10 to check whether or not the number of speech channels meets the equation (7).

If the affirmative result is obtained at this step SP10, it means that the number of speech channels is approximately thrice that of the meters. The display controller 65 then advances to step SP11 to allocate an input/output port to each of the first to fourth display areas 9A to 9D to display the audio level of the audio data of the totality of channels inputted or outputted via an input/output port associated with each level meter of each of the first to fourth display areas 9A to 9D. The display controller 65 then advances to step SP7 to terminate the display allocation processing process RT1.

If conversely a negative result is obtained at this step SP10, it means that the number of audio channels is larger than approximately twice the number of meters. At this time, the display controller 65 advances to step SP12 to change the value of the coefficient b of the equation (8) to detect the condition which meets the number of channels.

The display controller 65 then advances to step SP13 to allocate the input/output port to each of the first to fourth display areas 9A to 9D depending on the condition detected at step SP12. The display controller 65 then displays the audio level of the audio data of the totality of channels inputted or outputted via an input/output port associated with each level meter of each of the first to fourth display areas 9A to 9D as the audio level is switched in (b+1) steps. The display controller 65 then advances to step SP7 to terminate the display allocation processing sequence RT1.

If conversely a negative result is obtained at this step SP14, it means that the number of ports is smaller than about one-half that of the display areas. The display controller 65 then advances to step SP14 to verify whether or not the number of ports in use meets the above equation (2).

If an affirmative result is obtained at this step SP14, it means that the number of ports is smaller than about one-half the number of the display areas, and that two of the first to fourth display areas 9A to 9D can be used for a sole input/output port. The display controller 65 then advances to step SP15 to check whether or not the number of speech channels meets the above equation (5).

If the affirmative result is obtained at this step SP15, it means that the number of speech channels is approximately equal to that of the meters, and hence that there is no necessity of using two of the first to fourth display areas 9A to 9D. The display controller 65 then advances to step SP16 to allocate an input/output port to each of the first to fourth display areas 9A to 9D to make collective display of the audio level of the audio data of the totality of channels inputted or outputted via an input/output port associated with each level meter of each of the first to fourth display areas 9A to 9D. The display controller 65 then advances to step SP7 to terminate the display allocation processing process RT1.

If conversely a negative result is obtained at this step SP15, it means that the number of ports is smaller than about one-half that of the display areas. The display controller 65 then advances to step SP17 to verify whether or not the number of ports in use meets the above equation (6).

If the affirmative result is obtained at this step SP17, it means that the number of speech channels is approximately twice that of the meters. The display controller 65 then advances to step SP18 to allocate an input/output port to two of the first to fourth display areas 9A to 9D to make collective display of the audio level of the audio data of the totality of channels inputted or outputted via an input/output port associated with each level meter of these two of the first to fourth display areas 9A to 9D. The display controller 65 then advances to step SP7 to terminate the display allocation processing process RT1.

If conversely a negative result is obtained at this step SP17, it means that the number of ports is larger than about twice that of the display areas. The display controller 65 then advances to step SP19 to verify whether or not the number of ports in use meets the above equation (7).

If the affirmative result is obtained at this step SP19, it means that the number of speech channels is approximately thrice that of the meters. The display controller 65 then advances to step SP20 to allocate an input/output port to two of the first to fourth display areas 9A to 9D to display the audio level of the audio data of the totality of channels inputted or outputted via an input/output port associated with each level meter of these two of the first to fourth display areas 9A to 9D, as the audio level is switched in two steps. The display controller 65 then advances to step SP7 to terminate the display allocation processing process RT1.

If a negative result is obtained at this step SP19, it means that the number of ports is larger than about thrice that of the display areas. The display controller 65 then advances to step SP21 to change the value of the coefficient b of the equation (8) to find a condition which meets the number of audio channels.

The display controller 65 advances to step SP22 to sequentially allocate an input/output port to two of the first to fourth display areas 9A to 9D under the condition detected at step SP21 to display the audio level of the audio data of the totality of channels inputted or outputted via an input/output port associated with each level meter of these two of the first to fourth display areas 9A to 9D as the audio level is switched stepwise. The display controller 65 then advances to step SP7 to terminate the display allocation processing process RT1.

If a negative result is obtained at this step SP14, it means that the number of ports is smaller than about one-third of the number of the display areas. The display controller 65 then advances to step S23 to verify whether or not the number of ports in use meets the above equation (3).

If an affirmative result is obtained at this step SP14, it means that the number of ports is about one-third the number of the display areas, and that three of the first to fourth display areas 9A to 9D can be used for a sole input/output port. The display controller 65 then advances to step SP24 to check whether or not the number of speech channels meets the above equation (5).

If the affirmative result is obtained at this step SP24, it means that the number of speech channels is approximately equal to that of the meters, and hence that there is no necessity of using three of the first to fourth display areas 9A to 9D. The display controller 65 then advances to step SP25 to allocate an input/output port to each of the first to fourth display areas 9A to 9D to make collective display of the audio level of the audio data of the totality of channels inputted or outputted via an input/output port associated with each level meter of each of the first to fourth display areas 9A to 9D. The display controller 65 then advances to step SP7 to terminate the display allocation processing process RT1.

If conversely a negative result is obtained at this step SP24, it means that the number of ports is smaller than about one-half that of the display areas. The display controller 65 then advances to step SP26 to verify whether or not the number of ports in use meets the above equation (6).

If the affirmative result is obtained at this step SP26, it means that the number of speech channels is approximately twice that of the meters. The display controller 65 then advances to step SP27 to allocate an input/output port to two of the first to fourth display areas 9A to 9D and to make collective display of the audio level of the audio data of the totality of channels inputted or outputted via an input/output port associated with each level meter of these two of the first to fourth display areas 9A to 9D. The display controller 65 then advances to step SP7 to terminate the display allocation processing process RT1.

If conversely a negative result is obtained at this step SP26, it means that the number of ports is larger than about twice that of the display areas. The display controller 65 then advances to step SP28 to verify whether or not the number of ports in use meets the above equation (7).

If the affirmative result is obtained at this step SP28, it means that the number of speech channels is approximately thrice that of the meters. The display controller 65 then advances to step SP29 to allocate an input/output port to three of the first to fourth display areas 9A to 9D to display the audio level of the audio data of the totality of channels inputted or outputted via an input/output port associated with each level meter of these two of the first to fourth display areas 9A to 9D, as the audio level is switched in two steps. The display controller 65 then advances to step SP7 to terminate the display allocation processing process RT1.

If a negative result is obtained at this step SP28, it means that the number of ports is larger than about thrice that of the display areas. The display controller 65 then advances to step SP30 to change the value of the coefficient b of the equation (8) to find a condition which meets the number of audio channels.

The display controller 65 advances to step SP31 to sequentially allocate an input/output port to two of the first to fourth display areas 9A to 9D under the condition detected at step SP30 to display the audio level of the audio data of the totality of channels inputted or outputted via an input/output port associated with each level meter of these three of the first to fourth display areas 9A to 9D as the audio level is switched stepwise. The display controller 65 then advances to step SP7 to terminate the display allocation processing process RT1.

If a negative result is obtained at this step SP23, it means that the number of ports is smaller than about one-fourth of the number of the display areas. The display controller 65 then advances to step S32 to change the value of the coefficient a of the equation (4) to detect the condition which meets the number of ports in use.

The display controller 65 advances to step SP44 to detect the condition which meets the number of audio channels. Based on the detected results, the display controller 65 allocates an input/output port to each of a pre-set number of the first to fourth display areas 9A to 9D, while displaying the audio level of the audio data of the totality of channels inputted or outputted via an input/output port associated with each level meter of each of the pre-set number of the first to fourth display areas 9A to 9D as the audio level is switched stepwise as necessary. The display controller 65 then advances to step SP7 to terminate the display allocation processing process RT1.

If an affirmative result is obtained at the above step SP33, it means that the processing set at this time point is the binding processing mode. The display controller 65 then advances to step SP34 to check whether or not the number of port pairs meets the above equation (9).

If the affirmative result is obtained at this step SP34, it means that the number of port pairs is approximately one-half that of the display areas such that two of the first to fourth display areas 9A to 9D can be used for a sole input/output port pair. The display controller 65 then advances to step S35 to verify whether or not the number of audio channels meets the above equation (5).

If the affirmative result is obtained at this step SP35, it means that the number of audio channels is approximately equal to that of the meters, and hence that there is no necessity of using two of the first to fourth display areas 9A to 9D for the bound port pair. The display controller 65 then advances to step SP36 to allocate a bound port pair to each of the first to fourth display areas 9A to 9D to make collective display of the audio level of the audio data of the totality of channels inputted or outputted via an input/output port of the bound port pair associated with each level meter of each of the first to fourth display areas 9A to 9D. The display controller 65 then advances to step SP7 to terminate the display allocation processing process RT1.

If a negative result is obtained at this step SP35, it means that the number of ports is larger than approximately that of the display areas. The display controller 65 then advances to step SP37 to check whether or not the number of the audio channels meets the above equation (6).

If the affirmative result is obtained at this step SP37, it means that the number of audio channels is approximately twice that of the meters. The display controller 65 then advances to step SP38 to allocate a bound port pair to each of the first to fourth display areas 9A to 9D to make collective display of the audio level of the audio data of the totality of channels inputted or outputted via an input/output port of the bound port pair associated with each level meter of two of the first to fourth display areas 9A to 9D. The display controller 65 then advances to step SP7 to terminate the display allocation processing process RT1.

If a negative result is obtained at this step SP37, it means that the number of ports is larger than approximately twice that of the meters. The display controller 65 then advances to step SP39 to check whether or not the number of the audio channels meets the above equation (7).

If the affirmative result is obtained at this step SP39, it means that the number of audio channels is approximately thrice that of the meters. The display controller 65 then advances to step SP40 to allocate a bound port pair to two of the first to fourth display areas 9A to 9D to display the audio level of the audio data of the totality of channels inputted or outputted via an input/output port of the bound port pair associated with each level meter of these two of the first to fourth display areas 9A to 9D. The display controller 65 then advances to step SP7 to terminate the display allocation processing process RT1.

If a negative result is obtained at this step SP39, it means that the number of ports is larger than approximately thrice that of the meters. The display controller 65 then advances to step SP41 to change the value of the value of the coefficient b of the above equation (8) to detect the condition which meets the number of audio channels.

The display controller 65 then advances to step SP42 to sequentially allocate a bound port pair to two of the first to fourth display areas 9A to 9D and to display the audio level of the audio data of the totality of channels inputted or outputted via an input/output port of the bound port pair associated with each level meter of these two of the first to fourth display areas 9A to 9D, as the audio level is switched stepwise. The display controller 65 then advances to step SP7 to terminate the display allocation processing process RT1.

If a negative result is obtained at this step SP34, it means that the number of port pairs is smaller than approximately one-third of that of the display areas. The display controller 65 then advances to step SP43 to check whether or not the number of the port pairs meets the above equation (10).

If the affirmative result is obtained at this step SP43, it means that the number of audio channels is approximately one-third of that of the display areas and that three of the first to fourth display areas 9A to 9D can be used for a bound port pair. The display controller 65 then advances to step SP44 to verify whether or not the number of audio channels meets the above equation (5).

If the affirmative result is obtained at this step SP44, it means that the number of audio channels is approximately equal to that of the meters, and hence that there is no necessity of using three of the first to fourth display areas 9A to 9D for the bound port pair. The display controller 65 then advances to step SP45 to allocate a bound port pair to each of the first to fourth display areas 9A to 9D to make collective display of the audio level of the audio data of the totality of channels inputted or outputted via an input/output port of the bound port pair associated with each level meter of each of the first to fourth display areas 9A to 9D to which is allocated the display of the audio level. The display controller 65 then advances to step SP7 to terminate the display allocation processing process RT1.

If a negative result is obtained at this step SP44, it means that the number of ports is larger than approximately that of the display areas. The display controller 65 then advances to step SP46 to check whether or not the number of the audio channels meets the above equation (6).

If the affirmative result is obtained at this step SP46, it means that the number of audio channels is approximately twice that of the meters. The display controller 65 then advances to step SP47 to sequentially allocate a bound port pair to two of the first to fourth display areas 9A to 9D to make collective display of the audio level of the audio data of the totality of channels inputted or outputted via an input/output port of the bound port pair associated with each level meter of these two of the first to fourth display areas 9A to 9D. The display controller 65 then advances to step SP7 to terminate the display allocation processing process RT1.

If a negative result is obtained at this step SP37, it means that the number of ports is larger than approximately twice that of the meters. The display controller 65 then advances to step SP48 to check whether or not the number of the audio channels meets the above equation (7).

If the affirmative result is obtained at this step SP48, it means that the number of audio channels is approximately thrice that of the meters. The display controller 65 then advances to step SP49 to sequentially allocate a bound port pair to three of the first to fourth display areas 9A to 9D to make collective display of the audio level of the audio data of the totality of channels inputted or outputted via an input/output port of the bound port pair associated with each level meter of these three of the first to fourth display areas 9A to 9D. The display controller 65 then advances to step SP7 to terminate the display allocation processing process RT1.

If a negative result is obtained at this step SP48, it means that the number of ports is larger than approximately thrice that of the meters. The display controller 65 then advances to step SP50 to change the value of the value of the coefficient b of the above equation (8) to detect the condition which meets the number of audio channels.

The display controller 65 then advances to step SP51 to sequentially allocate a bound port pair to three of the first to fourth display areas 9A to 9D responsive to the condition detected at step S50 and to display the audio level of the audio data of the totality of channels inputted or outputted via an input/output port of the bound port pair associated with each level meter of these three of the first to fourth display areas 9A to 9D, as the audio level is switched stepwise. The display controller 65 then advances to step SP7 to terminate the display allocation processing process RT1.

If the negative result is obtained at the aforementioned step SP43, it means that the number of the port pairs is less than approximately one-fourth of that of the display areas. At this time, the display controller 65 advances to step SP52 to change the value of the coefficient c of the equation (11) to detect the condition which meets the number of paired ports.

The display controller 65 then advances to step SP53 to detect the condition meeting the number of audio channels. Based on the results of detection, the display controller 65 allocates the bound port set to a pre-set number of the first to fourth display areas 9A to 9D, while displaying the audio level of the audio data of the totality of channels inputted or outputted via an input/output port of the bound port pair associated with each level meter of the pre-set number of the first to fourth display areas 9A to 9D, as the audio level is switched stepwise. The display controller 65 then advances to step SP7 to terminate the display allocation processing process RT1.

With the A/V server 1 according to the present invention, as described above, when the CPU 151 of the editing manager 150 sets the independent processing mode, a binding processing mode or the mixed processing mode, the operation information and the configuration information are sent to the display controller 65, which then allocates ports to the first to fourth display areas 9A to 9D in the meter display unit 9 based on the operation information and the configuration information.

If the number of ports in use or the number of the port pairs is smaller than about one-half the number of the display areas, an input/output port or a bound port pair is allocated to the first to fourth display areas 9A to 9D depending on the number of the audio channels.

Thus, with the present A/V server 1, the audio level of audio data of plural channels can be efficiently displayed in the limited display space in the meter display unit 9 without detracting from viewability.

If the number of audio channels is larger than that of the level meters of one or more of the first to fourth display areas 9A to 9D allocated to an input/output port or to a bound port pair, the audio level is indicated in each of these first to fourth display areas 9A to 9D, as the audio level is changed over, so that the audio level of the audio data of plural channels can be displayed more efficiently on the meter display unit 9.

Moreover, since priority is placed on the input/output port or the bound port set rather than on the number of channels of the audio data D, the audio level of the audio data inputted or outputted via all of the input/output ports or the bound port pairs in use can be displayed perpetually.

In addition, in the present A/V server 1, the audio level of the audio data is displayed in the meter display unit 9 without using other monitors during recording and/or reproduction of the video or audio data, the audio level of the audio data can be easily visually recognized during recording and/or reproduction of the video or audio data.

Figure 22A:
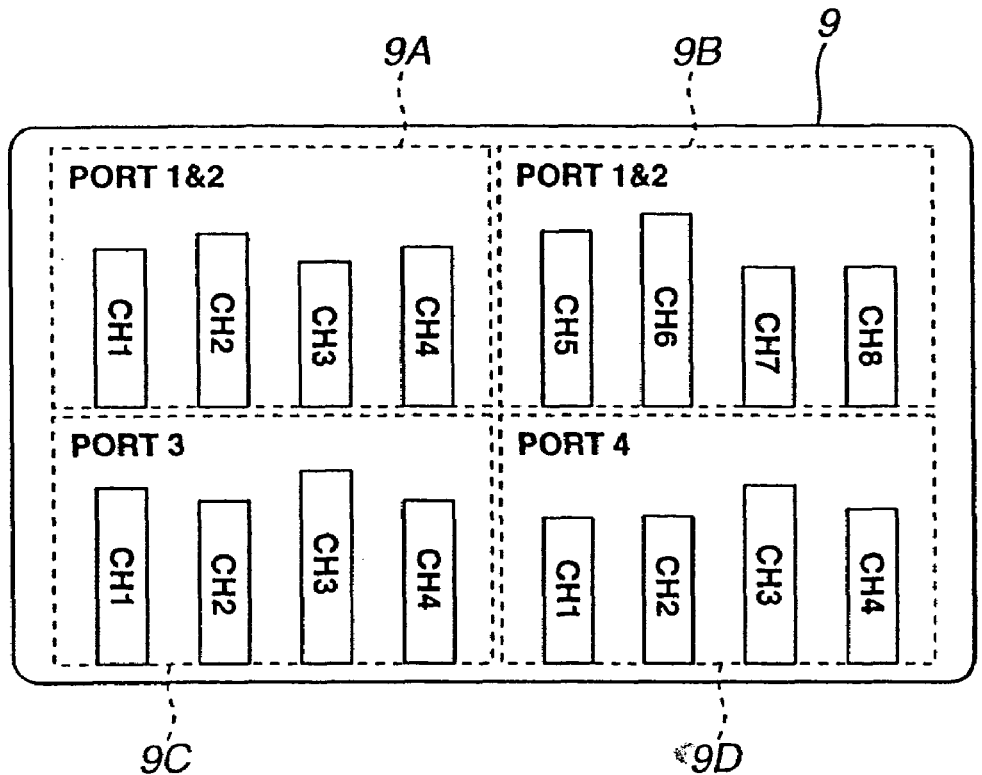
FIGS. 22A and 22B are diagrammatic views for explanation of the display of the meter indication unit in the mixed processing mode.
Figure 22B:
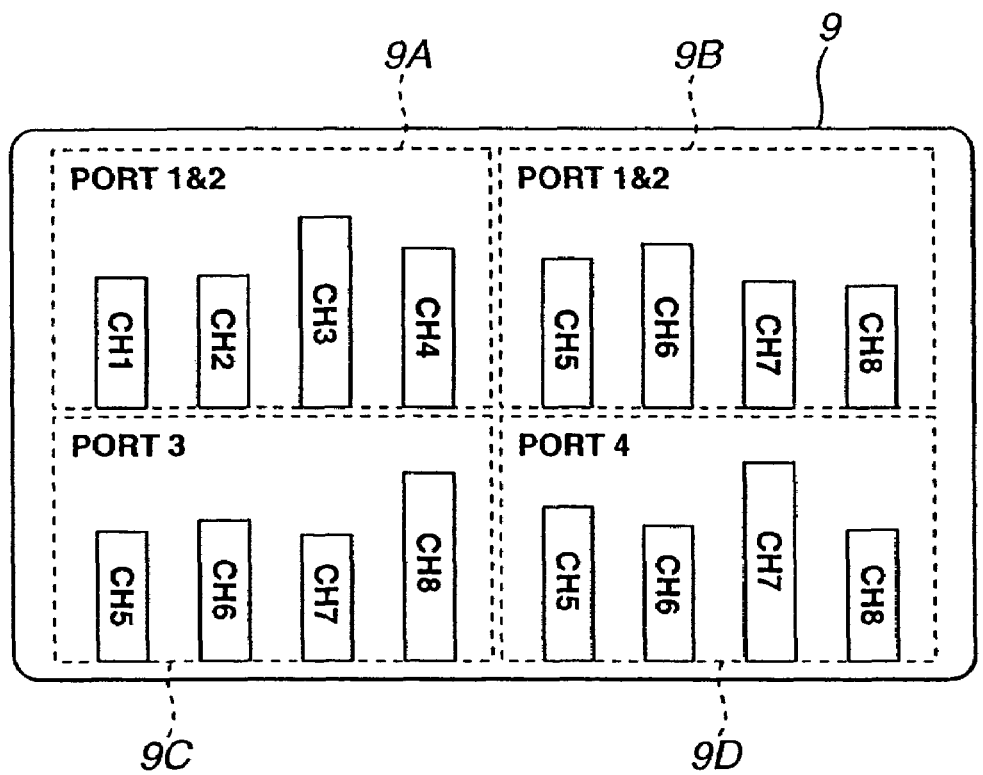
Figure 23:
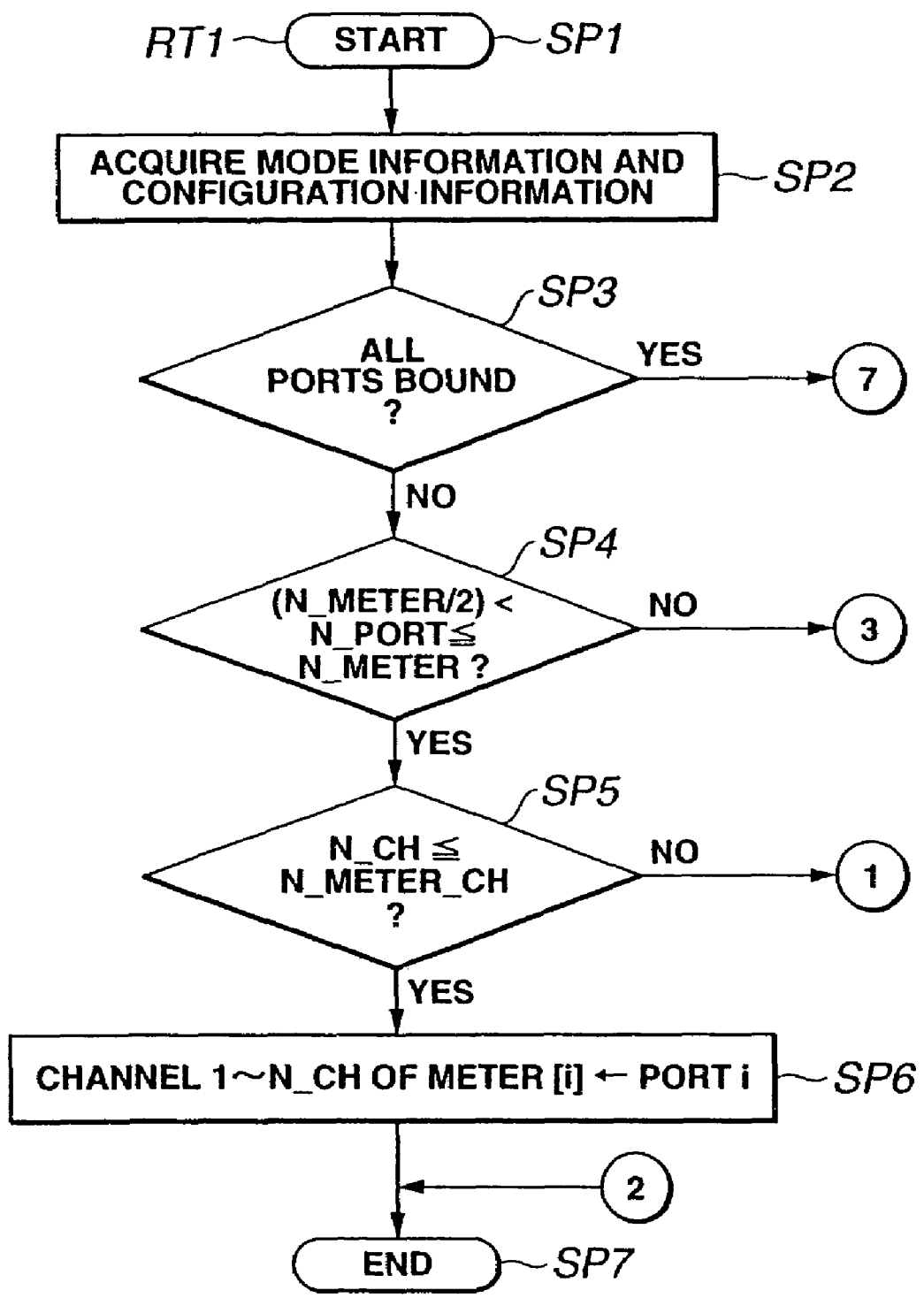
FIGS. 23 to 32 are flowcharts for illustrating the display allocation processing sequence.
Figure 24:
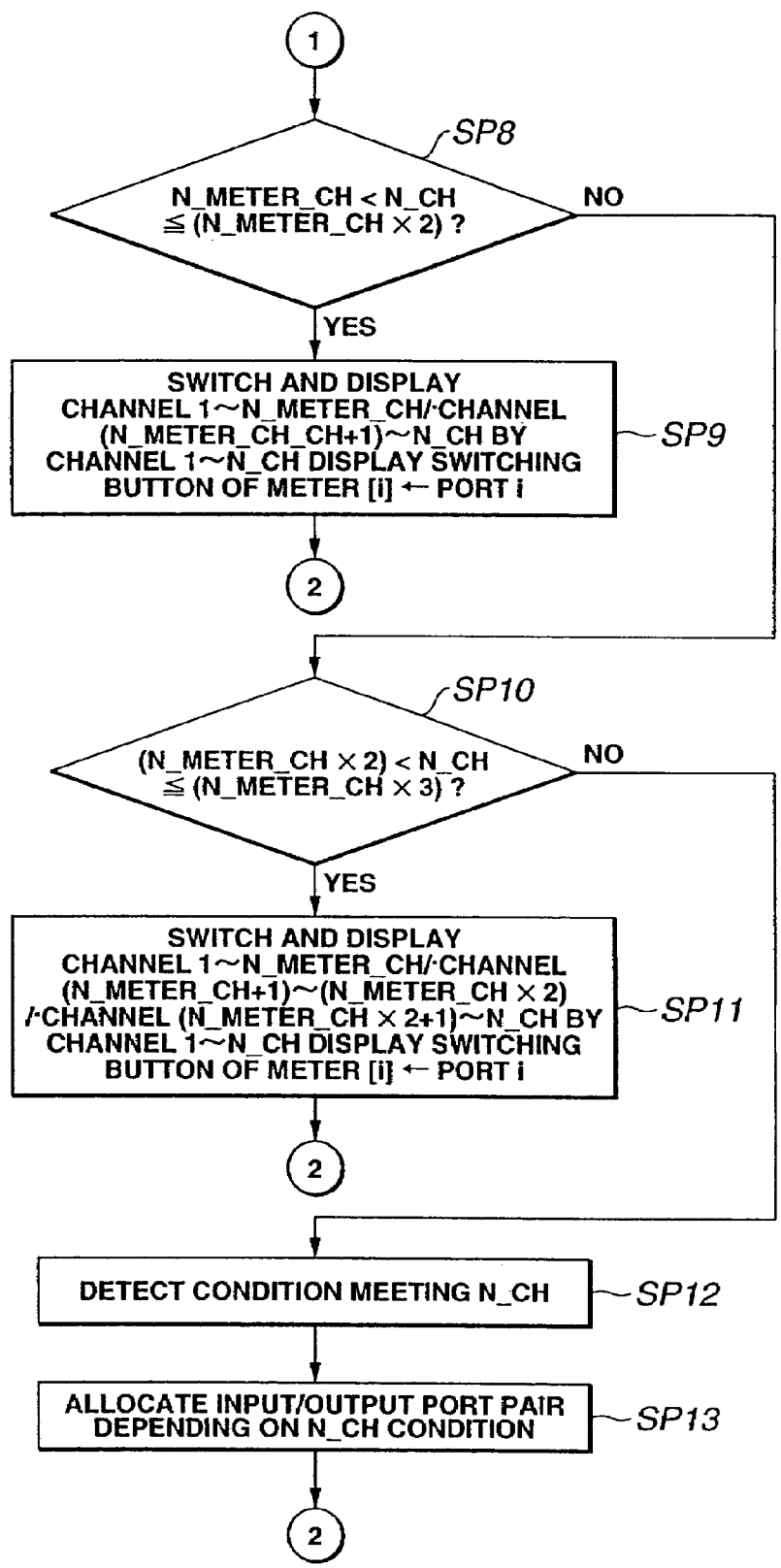
Figure 25:
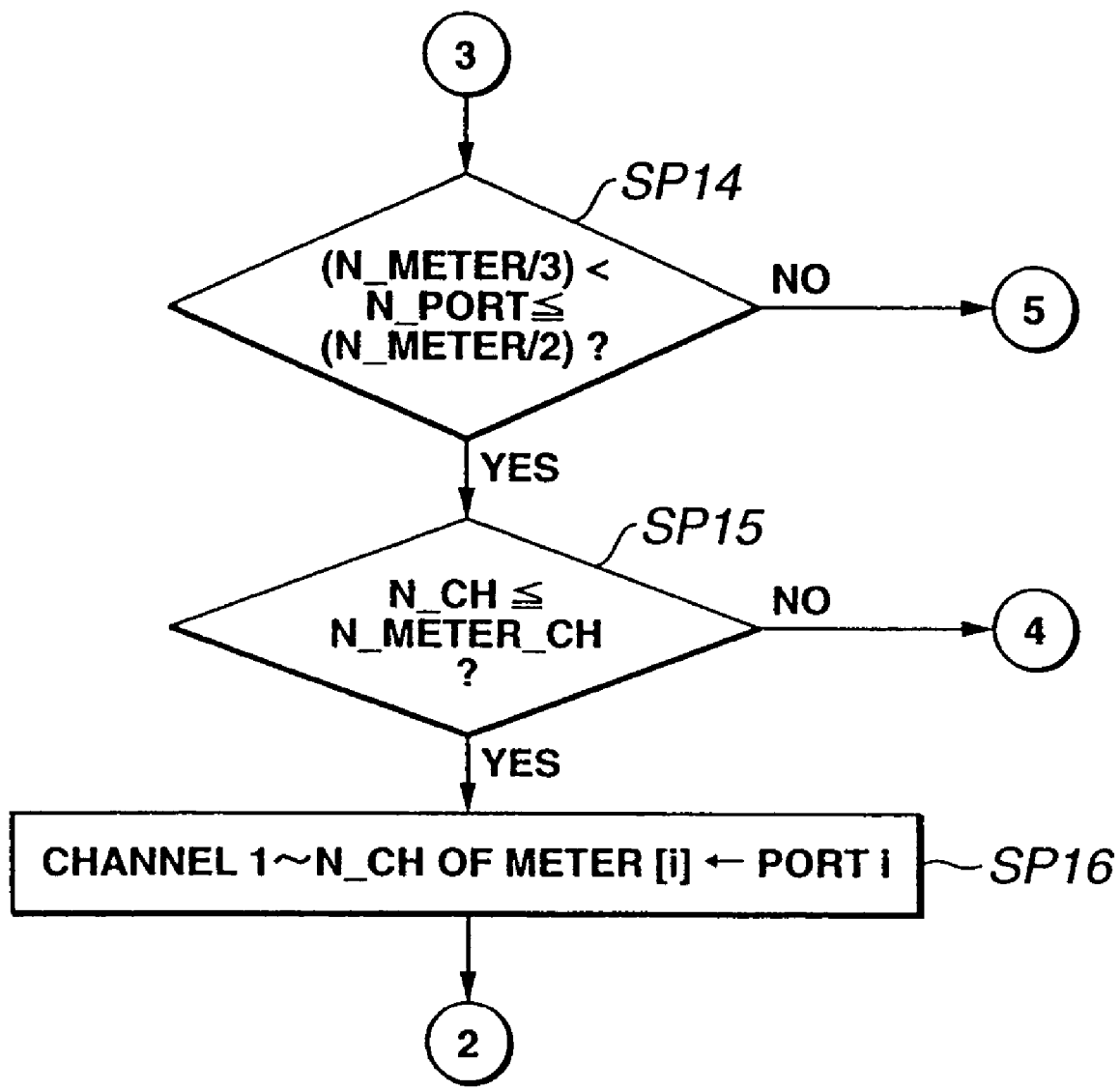
Figure 26:
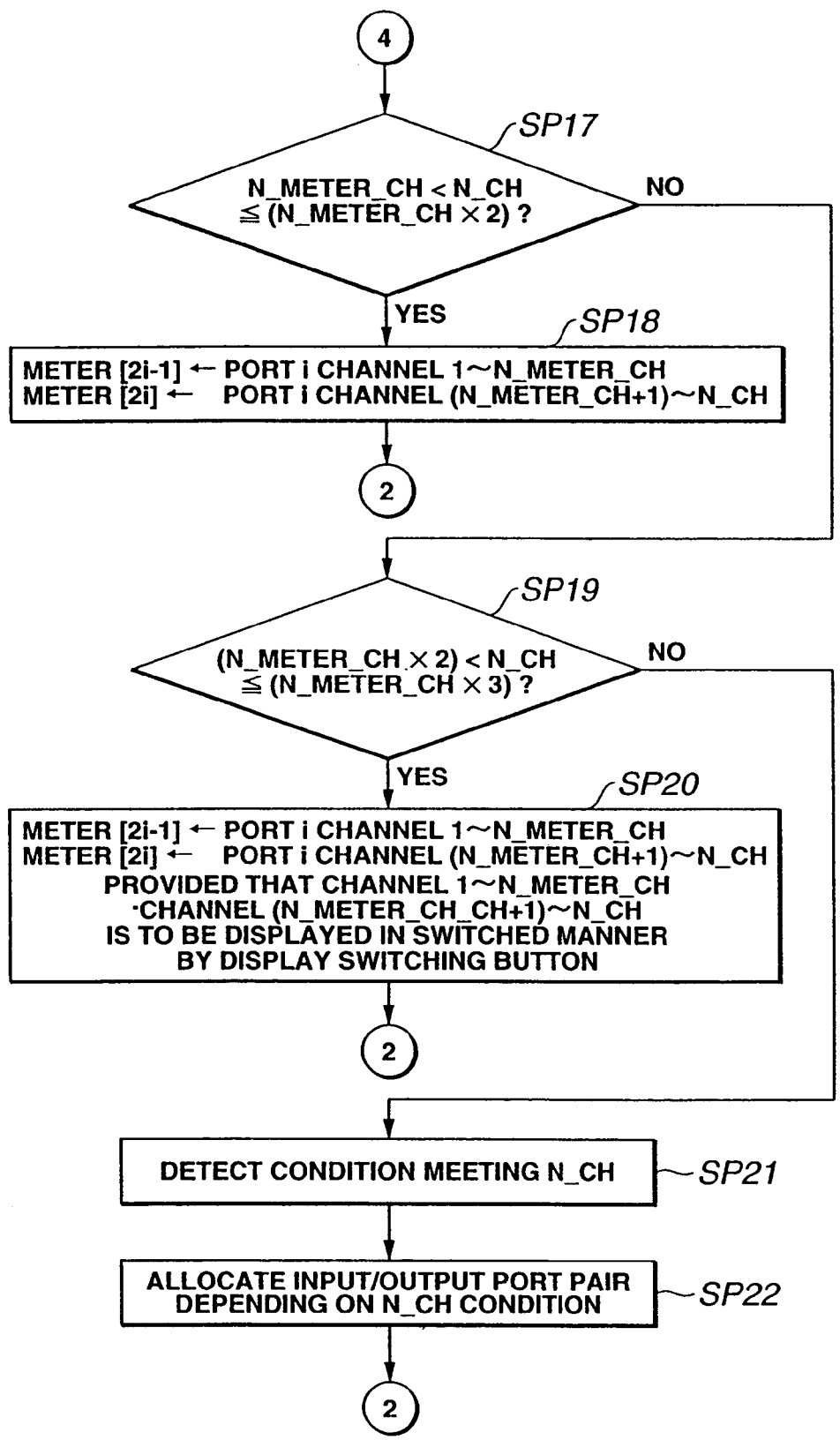
Figure 27:
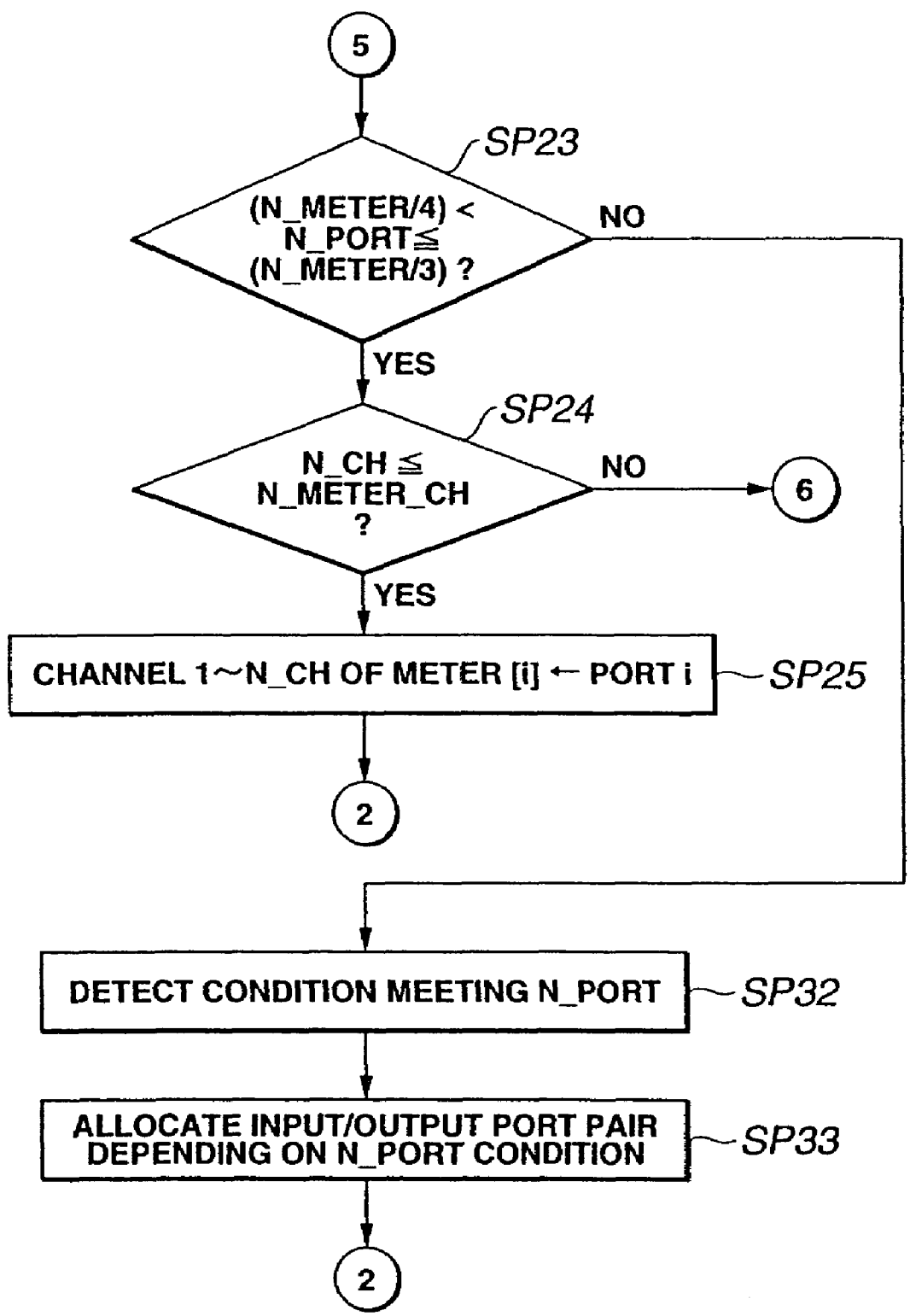
Figure 28:
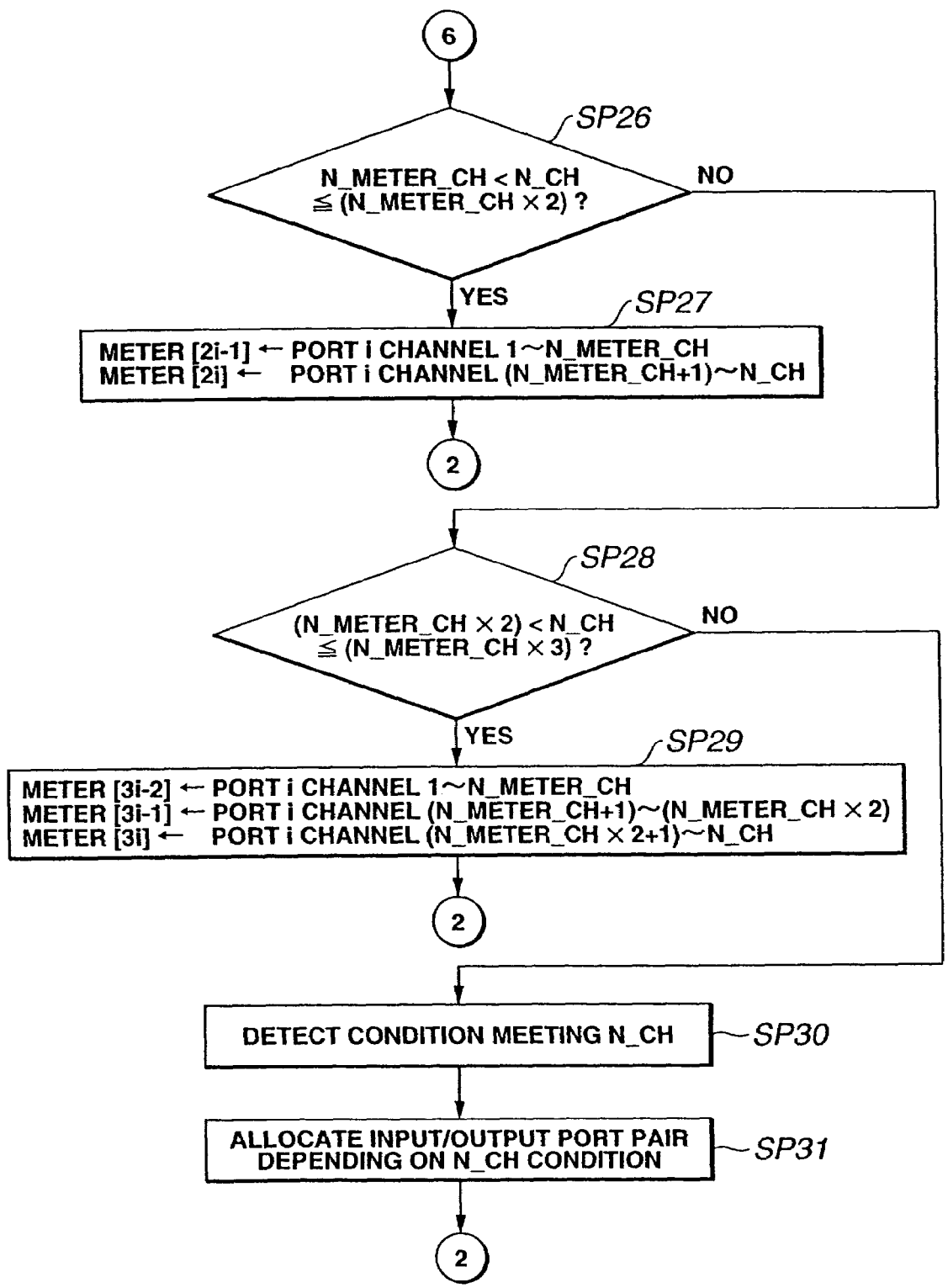
Figure 29:
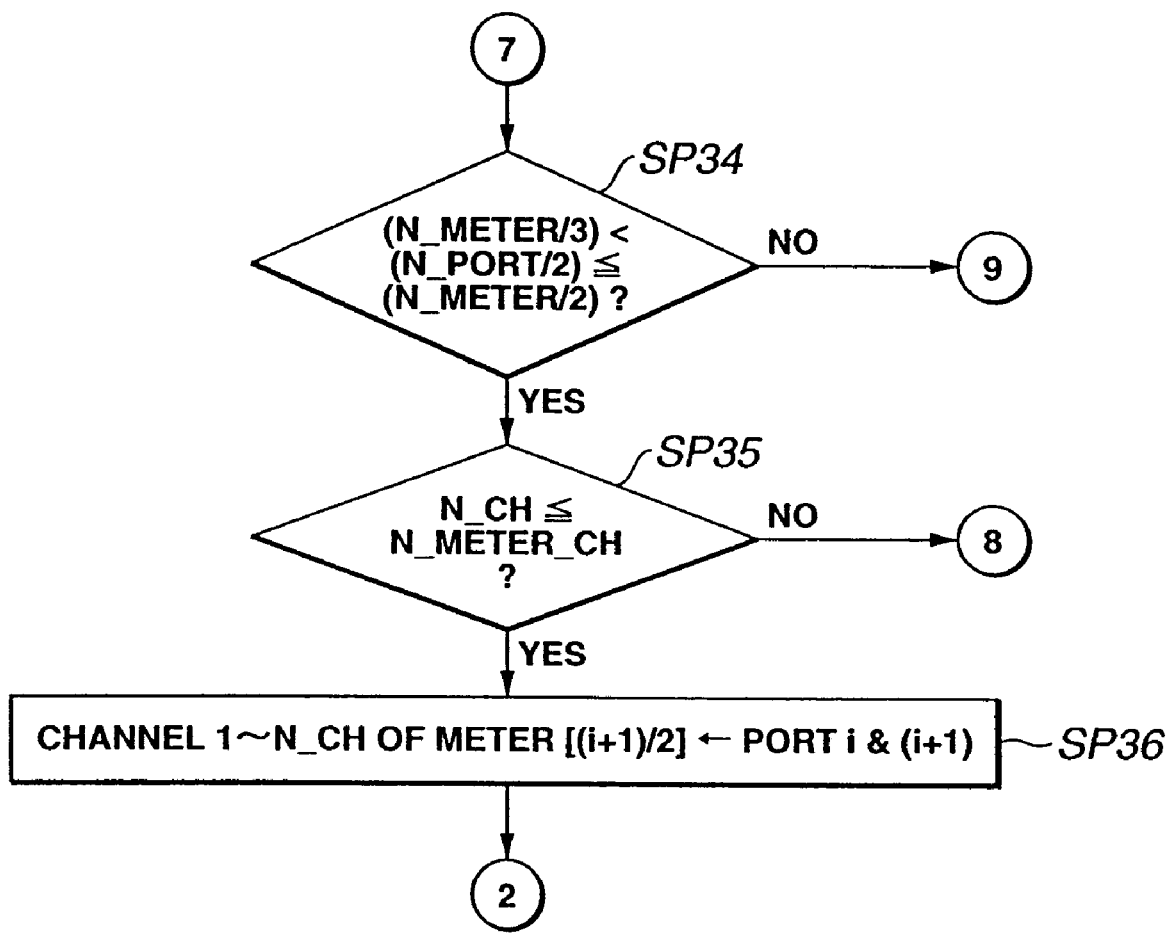
Figure 30:
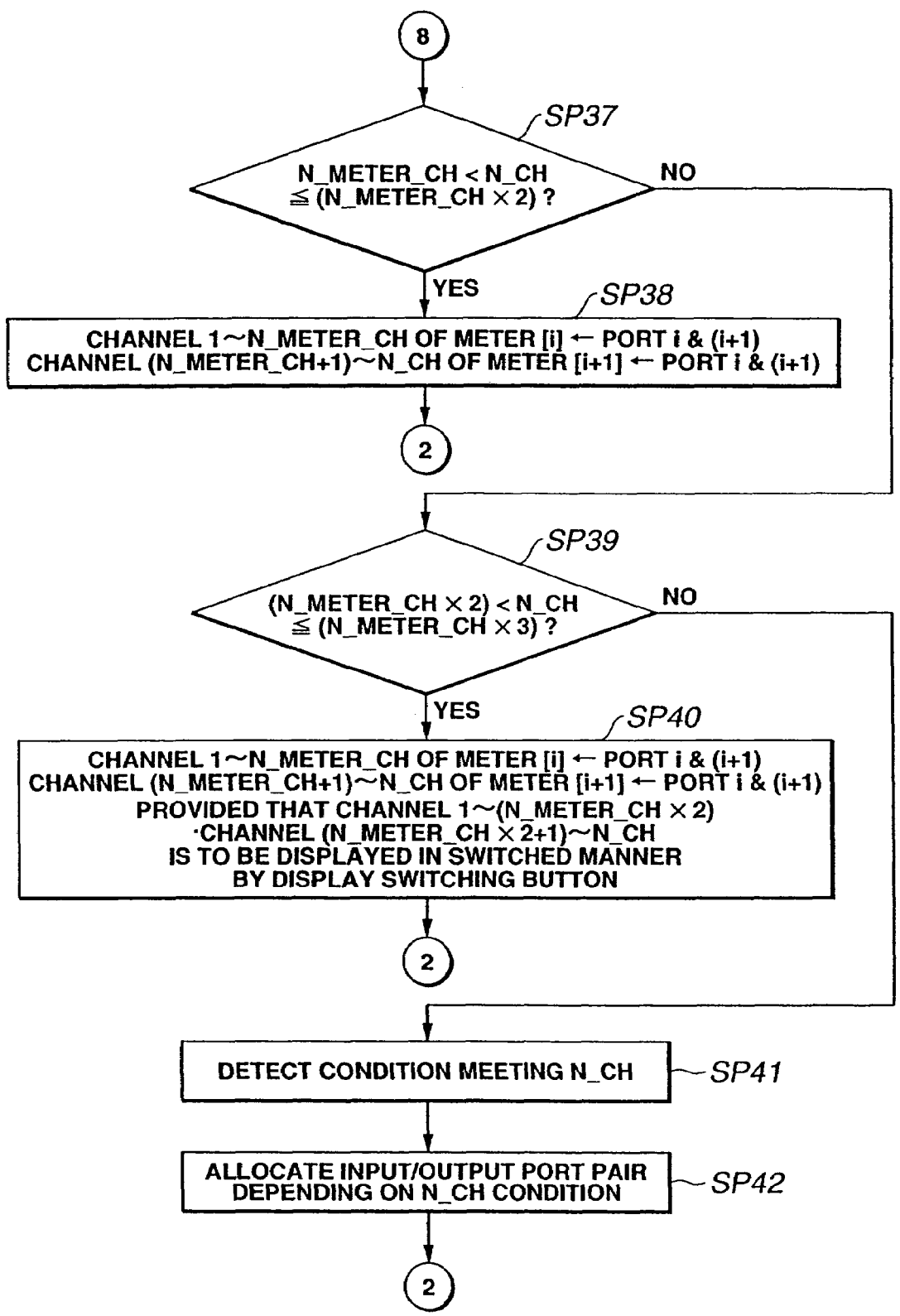
Figure 31:
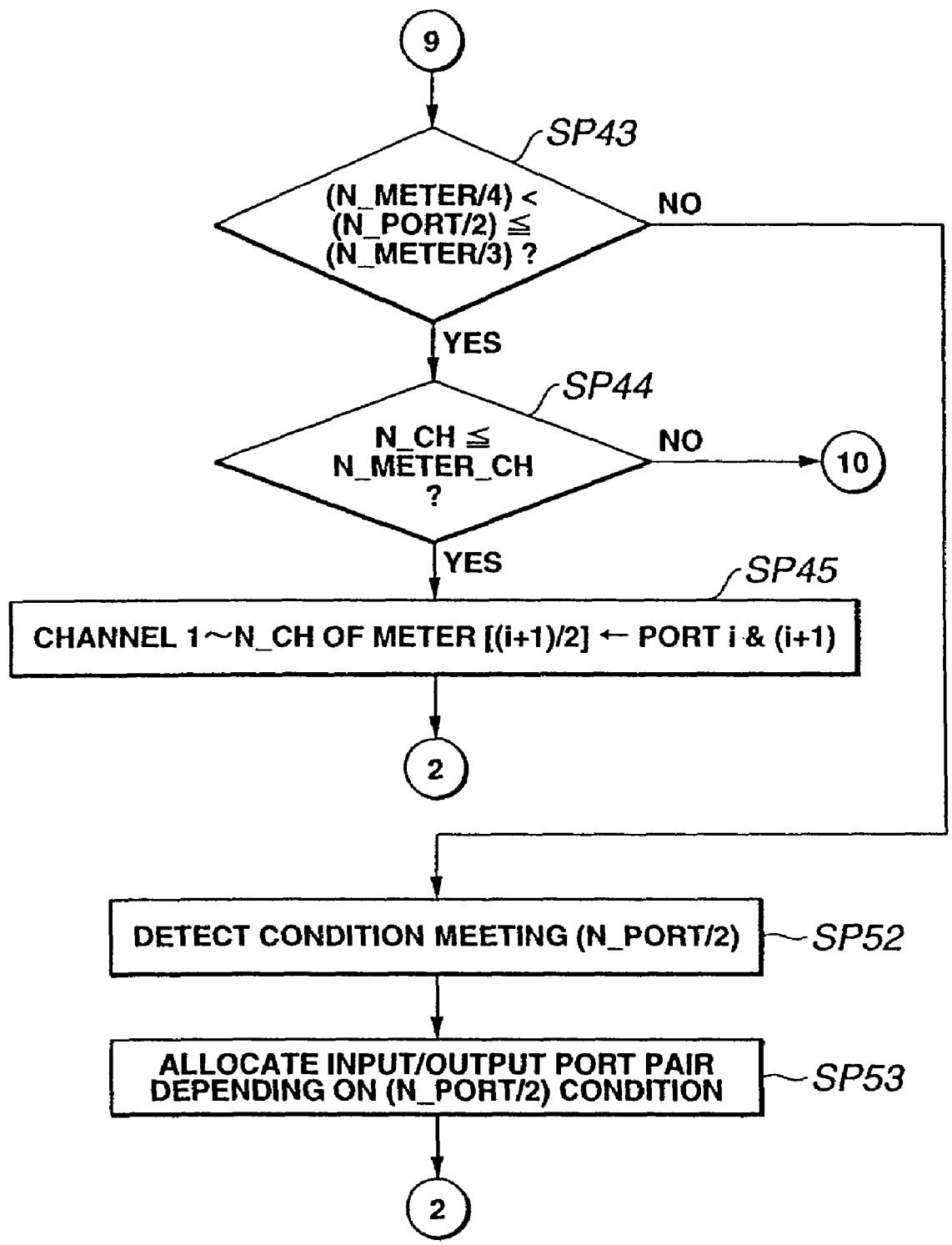
Figure 32:
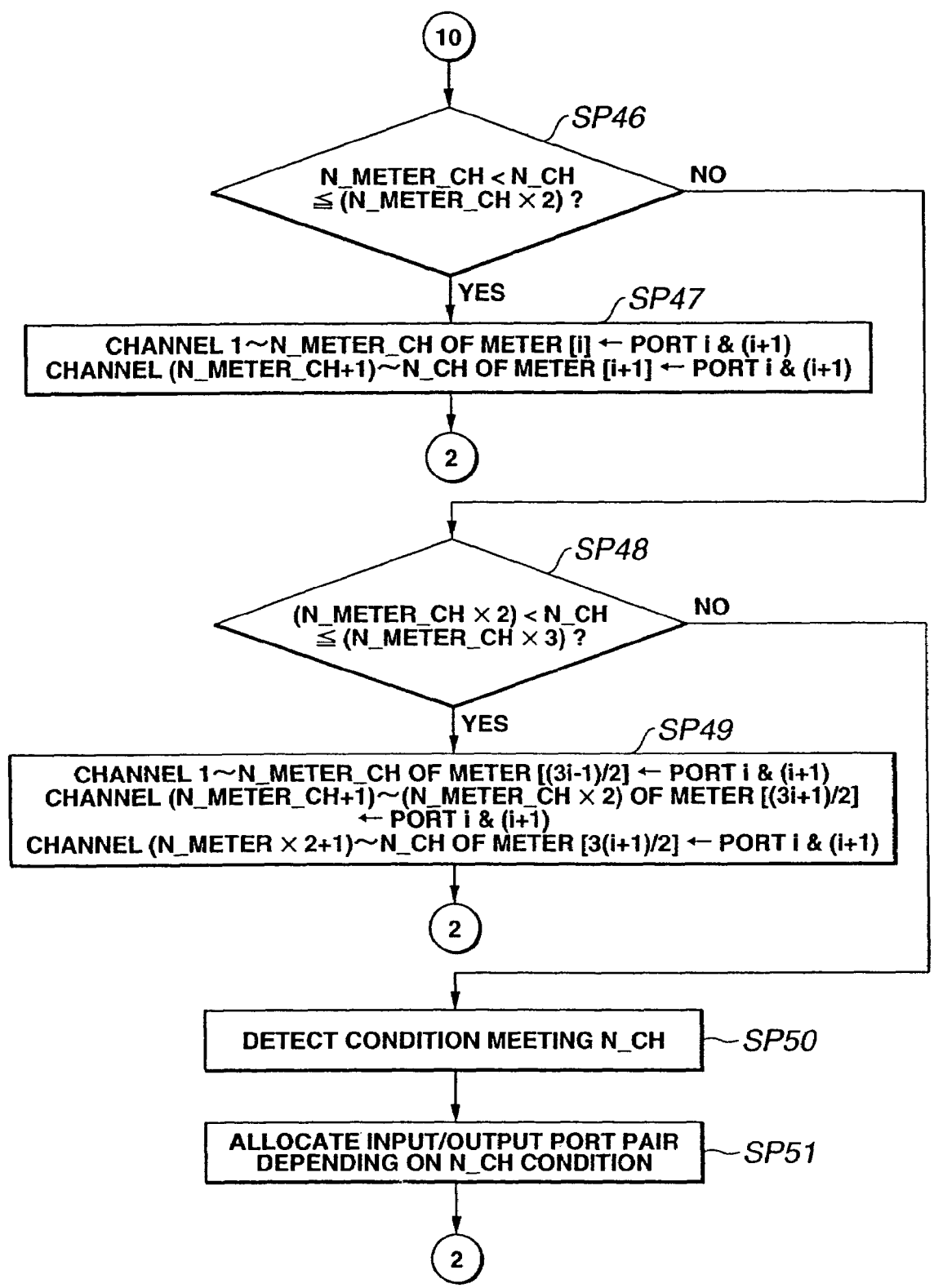
Figure 33A:
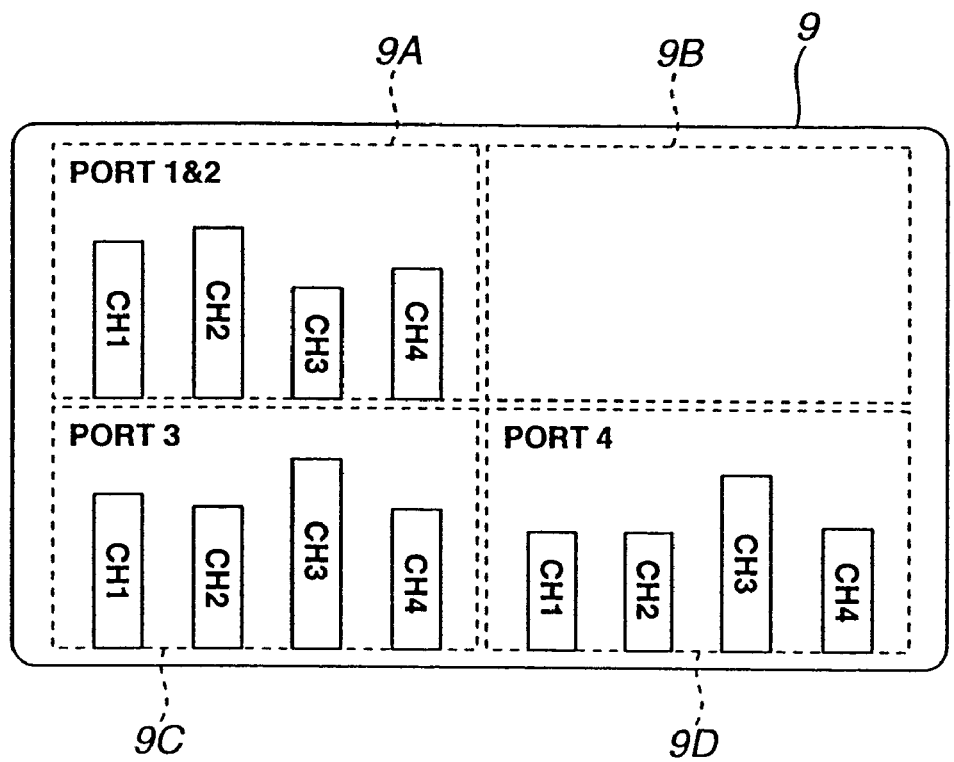
FIGS. 33A and 33B are diagrammatic views for explanation of the display on the meter indication unit in the mixed processing mode accrdoing to a modification.
Figure 33B:
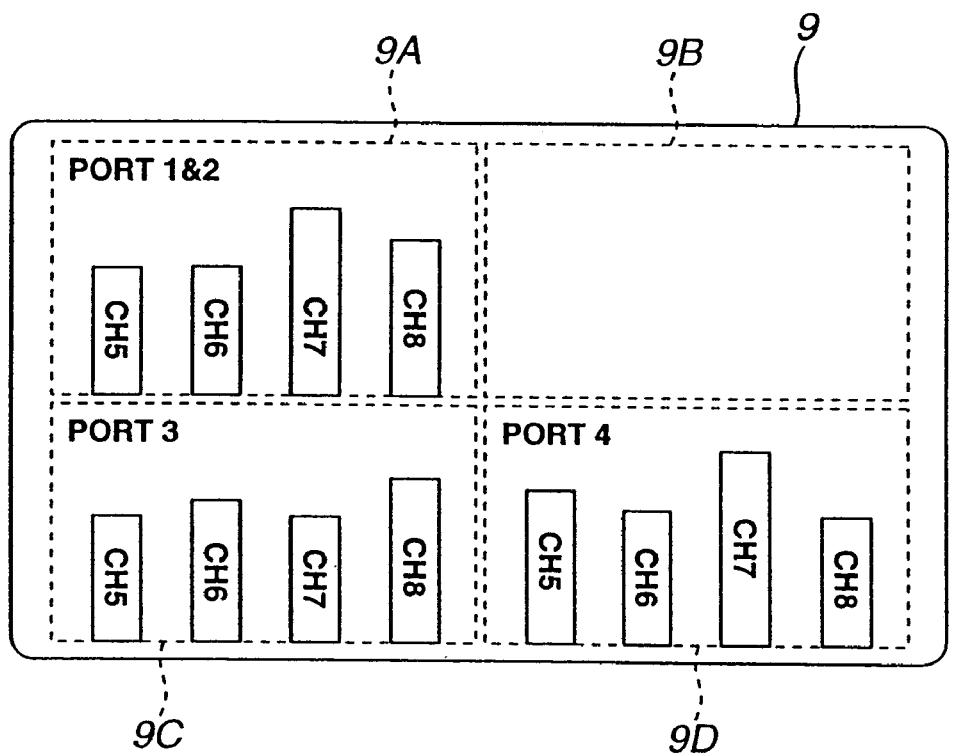

In the above-described embodiment, the audio level is displayed in the these first to fourth display areas 9A to 9D in the meter display unit 9 in the mixed processing mode, as shown in FIGS. 22A and 22B. This invention is, however, not limited to this configuration. For example, it is possible to display the audio level of audio data inputted or outputted via one of the input/output ports of the bound port pair only in the first meter display area 9A and to switch the display on the first meter display area 9A by the display switching button 66 as on the third and fourth meter display areas 9C and 9D, as shown in FIG. 33.

Referring to FIGS. 34 to 37, highlighting display of a selected port of the meter panel 9 adapted for demonstrating the audio level is explained in detail.

The meter panel 9 is a vacuum fluorescent display (VFD) tube having plural fluorescent elements arrayed in a pre-set pattern on a display surface. These fluorescent elements are illuminated in such a manner that the illumination period and the illumination stop period are alternately repeated to display the pre-set information on the display surface.

The meter panel 9 is so configured that the durations of the illumination period and the illumination stop period can be changed within a time interval which elapses since illumination of each fluorescent element until re-illumination following transient stop of illumination, without changing the duration of this time interval, referred to below as the period.

That is, with the present meter panel 9, the pre-set information can be enhanced or lowered in luminance by setting the illumination period of the fluorescent element so as to be longer or shorter than the illumination stop period, respectively. This renders it possible to vary the display brightness of the level meter for the selected port.

Figure 34:
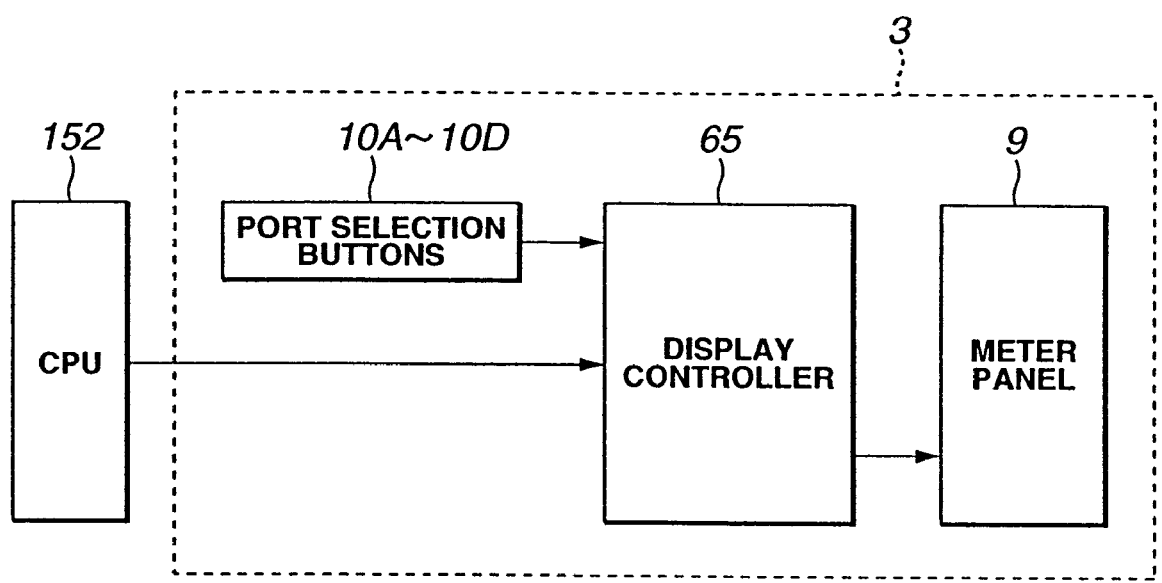
FIG. 34 is a block diagram showing a circuit structure in the meter panel.
Figure 35:
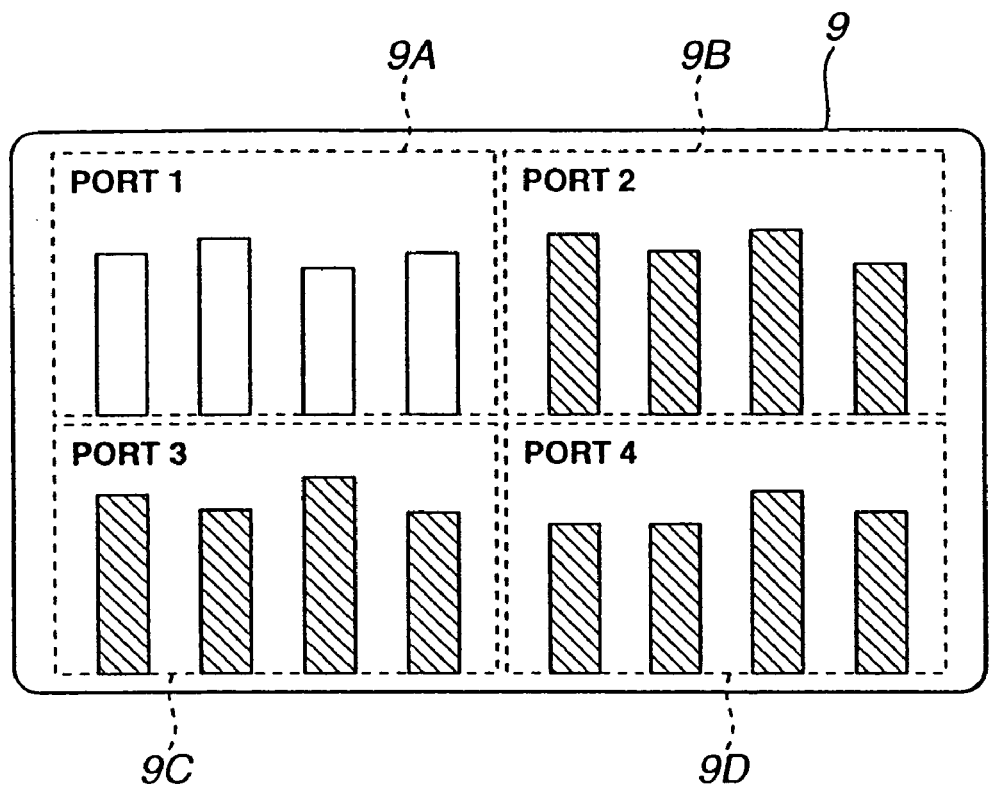
FIG. 35 is a diagrammatic view for illustrating the display of the meter panel display unit on selection of the first input/output port.
Figure 36:
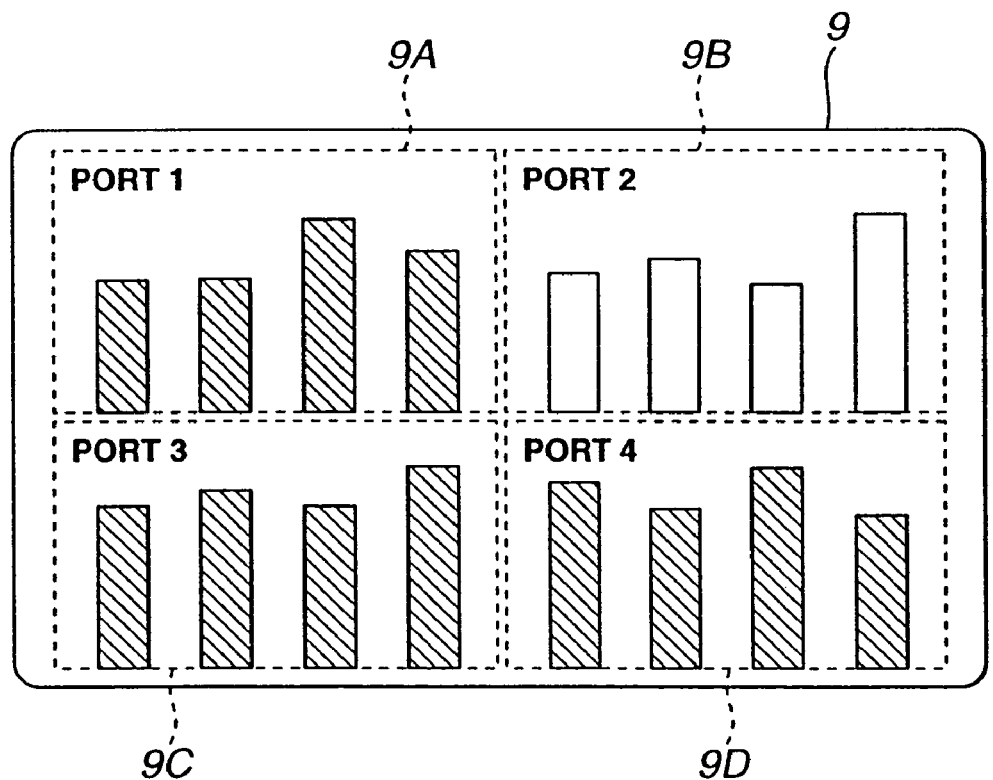
FIG. 36 is a diagrammatic view for illustrating the display of the meter panel display unit on selection of the second input/output port.
Figure 37:
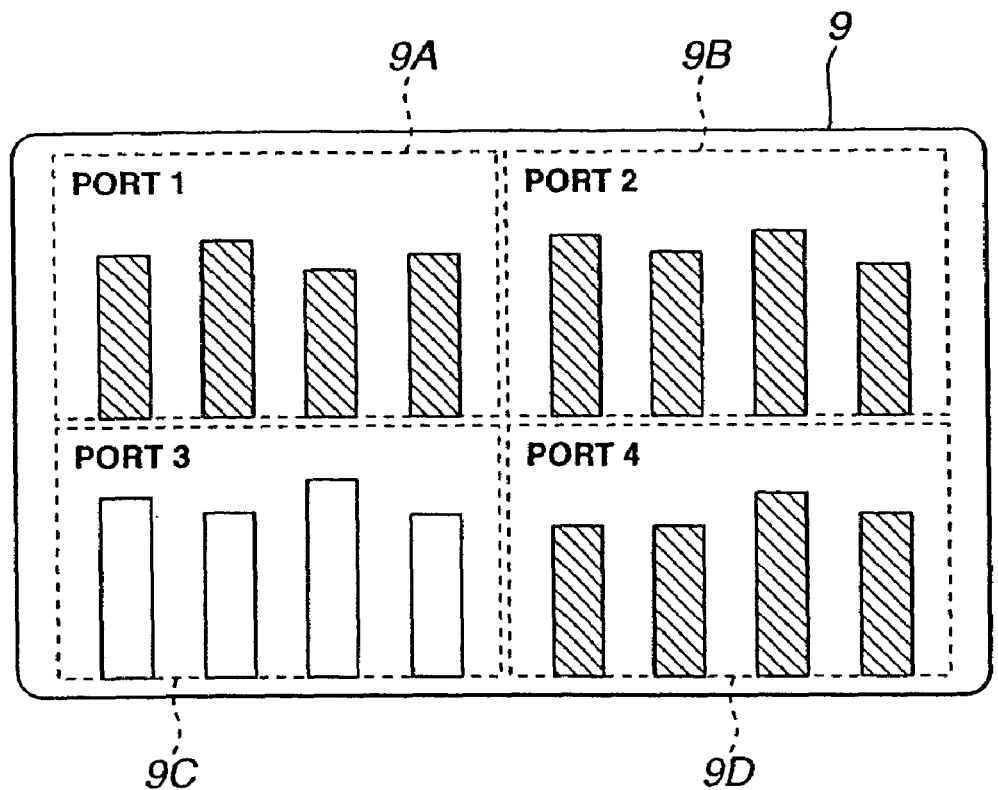
FIG. 37 is a diagrammatic view for illustrating the display of the meter panel display unit on selection of the third input/output port.
Figure 38:
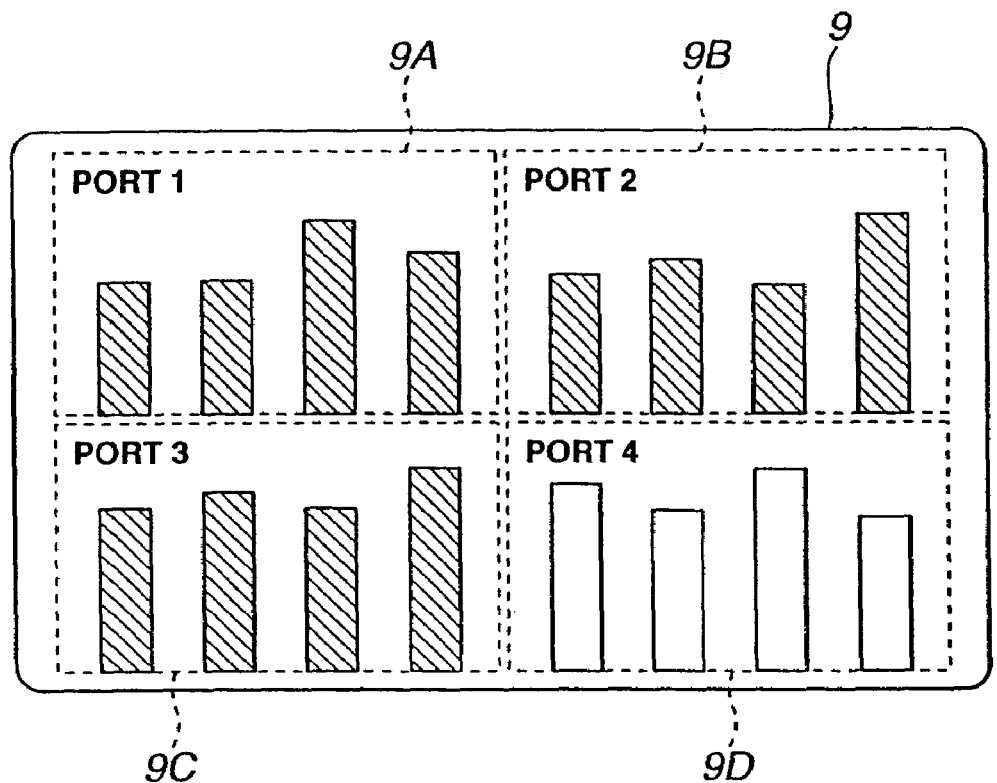
FIG. 38 is a diagrammatic view for illustrating the display of the meter panel display unit on selection of the fourth input/output port.

FIG. 34 shows the structure of the meter panel in case of changing the level meter.

The meter panel is generally made up of first to fourth port selection buttons 10A to 10D, the display controller 65 and the meter panel 9. The display controller 65 is connected to the CPU 152 of the editing manager 150.

Thus, if the first to fourth port selection buttons 10A to 10D are acted on on the meter panel 3 to select a desired input/output port and a port selection command specifying the selected input/output port is issued, the display controller 65 generates control data based on this port selection command.

The display controller 65 is fed from the CPU 152 of the editing manager 150 with the aforementioned level data for displaying on the level meter, configuration information and with the operation information, to generate control data from these data and the port selection command.

The display controller 65 sends the control data to the meter panel 9 to control the illumination of the fluorescent elements in the meter panel 9 based on the control data to vary the luminance of the pre-set information displayed on the first to fourth meter display areas 9A to 9D associated with the selected first to fourth input/output ports and that of the pre-set information displayed on the other ones of the first to fourth meter display areas 9A to 9D.

If, for example, the first input/output port is selected by the first to fourth port selection buttons 10A to 10D, the pre-set information, such as the audio level, is displayed in the first meter display area 9A associated with the selected first input/output port, at a higher pre-set first luminance, whilst the pre-set information, such as the audio level, is displayed in the remaining second to fourth meter display areas 9B to 9D at a pre-set luminance lower than the first luminance.

On the other hand, if one of the second to fourth input/output ports is selected by the first to fourth port selection buttons 10A to 10D, the pre-set information, such as the audio level, is displayed by the display controller 65 in one of the second to fourth meter display areas 9B to 9D associated with the selected one of the second to fourth input/output ports, at a higher pre-set first luminance, whilst the pre-set information, such as the audio level, is displayed in the other one of the first to fourth meter display areas 9A to 9D at a pre-set luminance lower than the first luminance.

Thus, if the first to fourth input/output ports are selected, the A/V server 1 displays only the one of the first to fourth meter display areas 9A to 9D associated with the selected one of the first to fourth input/output ports with an enhanced luminance, such that one of the first to fourth meter display areas 9A to 9D associated with the selected one of the first to fourth input/output ports can be distinguished and recognized easily.

In the preferred embodiment, if the first luminance in displaying the pre-set information on the first to fourth meter display areas 9A to 9D is 100%, the second luminance is e.g., 50% of the first luminance.

Figure 39:
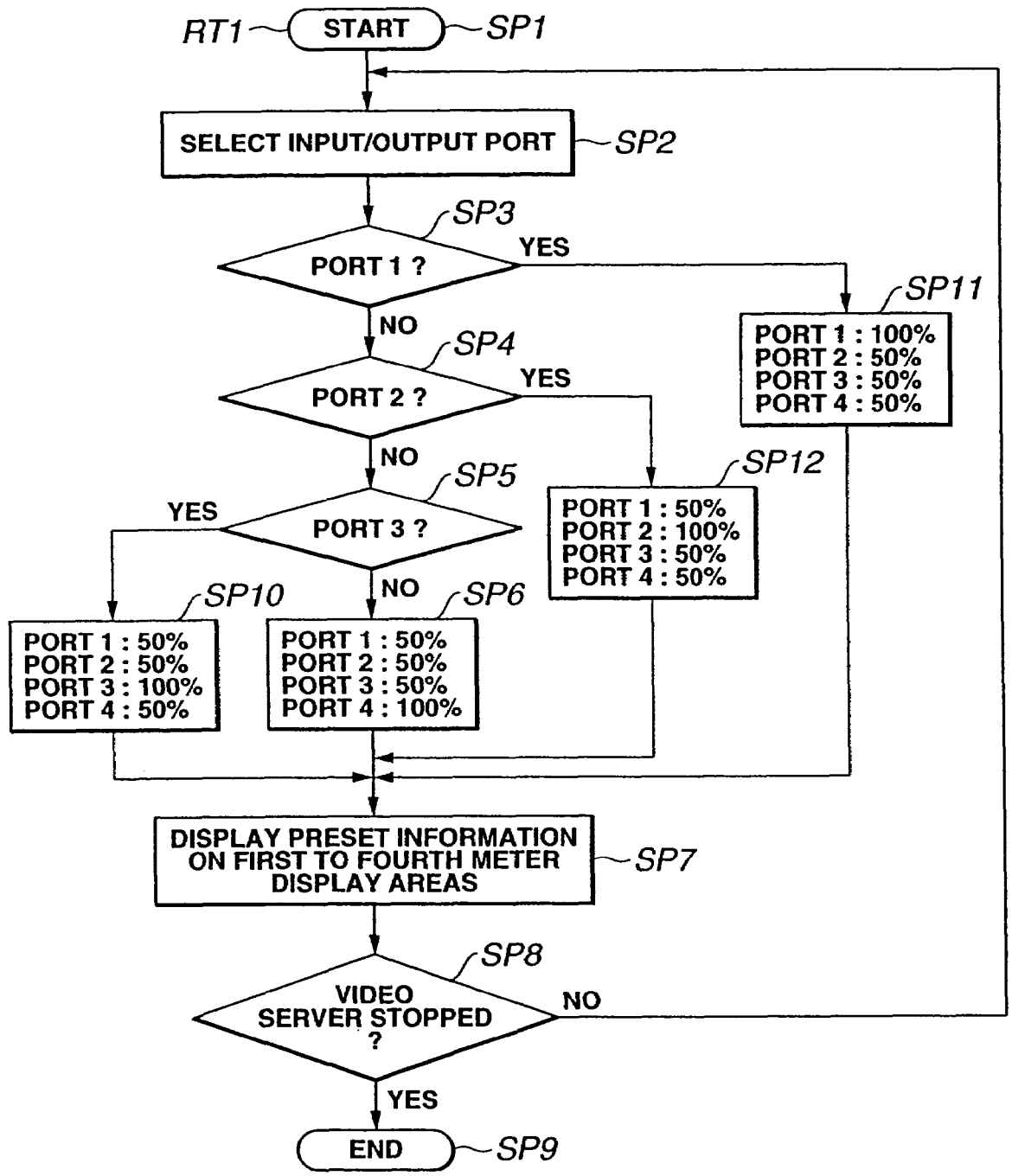
FIG. 39 is a flowchart for illustrating the display state switching processing sequence.
Figure 40:
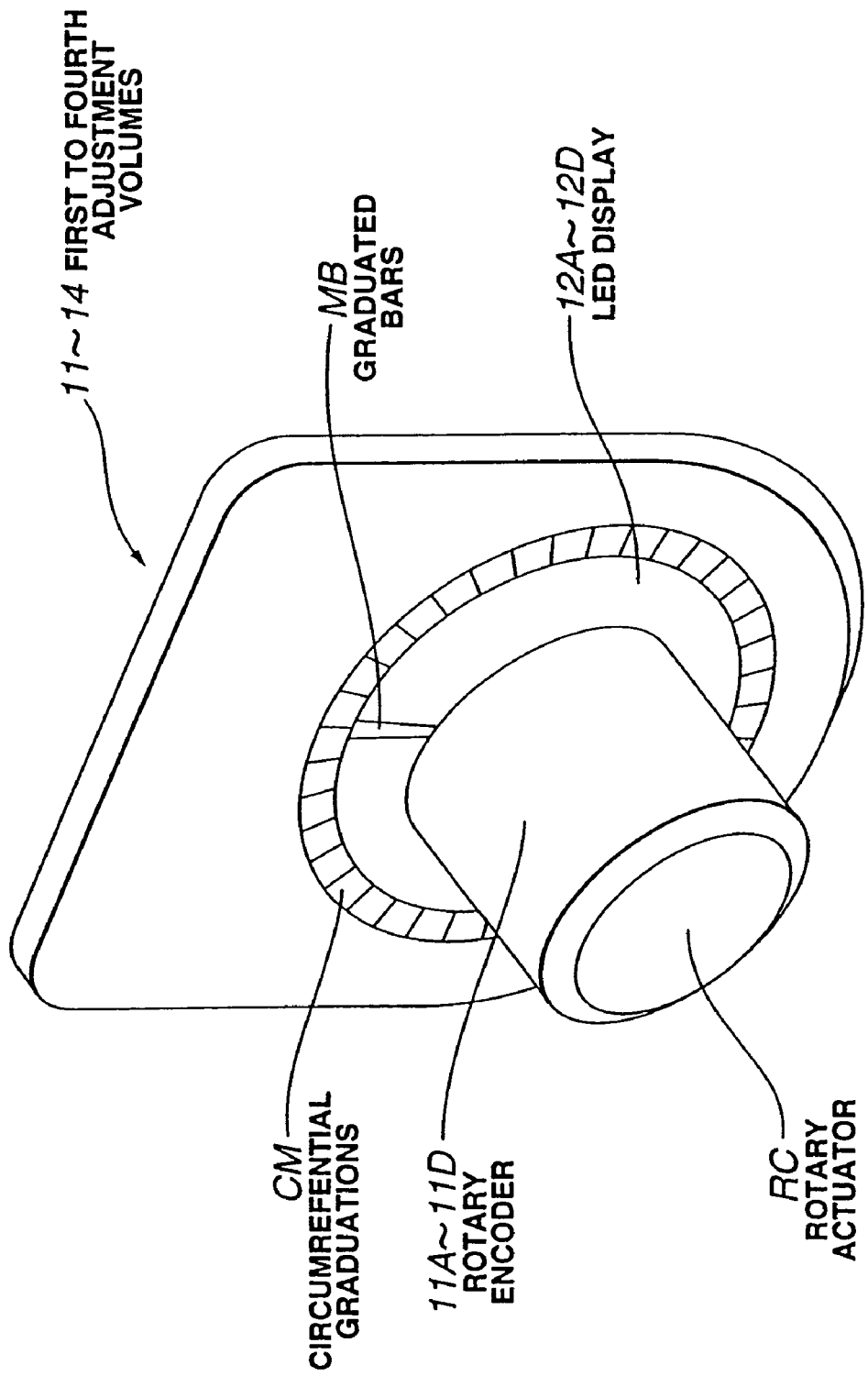
FIG. 40 is a diagrammatic perspective view showing the appearance and the structure of an adjustment volume in the present configuration.

Referring to FIG. 39, display state switching control for the meter panel 9, performed by the display controller 65, is explained. If the display state switching control is initiated at step SP1, the display controller 65 waits for selection of one of the input/output ports at step SP2. If the desired one of the input/output ports is selected by actuation of the first to fourth port selection buttons 10A to 10D, the display controller 65 advances to the next step SP3.

At this step SP3, the display controller 65 checks whether or not the selected input/output port is the first input/output port.

If the result of check at this step SP3 is negative, that is if one of the second to fourth input/output ports, that is the input/output port other than the first input/output port, is selected, the display controller 65 advances to step SP4 to check whether or not the selected input/output port is the second input/output port.

If the result of check at this step SP4 is negative, that is if the third or fourth input/output port, that is the input/output port other than the first and second input/output ports, is selected, the display controller 65 advances to step SP5 to check whether or not the selected input/output port is the third input/output port.

If the result of check at this step SP5 is negative, that is if the input/output port selected at this step SP5 is the fourth input/output port, the display controller 65 advances to the next step SP6 to generate control data D22 configured for displaying the pre-set information only in the fourth meter display area 9D associated with the selected fourth input/output port, at the first luminance, and for displaying the corresponding pre-set information in the other first to third meter display areas 9A to 9C at the second luminance.

The display controller 65 then advances to step SP7 to send out the port data D21 along with the control data D22 to control light emission of each phosphorescent element in the meter display unit 9 in order to display the pre-set information in the fourth meter display area 9D at a first luminance and in order to display the corresponding pre-set information in the other meter display areas 9A to 9C.

The display controller 65 then advances to step SP8 to verify whether or not the operation of the A/V server 1 is halted. If the result of check is negative, that is if the A/V server 1 is still in operation, the display controller 65 reverts to the aforementioned step SP2 to repeat the processing of the steps SP2 to SP8 until the affirmative result is obtained at this step SP8.

If the A/V server 1 is halted such that the affirmative result is obtained at this step S8, the display controller 65 advances to step SP9 to terminate the luminance changing processing sequence RT1.

If the result of check at this step SP5 is affirmative, that is if the input/output port selected at this step SP5 is the third input/output port, the display controller 65 advances to the next step SP10 to generate control data D22 configured for displaying the pre-set information only in the third meter panel 9C associated with the selected third input/output port, at the first luminance, and for displaying the pre-set information in the other first, second and fourth meter display areas 9A, 9B and 9D at the second luminance. The display controller 65 then advances to step SP7.

If the result of check at this step SP3 is affirmative, that is if the input/output port selected at this step SP5 is the first input/output port, the display controller 65 advances to the next step SP11 to generate control data D22 configured for displaying the pre-set information only in the first meter panel 9A associated with the selected third input/output port, at the first luminance, and for displaying the pre-set information in the other second to fourth meter display areas 9B to 9D at the second luminance. The display controller 65 then advances to step SP7.

If the result of check at this step SP4 is affirmative, that is if the input/output port selected at this step SP5 is the second input/output port, the display controller 65 advances to the next step SP12 to generate control data D22 configured for displaying the pre-set information only in the second meter panel 9B associated with the selected second input/output port, at the first luminance, and for displaying the pre-set information in the other first, third and fourth meter display areas 9A, 9C and 9D at the second luminance. The display controller 65 then advances to step SP7.

Thus, if the first to fourth input/output ports are selected, the first to fourth meter display areas 9A to 9D, associated with the selected input/output ports, can be recognized easily and reliably based on the displayed states of the first to fourth meter display areas 9A to 9D.

The result is that the contents of the first to fourth meter display areas 9A to 9D associated with the selected first to fourth input/output ports can be checked reliably to prevent mistaken setting of the pre-set information.

In the above-described embodiment, the pre-set information associated only with the first to fourth meter display areas 9A to 9D associated with the selected first to fourth input/output ports is displayed at the first luminance, while the pre-set information for the other ones of the first to fourth meter display areas 9A to 9D is displayed at the second luminance. The present invention, however, is not limited to this configuration. Thus, if the first to fourth meter display areas 9A to 9D, associated with the selected first to fourth input/output ports, can be discriminated easily, it is possible to change the display state by a variety of techniques, such as by changing the display color for the pre-set information from that of the meter display areas other than that of the selected port.

The first to fourth adjustment volumes 11 to 14 for adjusting the audio level, mounted on the meter panel 3, are explained. These adjustment volumes 11 to 14 are used for adjusting the level meters indicated on the meter panel 9, and are selectively thrust to adjust the audio level.

The first to fourth adjustment volumes 11 to 14 are made up of rotary encoders 11A to 11D for performing level adjustment responsive to the amount of rotation of a rotary actuator RC and a light emitting diodes (LED) display units 12A to 12D for light emitting display of setting values, level-adjusted by the rotary encoders 11A to 11D by a graduated bar MB in terms of an angle of rotation from a pre-set reference position.

An operator, viewing the graduated bar MB displayed by being illuminated in the LED display units 12A to 12D, rotates the rotary actuator RC of the rotary encoders 11A to 11D in a desired direction to adjust the audio level depending on the amount of rotation. On the outer rims of the LED display units 12A to 12D, there are formed circumferential graduations CM. A level setting value is determined at a level corresponding to the positions of the graduations when the graduated bar MB is matched to the desired point on the circumferential graduations CM.

The structure of the meter panel 3, inclusive of the adjustment volumes 11 to 14, is now explained.

Figure 41:
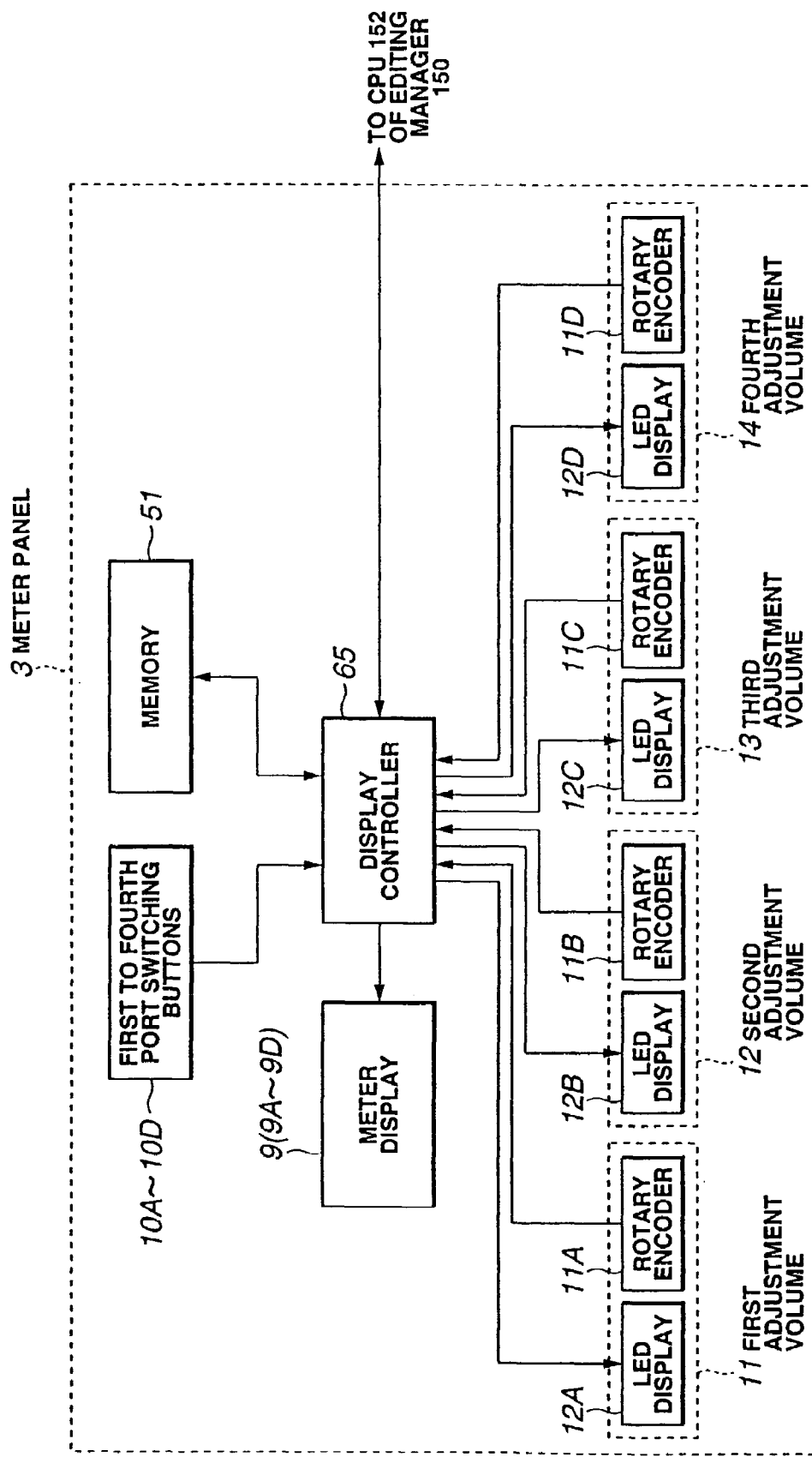
FIG. 41 is a block diagram showing the internal structure of a meter panel in the present configuration.

Referring to FIG. 41, the meter panel 3 includes an LED display unit 12A and a rotary encoder 11A, making up a first adjustment volume 11, an LED display unit 12B and a rotary encoder 11B, making up a second adjustment volume 12, an LED display unit 12C and a rotary encoder 11C, making up a third adjustment volume 13, an LED display unit 12D and a rotary encoder 11D, making up a fourth adjustment volume 14, the display controller 65, meter display unit or meter panel 9, a memory 51 and port changeover buttons 10A to 10D.

The volumes 11 to 14 are as described above.

The display controller 65 is connected to the volumes 11 to 14, meter display unit or meter panel 9, port changeover buttons 10A to 10D, memory 51 and to the CPU 51 of the editing manager 150.

The display controller 65 is fed with level data, configuration data and the operation data from the CPU 152, as described above, and displays the audio level on the port basis in the meter panel 9. The display controller 65 also writes the audio level in the memory 51.

On reception of a port selection signal, representing the ports P1 to P4 specified from the first to fourth port selection buttons 10A to 10D by the operator, the display controller 65 emits light in the LED display units 12A to 12D of the first to fourth adjustment volumes 11 to 14, so that the audio level of the four channels for the ports will be subjected to adjustment, while reading the setting values of the audio level of the four channels for the designated ports from the memory 51 to send out the read-out setting values to the LED display units 12A to 12D. Thus, in the LED display units 12A to 12D, the graduated bar MB is illuminated at the graduated positions corresponding to the setting values of the respective audio levels.

If the operator rotates the rotary actuator RC of the rotary encoders 11A to 11D, in a desired direction to set the audio level at a desired value, the display controller 65 stores the setting values in the memory 51, while re-adjusting the audio level of the corresponding audio level based on the setting values.

The operator then thrusts one of the port selection buttons 10A to 10D to switch from the current designated port to another port. The CPU 50 then reads out from the memory 51 the setting values of the audio level for each channel, previously adjusted at the selected port, and displays the setting values by the graduated bar MB at the graduated position of the LED display units 12A to 12D corresponding to the setting values.

Figure 42:
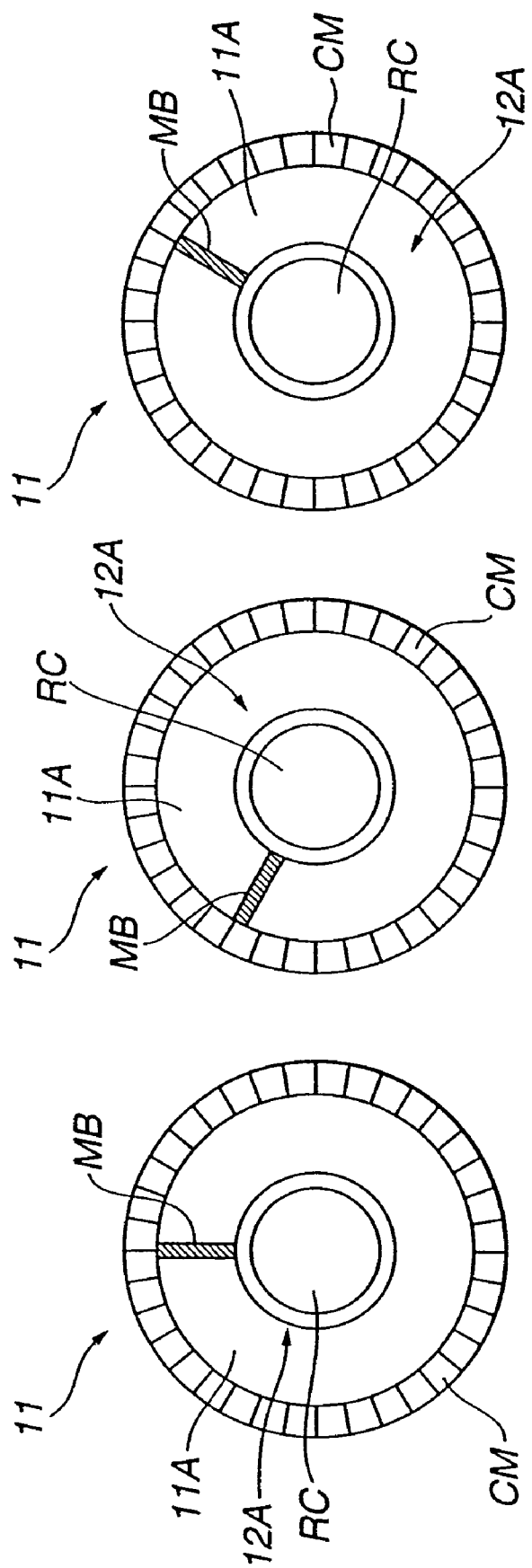
FIGS. 42A, 42B and 42C are plan views for illustrating the display state on port switching.

For example, in the first adjustment volume 11, in which the first port P1 has been designated, as shown in FIG. 42A, the operator rotates the rotary actuator RC in the direction indicated by arrow a, in a state in which the graduated bar MB displayed on the LED display unit 12A coincides with the graduated position corresponding to 0 dB, until the graduated bar MB coincides with the graduated position corresponding to 0 dB.

When the operator thrusts the second changeover button 10B to switch from the first port P1 to the second port P2, the graduated bar MB indicated on the LED display unit 12A is not coincident with the graduated position corresponding to 0 dB. Instead, the graduated bar MB is illuminated at the graduated position corresponding to the setting value of the audio level for which the second port P2 is designated last time, as shown in FIG. 42C.

Figure 43:
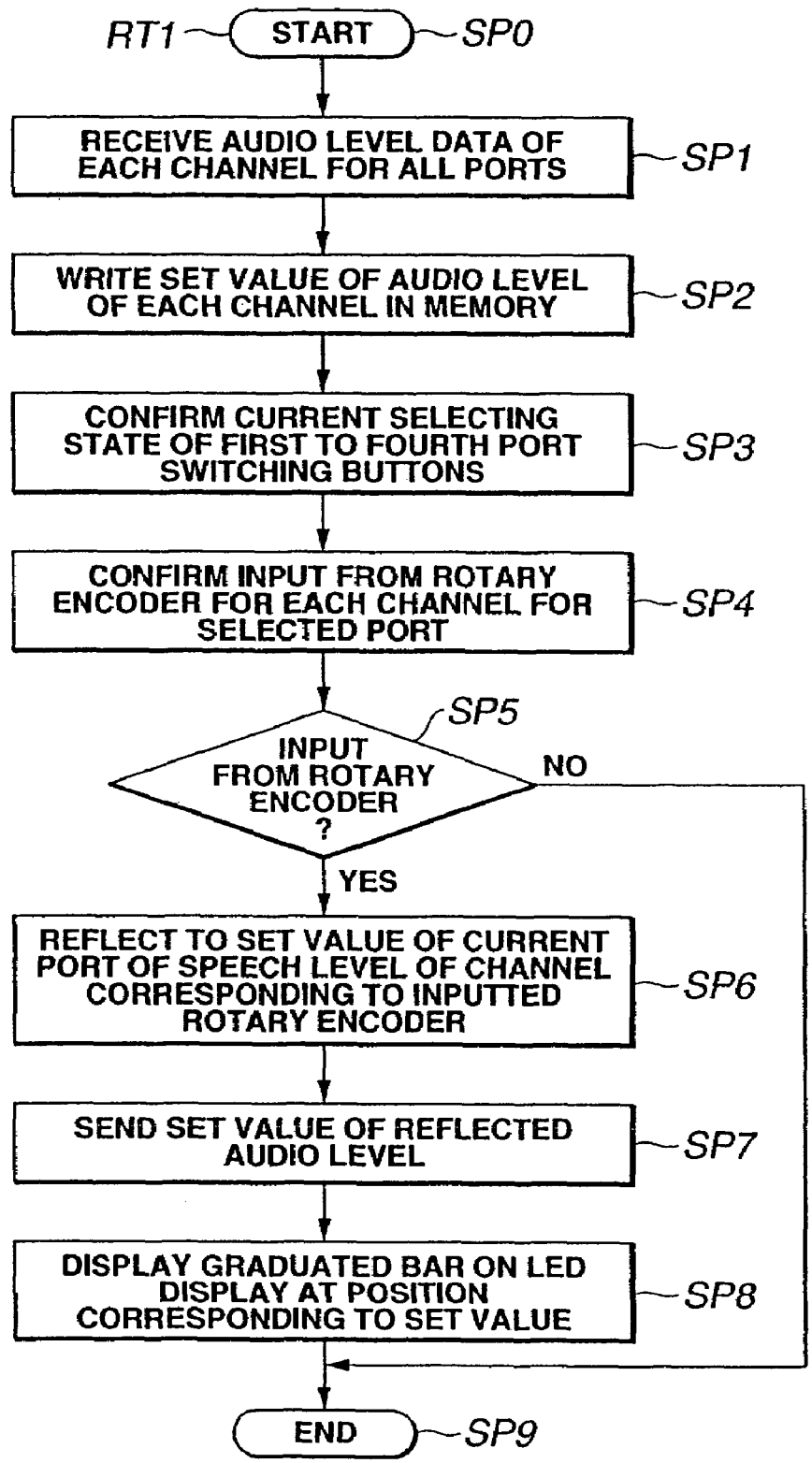
FIG. 43 is a flow chart for illustrating the adjustment level display processing sequence.

The adjustment level display processing performed by the display controller 65 is explained with reference to FIG. 43.

If the adjustment level display processing sequence RT1 is executed, four-channel level data for the ports P1 to P4 are received at step SP1 from the CPU 152 of the editing manager 150. The display controller 65 then advances to SP2 to write setting values of the audio level derived from the level data in the memory 51.

At step SP3, the display controller 65 confirms which one of the ports 101 to 104 has been selected by which one of the first to fourth port selection buttons 10A to 10D. The display controller 65 then confirms, for the selected port, an input from the rotary encoders 11A to 11D from channel to channel.

The display controller 65 then advances to step SP5 to check whether or not there is an input from the rotary encoders 11A to 11D. If the affirmative result is obtained, it means that the audio level setting value has been changed by the rotary encoders 11A to 11D. The display controller 65 then writes the setting value of the changed audio level in the memory 51, while reflecting the setting value in the associated level meter.

The display controller 65 then transmits the setting value of the changed audio level to the CPU 152 of the editing manager 150 and advances to step SP7 to display the graduated bar MB displayed on the LED display units 12A to 12D at the graduated position corresponding to the setting value.

The display controller 65 then directly advances to step SP9 to terminate the adjustment level display processing. If conversely a negative result is obtained at step SP5, it means that the audio level setting value has not been changed by the respective rotary encoders 11A to 11D. The display controller 65 then advances to step SP9 to terminate the adjustment level display processing sequence RT1.

In the meter panel 3 of the A/V server 1, as described above, the audio level setting values for four channels at the respective ports are stored, from port to port, for the first to fourth adjustment volumes 11 to 14 used for adjusting the audio levels of the four channels. On port switching, the audio level setting value, as set last time, is read out from the memory 51, and displayed on the graduated bar MB for matching to the graduated position corresponding to the setting value. In this manner, if the operator has switched ports, the or she is able to adjust the audio level of each channel in the port in question easily and accurately, thus realizing the A/V server 1 improved appreciably in tractability.

What is claimed is:

1. A data recording and/or reproducing apparatus comprising recording and/or reproducing means for recording and/or reproducing data for a non-linear accessible recording medium, at least one input port and at least one output port, said input port and the output port time-divisionally accessing said recording and/or reproducing means, said input port outputting the data inputted to said recording and/or reproducing means and said output port being fed with the data reproduced by said recording and/or reproducing means to output the data, wherein the apparatus further comprises:

level detection means for detecting the level of audio data contained in data inputted to and outputted from the input and output ports;

control means fed with level data detected by said level detection means for outputting control data for displaying the audio level; and display means fed with level data detected by said level detection means for displaying the audio level inputted to and, outputted from the input and output ports based on said level data; wherein said display means is a monitor provided on a front side of the data recording and/or reproducing apparatus for displaying thereon the audio level of said audio data based on the control data outputted by said control means;

said control means outputting control data configured for performing control so that respective channels of said audio level will be displayed from port to port in display areas of said monitor based on the numbers of said input and output ports, the number of the audio levels that can be displayed in the respective display areas of said monitor, the number of channels contained in the audio data inputted or outputted to or from the respective ports and on said level data.

2. The data recording and/or reproducing apparatus according to claim 1 further comprising:
switching means for switching level meters displayed on said display areas in terms of a plurality of said channels as a unit, and for displaying the switched level meters, if the audio level of all channels of said audio data cannot be displayed in said display area of said monitor.

3. The data recording and/or reproducing apparatus according to claim 1 wherein if said input port and the output port are previously combined on the one-to-one basis and selected in this state, said control means outputs control data configured to cause the audio level of audio data inputted to or outputted from the combined input and output ports to be displayed in the display areas of said monitor.

4. The data recording and/or reproducing apparatus according to claim 1 wherein time codes of said data inputted to or outputted from the respective ports are displayed in each display area of said monitor.

5. The data recording and/or reproducing apparatus according to claim 1 further comprising:
a port selection switch for selecting said input port and/or the output port;
said control means outputting to the port-based audio level displayed in the display area of said monitor control data configured to display the audio level of the port selected by said port selection switch in a manner different from the audio level of the other non-selected port.

6. The data recording and/or reproducing apparatus according to claim 5 wherein the outputted control data performing control so that the audio level of the port selected by said port selection switch is displayed at a first luminance level and wherein the audio level of the non-selected port is displayed at a second luminance level different from said first luminance level.

7. An audio level displaying method for a data recording and/or reproducing apparatus comprising recording and/or reproducing means for recording and/or reproducing data for a non-linear accessible recording medium, at least one input port and at least one output port, said input port and the output port time-divisionally accessing said recording and/or reproducing means to output the data inputted to said input port to said recording and/or reproducing means, the data outputted from the recording and/or reproducing means being inputted to said output port, said port actuation method comprising:
a first step for detecting the audio level contained in said data inputted to said input port and to said output port; and
a second step for displaying said audio level detected at said first step; said second step displaying respective channels of said audio level from port to port in display areas of a monitor provided on the front side of the data recording and/or reproducing apparatus based on the numbers of said input and output ports, the number of channels contained in the audio data inputted to the respective ports, the number of display areas and on the audio data detected in said first step.

8. The audio level displaying method for a data recording and/or reproducing apparatus according to claim 7, further comprising:
a third step of switching the audio level displayed in said display areas in terms of a plurality of channels displayed in said display areas as a unit, and displaying the switched audio level, if the audio level of all channels of said audio data cannot be displayed in the display areas of said monitor.

9. The audio level displaying method for a data recording and/or reproducing apparatus according to claim 7, wherein if said input port and the output port are previously combined on the one-to-one basis and selected in this state, the audio level of audio data inputted to or outputted from the combined input and output ports is displayed in the display areas in said second step.

10. The audio level displaying method for a data recording and/or reproducing apparatus according to claim 7 wherein said second step displays the time code of said data inputted to the input port and outputted from the output port.

11. The audio level displaying method for a data recording and/or reproducing apparatus according to claim 7 wherein if said input port and/or the output port is selected for the audio level displayed from port to port, the audio level of the selected port is displayed in a different manner from that for the non-selected port.

12. The audio level displaying method for a data recording and/or reproducing apparatus according to claim 11 wherein the audio level for the selected port is displayed at a first luminance level and that for the non-selected port at a second luminance level different from the first luminance level.

* * * * *